(12) United States Patent
Kasai

(10) Patent No.: US 7,249,997 B2
(45) Date of Patent: Jul. 31, 2007

(54) METHOD AND APPARATUS FOR SUSPENDING A SAUSAGE FROM A STICK

(75) Inventor: Minoru Kasai, Kanagawa (JP)

(73) Assignee: Hitec Co., Ltd., Kanagawa (JP)

( * ) Notice: Subject to any disclaimer, the term of this patent is extended or adjusted under 35 U.S.C. 154(b) by 207 days.

(21) Appl. No.: 11/035,721

(22) Filed: Jan. 18, 2005

(65) Prior Publication Data

US 2005/0159093 A1   Jul. 21, 2005

Related U.S. Application Data

(63) Continuation-in-part of application No. 10/292,693, filed on Nov. 13, 2002, now Pat. No. 6,869,353.

(30) Foreign Application Priority Data

Nov. 16, 2001  (JP) .............................. 2001-390644
Nov. 21, 2001  (JP) .............................. 2001-398260

(51) Int. Cl.
*A22C 11/00*   (2006.01)
(52) U.S. Cl. ...................................................... 452/51
(58) Field of Classification Search .................. 452/30, 452/32, 33, 46, 47, 49, 50, 51, 183, 186
See application file for complete search history.

(56) References Cited

U.S. PATENT DOCUMENTS

| | | | |
|---|---|---|---|
| 3,115,668 A | 12/1963 | Townsend | |
| 3,533,495 A * | 10/1970 | Wallace | 198/468.6 |
| 3,594,858 A * | 7/1971 | Simonsen | 452/51 |
| 4,682,385 A * | 7/1987 | Kasai et al. | 452/51 |
| 4,880,105 A | 11/1989 | Kasai et al. | |
| 5,163,864 A | 11/1992 | Burger et al. | |
| 5,354,229 A * | 10/1994 | Markwardt et al. | 452/51 |
| 5,354,230 A * | 10/1994 | McFarlane et al. | 452/51 |
| 5,480,346 A | 1/1996 | Kasai et al. | |
| 5,830,050 A * | 11/1998 | Nakamura et al. | 452/31 |
| 6,066,035 A * | 5/2000 | Hergott et al. | 452/31 |
| 6,071,186 A | 6/2000 | Shibata et al. | |
| 6,290,591 B1 * | 9/2001 | Hergott et al. | 452/51 |

FOREIGN PATENT DOCUMENTS

| | | |
|---|---|---|
| DE | 3137276 A | 4/1983 |
| JP | 63-56245 | 3/1988 |
| JP | 63-219334 | 9/1988 |
| JP | 04-229134 | 8/1992 |
| JP | 6-7073 | 1/1994 |
| JP | 2003-199487 | 7/2003 |
| JP | 2003-210099 | 7/2003 |

OTHER PUBLICATIONS

Catalog "HELPER" published by HITEC Co., Ltd. published mainly in Japan in 1992.

* cited by examiner

*Primary Examiner*—Thomas Price
(74) *Attorney, Agent, or Firm*—Takeuchi & Kubotera, LLP

(57) ABSTRACT

An apparatus for suspending a sausage from a stick includes an endless circulating body provided with hooks; stick supporting members for supporting a stick at a position below the hooks; a pair of stick-supporting-member actuating devices for moving the stick supporting members toward or away from the stick; and a stick transferring device for transferring the sausage suspended from the hooks onto the stick while removing the stick from the stick supporting members, and for concurrently supplying an ensuing stick onto the stick supporting members.

12 Claims, 40 Drawing Sheets

FIG. 17
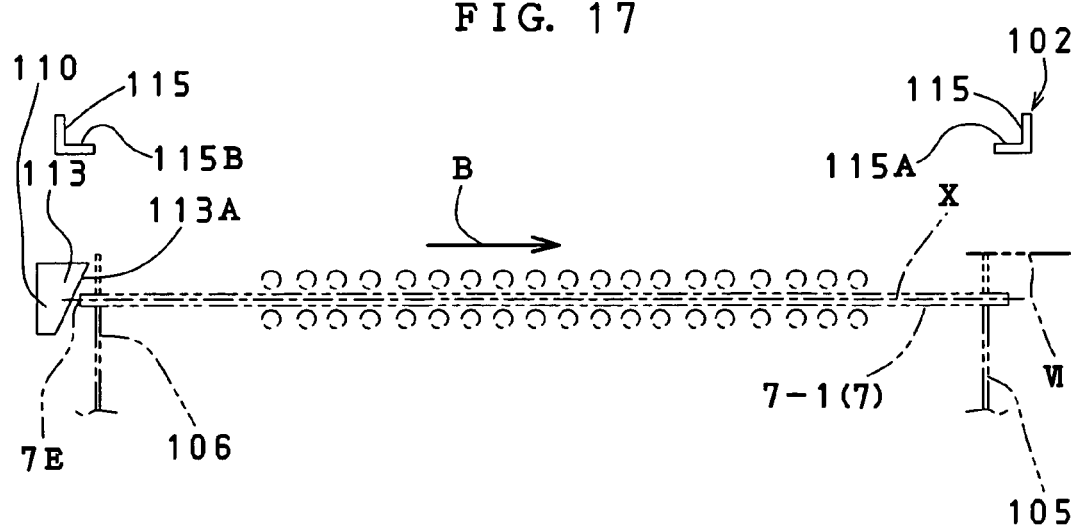
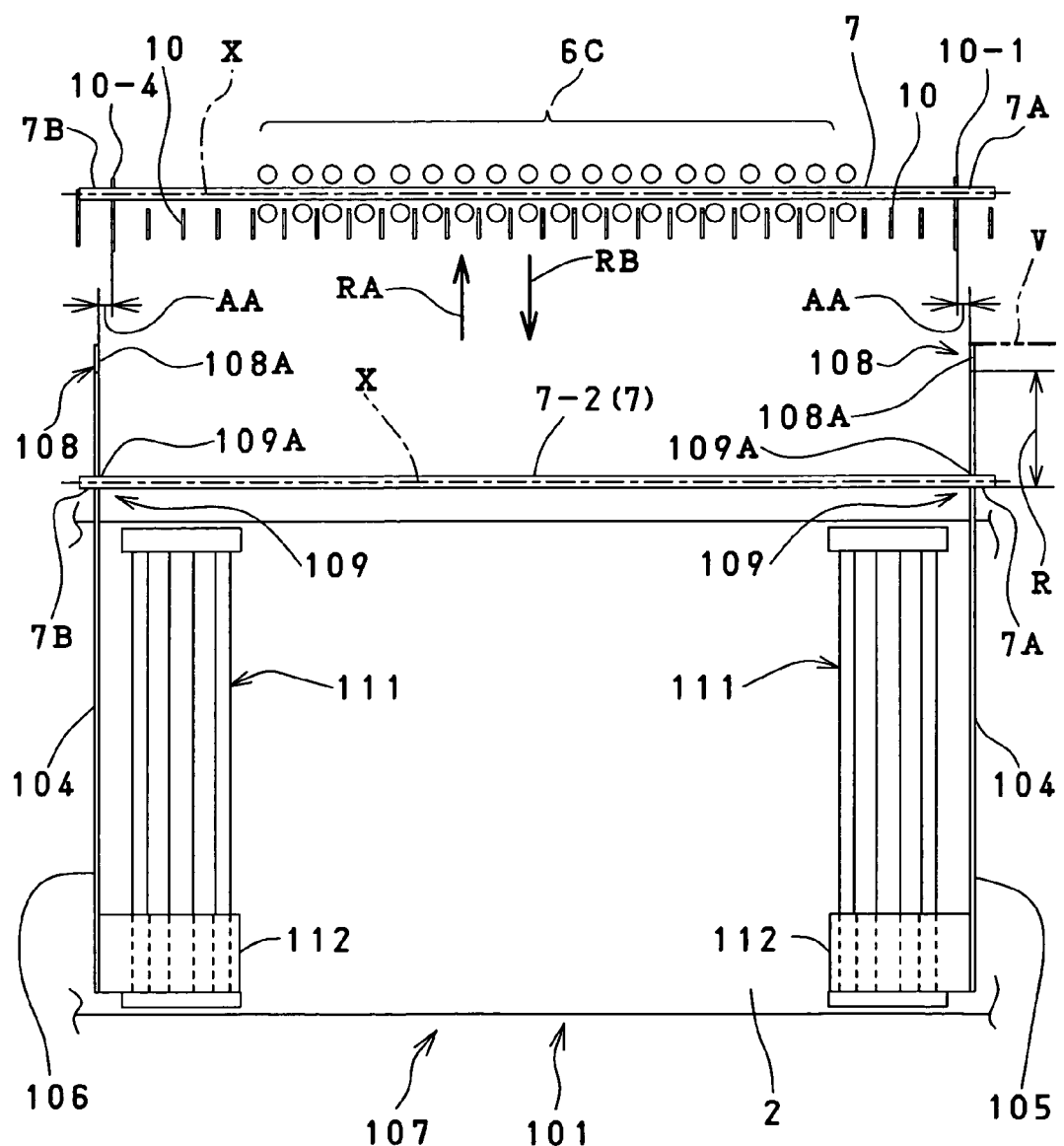

METHOD AND APPARATUS FOR SUSPENDING A SAUSAGE FROM A STICK

CROSS REFERENCE TO RELATED APPLICATIONS

This is a C-I-P application of the application Ser. No. 10/292,693, filed Nov. 13, 2002 now U.S. Pat. No. 6,869,353.

BACKGROUND OF THE INVENTION

1. Field of the Invention

The present invention relates to a method and an apparatus for suspending a sausage from a stick.

2. Description of the Related Art

U.S. Pat. Nos. 5,163,864 and 5,480,346 disclose apparatuses for suspending a sausage from a stick in which the stick is supported by stick supporting hooks which move together with the hooks for suspending the sausage. However, in a case where a stick which is curved in an arcuate shape along its longitudinal direction is used due to such as carelessness in handling, with these known apparatuses, although the stick is supported by the stick supporting hooks, the stick is not supported at a fixed position since the stick is supported over the entire length of the stick. As a result, it is difficult for the stick to be inserted into the loops of a sausage suspended from the hooks. The apparatus disclosed in JP-A-63-219334 concerns a stick supplying apparatus for supplying a curved stick onto stick supporting hooks. With this apparatus as well, since the stick is supported by the stick supporting hooks over the entire length of the stick, the stick is not supported at a fixed position.

In the case of the apparatus disclosed in U.S. Pat. No. 4,880,105, the stick is not disposed at a position below the hooks for suspending a sausage linked in the form of a chain at a twisted portion, but the stick is disposed in front of the row of hooks, and the loops delivered from the hooks onto the stick move toward a front end of the stick by sliding on the stick. With this known technique, the supply of an ensuing sausage to the apparatus is possible even if the stick is not removed, but the possibility of the occurrence of untwisting of the twisted portions due to the sliding motion of the sausage is potentially present.

The known apparatuses in U.S. Pat. Nos. 5,163,864 and 5,480,346 have hooks for supporting the stick at a position below the hooks for suspending a sausage, and the movement of the sausage toward the front end of the stick is effected in a state in which the sausage is suspended from the hooks. With these apparatuses, the rear end of the stick is not disposed so as to be located in front of a leading loop suspended from the hook, and the stick is supported at a position where its rear end and the leading loop substantially coincide with each other. For this reason, the supply of the ensuing sausage is impossible unless the stick is removed, and the supply of the ensuing sausage must be set on standby until completion of the processing of both ends of the sausage, which is effected before removal of the stick, so that there is a problem in terms of productivity.

The apparatus disclosed in JP-A-63-219334 concerns the apparatus for supplying a curved stick onto stick supporting members, while an apparatus disclosed in U.S. Pat. No. 5,480,346 (FIGS. 66 and 67) is comprised of a loop forming device in which hooks for suspending a sausage and hooks for supporting a stick are provided at upper and lower positions as well as a stick supplying device in which a stick transferring member for supplying the stick onto the stick supporting hooks reciprocates in the lateral direction of the stick between the upper and lower hooks. These known apparatuses do not disclose an apparatus for automatically removing the stick from the stick supporting members. JP-A-63-56245 discloses an apparatus having a device for supplying a stick onto a screw feeder and a stick removing device for moving the stick with sausage suspended therefrom in an upward direction from the screw feeder. This known apparatus requires separate devices for supplying the stick and removing the stick.

SUMMARY OF THE INVENTION

The invention has been devised in view of the above-described aspects, and its object is to provide an apparatus for suspending a sausage from a stick which allows a curved stick supported at a position below the hooks for suspending the sausage to be insertable without an error into sausage loops suspended from the hooks.

Another object of the invention is to provide an apparatus for suspending a sausage from a stick which allows the stick to be insertable into sausage loops while the end processing of the sausage is being effected.

Still another object of the invention is to provide a method and an apparatus for suspending a sausage from a stick which make it possible to automatically remove a stick disposed at a position below the hooks for suspending the sausage and transfer the sausage onto the stick.

A further object of the invention is to provide a method and an apparatus for suspending a sausage from a stick which make it possible to reliably supply and remove a curved stick.

A still further object of invention is to provide a method and an apparatus for suspending a sausage from a stick which make it possible to effect both the operation of removing a stick and the operation of supplying a stick and to effect either of the operations, as required.

It is another object of the invention to provide an efficient method and apparatus for suspending a sausage from a stick which make it possible to discharge and/or supply sticks while operating the hooks for suspending the sausage.

In accordance with a first aspect of the invention, there is provided an apparatus for suspending a sausage from a stick, comprising: an endless circulating body which circulatingly moves; hooks provided on the endless circulating body and adapted to suspend the sausage therefrom; and stick supporting means for supporting the stick in such a manner as to dispose the stick at a position below the hooks, wherein the stick supporting means includes stick supporting members provided at a position below the hooks and adapted to support the stick and stick-supporting-member actuating means for causing the stick supporting members to approach and move away from the stick.

With the apparatus in accordance with the above-described first aspect of the invention, since the stick supporting members move toward a front end of the stick while maintaining a state of being spaced apart from the stick, even if the stick has a shape in which it is curved in an arcuate shape along its longitudinal direction, contact between the moving stick supporting members and portions of the stick curved in the arcuate shape can be prevented. Consequently, the insertion of the stick into the sausage loops suspended from the hooks can be ensured.

In the above-described apparatus, each of the stick supporting members may be rotatably provided on the hook, or by disposing a second endless circulating body, which circulatingly moves in synchronism with the endless circulating body, at a position below the endless circulating body, the stick supporting members may be rotatably attached to this second endless circulating body at predetermined pitches. In either arrangement, the support of the stick and the cancellation of the support of the stick by the stick supporting members can be effected in synchronism with the movement of the hooks. Alternately, a plurality of stick supporting members may be rotatably attached to a second endless circulating body which has a different moving path from that of the first endless circulating body. The stick supporting members may be provided on all the hooks, or may be provided not on all the hooks but on every other hook, for example. If the stick supporting members are provided on all the hooks, it is possible to easily cope with a change in the stopping position of the hooks and a change in the length of the stick to be used. The stick-supporting-member actuating means may be provided with a cam member, but may be constituted by a driving device such as an air cylinder instead of the cam member.

In accordance with a second aspect of the invention, there is provided an apparatus for suspending a sausage from a stick, comprising: an endless circulating body which is wound around and trained between a first rotational center of hooks rotating in such a manner as to intersect the sausage and a second rotational center provided at a distance from the first rotational center, and which circulatingly moves; the hooks provided on the endless circulating body and adapted to form the sausage into loops including a leading loop and a trailing loop and to suspend the sausage therefrom; and stick supporting means for supporting the stick having a rear end in such a manner as to dispose the stick at a position below the hooks, wherein an interval between the first rotational center and the second rotational center is set to a length equal to or longer than a sum of an overall length of the stick and a length of a region of the endless circulating body on which the hooks whereby the sausage has been formed into the loops and from which the sausage is suspended are provided, and the stick supporting means has a portion for supporting the stick so as to dispose the rear end of the stick at a position facing the leading loop.

With the apparatus in accordance with the above-described second aspect of the invention, since the supply of an ensuing sausage can be started while the processing of the ends of the sausage suspended from the hooks is being effected, idle time does not occur. After completion of necessary processing operations (such as the processing of untwisted portions and casing breakage, and the end processing) which are effected with respect to the loops formed by one sausage, the processing-completed loops can be moved to the region of the stick in a state in which they are suspended from the hooks, so that the stick can be automatically inserted into the loops without an error.

In the apparatus in accordance with the above-described second aspect, the interval between the two rotational centers is preferably set to a length between 1.5-fold and 3-fold the overall length of the stick. The stick supporting means preferably has stick supporting members each provided rotatably on the hook and adapted to support the stick.

In addition, in accordance with a third aspect of the invention, there is provided a method for suspending a sausage from a stick, comprising the steps of: advancing stick reciprocally transferring means provided with removed-stick holding means toward a stick supporting member disposed in front of the removed-stick holding means; transferring from the stick supporting member onto the removed-stick holding means the stick supported by the stick supporting member and disposed in loops of the sausage suspended from hooks; advancing the removed-stick holding means beyond the stick supporting member so as to transfer the sausage suspended from the hooks onto the stick held by the removed-stick holding means; discharging the stick with the sausage suspended therefrom from the removed-stick holding means; and retracting the removed-stick holding means beyond the stick supporting member. The stick held by the removed-stick holding means is movably held at a predetermined position in that means. In this method, by merely moving the stick in the lateral direction of the stick with respect to the inner side of the sausage loop, it is possible to pull out from the hooks the twisted portions of the sausage caught by the hooks.

The above-described method may further comprise the steps of: causing the removed-stick holding means which linearly moves to abut against the stick supported by the stick supporting member, so as to transfer the stick onto the removed-stick holding means; and causing the stick held by the removed-stick holding means to linearly move laterally of the stick to abut against the sausage suspended from the hooks, thereby transferring the sausage onto the stick. According to this method, since the stick is linearly moved laterally of the stick with respect to the inner side of the sausage loop, other twisted portions located downwardly of the twisted portions caught by the hooks can be easily retained by the stick.

Furthermore, in accordance with a fourth aspect of the invention, there is provided a method for suspending a sausage from a stick, comprising the steps of: supplying a stick to supply-stick holding means provided on stick reciprocally transferring means; advancing the stick reciprocally transferring means to advance the supply-stick holding means beyond a stick supporting member disposed in front of the supply-stick holding means; retracting the stick reciprocally transferring means to transfer the stick held by the supply-stick holding means onto the stick supporting member; and retracting the supply-stick holding means beyond the stick supporting member. The stick held by the removed-stick holding means is movably held at a predetermined position in that means. According to this method, since the stick is transferred beyond the stick supporting member, the stick can be supplied onto the stick supporting member by merely reciprocating the stick reciprocally transferring means.

Furthermore, in accordance with a fifth aspect of the invention, there is provided a method for suspending a sausage from a stick, comprising the steps of: supplying a stick to supply-stick holding means provided on stick reciprocally transferring means; advancing the stick reciprocally transferring means provided with removed-stick holding means and supply-stick holding means toward a stick supporting member disposed in front of the removed-stick holding means and the supply-stick holding means; causing the removed-stick holding means to abut against the stick supported by the stick supporting member and disposed in loops of the sausage suspended from hooks, so as to transfer the stick from the stick supporting member onto the removed-stick holding means; advancing the removed-stick holding means beyond the stick supporting member so as to transfer the sausage suspended from the hooks onto the stick held by the removed-stick holding means; discharging the stick with the sausage suspended therefrom from the removed-stick holding means; advancing the supply-stick holding means beyond the stick supporting member; retracting the supply-stick holding means toward the stick supporting member to transfer the stick from the supply-stick holding means onto the stick supporting member by causing the stick held by the supply-stick holding means to abut against the stick supporting member; and retracting the removed-stick holding means and the supply-stick holding means beyond the stick supporting member. In this method, since the stick is transferred beyond the stick supporting member, by merely reciprocating the stick reciprocally transferring means it is possible to remove the stick with the sausage suspended therefrom and supply a stick onto the stick supporting member. This method may further comprise the step of: causing the stick held by the supply-stick holding means to abut against the stick supporting member so as to move the stick supporting member.

If each of the above-described methods of the invention further comprises the steps of: supporting a front portion of the stick; raising the stick supporting member toward the rear portion of the stick and supporting the rear portion of the stick by the stick supporting member; and lowering the other stick supporting member located ahead of that stick supporting member and supporting the rear portion of the stick, it is possible to support only the front portion and the rear portion of the stick, and automatic suspension of the sausage from a curved stick becomes possible. On the contrary, there may be provided stick supporting means for supporting the stick over the entire length thereof by the stick supporting member. Such a stick supporting means is suitable for sticks having small curvatures and straight sticks.

Furthermore, in accordance with a sixth aspect of the invention, there is provided an apparatus for suspending a sausage from a stick which includes hooks for suspending a sausage therefrom and a stick supporting member for disposing below the hooks a stick which is to be inserted into loops of the sausage suspended from the hooks, comprising: stick reciprocally transferring means on which removed-stick holding means is provided for holding the stick transferred from the stick supporting member; and stick transferring means for advancing the removed-stick holding means beyond the stick supporting member disposed in front of the removed-stick holding means.

Furthermore, in accordance with a seventh aspect of the invention, there is provided an apparatus for suspending a sausage from a stick which includes hooks for suspending a sausage therefrom and a stick supporting member for disposing below the hooks a stick which is to be inserted into loops of the sausage suspended from the hooks, comprising: stick reciprocally transferring means on which supply-stick holding means is provided for holding a stick to be supplied onto the stick supporting member; and stick transferring means for retracting the supply-stick holding means which advanced beyond the stick supporting member disposed in front of the supply-stick holding means.

In the apparatus in accordance with the above-described seventh aspect of the invention, the supply-stick holding means for holding the stick to be supplied onto the stick supporting member may be provided on the stick reciprocally transferring means at a position spaced apart, as viewed in a moving direction of the stick reciprocally transferring means, from removed-stick holding means, and the stick transferring means may have stick-reciprocally-transferring-means driving means for advancing and retracting the stick reciprocally transferring means with respect to the stick supporting member.

In the apparatus in accordance with the above-described aspects of the invention, if the stick reciprocally transferring means is disposed in such a manner as to be inclined diagonally upward toward the stick supporting member, the arrangement is advantageous in transferring the sausage from the hooks onto the stick, and the holding of the stick by the supply-stick holding means or the removed-stick holding means is facilitated. Preferably, the stick reciprocally transferring means consists of a pair of arms serving as rod members provided in parallel to each other in such a manner as to extend perpendicularly to the longitudinal direction of the stick. The apparatus having the removed-stick holding means may be provided with removed-stick receiving means for receiving the stick discharged from the removed-stick holding means, or may be provided with stick moving means for moving the stick on the removed-stick holding means in the longitudinal direction of the stick so as to move the stick in its longitudinal direction as well while advancing the stick in its lateral direction. If the stick is caused to abut against the sausage while the stick is being moved in its longitudinal direction, the arrangement is advantageous in the delivery of the sausage from the hooks onto the stick.

Furthermore, a method for suspending a sausage from a stick in accordance with still another aspect of the invention comprises the steps of disposing a stick in loops of a sausage suspended from hooks; disposing a multiplicity of sticks in parallel to the stick in a laterally spaced-apart relation thereto; moving and separating one of the multiplicity of sticks in a lateral direction thereof; disposing the separated stick at a predetermined position with respect to the stick disposed in loops of the sausage; and transferring the stick disposed in loops of the sausage and the separated stick in a lateral direction of the stick while maintaining a predetermined interval therebetween. According to this method, the delivery of the sausage from the hooks onto the stick, the transfer of the stick with the sausage suspended therefrom, and the supply of a stick for an ensuing sausage can be accomplished concurrently, and the space for transferring the stick can be made small.

According to another aspect of the invention there is provided an apparatus for suspending a sausage from a stick, comprising an endless circulating body put around a first rotational axis and a second rotational axis spaced from the first rotational axis; a plurality of hooks provided on the endless circulating body and having hook portions for hooking twisted portions of a sausage to suspend loops, including a leading loop and a trailing loop, of the sausage; a stick supporting means including a stick rear portion supporting means and a stick front portion supporting means for supporting a rear portion and a front portion of a stick such that the stick is disposed below the hook portions of the hooks which are moving from the rear portion to the front portion while suspending the loops; the stick rear portion supporting means being disposed below the hooks for cooperation with the stick front portion supporting means to support the stick inserted through the leading and trailing loops of the sausage suspended from the hooks, the stick rear portion supporting means including: a stick supporting member for supporting the rear portion of the stick as moving along a longitudinal axis of the stick from the rear portion to the front portion of the stick; and a stick rear portion supporting member actuating means disposed between the first and second rotational axes along a longitudinal axis for causing the stick supporting member to move away downwardly from the stick so as to release support of the rear portion when the stick supporting member arrives at a predetermined position of the longitudinal axis.

The stick rear portion supporting member actuating means is provided between the first rotational axis and the second rotational axis so that it is possible to minimize the apparatus along the longitudinal axis.

According to still another aspect of the invention there is provided a method for suspending a sausage from a stick, comprising the steps of supporting a stick by stick supporting members disposed below hook portions of a plurality of hooks such that the stick is inserted through loops of a sausage suspended from the hook portions of the hooks provided on an endless circulating body; advancing a stick reciprocally transferring means disposed at position away from the stick supporting members such that the stick reciprocally transferring means extends in a direction substantially perpendicular to a longitudinal axis of the stick supported by the stick supporting members to supply a stick to a pair of supplied stick holding means provided on the stick reciprocally transferring means advanced beyond the stick supporting members; retreating the stick reciprocally transferring means toward the stick supporting members such that the stick held by the supplied stick holding means abuts against the stick supporting members so as to be transferred from the supplied stick holding means onto the stick supporting members; and retreating the supplied stick holding means beyond the stick supporting members.

According to yet another aspect of the invention there is provided an apparatus for suspending a sausage from a stick, comprising an endless circulating body; a plurality of hooks provided on the endless circulating body and having hook portions for hooking twisted portions of a sausage so that loops of the sausage are suspended from the hooks; stick supporting members for supporting a stick, which is inserted through the loops of the sausage suspended from the hooks, below the hook portions; a stick reciprocally transferring means disposed at a position apart from the stick supporting members such that the stick reciprocally transferring means is substantially perpendicular to a longitudinal axis of the stick supported by the stick supporting members; a stick reciprocally transferring means driving means for advancing the stick reciprocally transferring means beyond the stick supporting members and then retreating the stick reciprocally transferring means beyond the stick supporting members; and a supplied stick holding means provided on the stick reciprocally transferring means for receiving a supplied stick at an advanced position beyond the stick supporting members and retreating beyond the stick supporting members so that the stick abuts against the supporting members and is transferred to the stick supporting members.

According to the above method and apparatus, the stick reciprocally transferring members advancing beyond the stick supporting members holds no stick so that they can advance at higher speeds than before.

According to another aspect of the invention there is provided an apparatus for suspending a sausage from a stick, comprising an endless circulating body; a plurality of hooks provided on the endless circulating body and having hook portions for hooking twisted portions of a sausage so that loops of the sausage are suspended from the hooks; stick supporting members; a stick transferring means which includes a stick reciprocally transferring means disposed at a position apart from the stick supporting members such that the stick reciprocally transferring means is substantially perpendicular to a longitudinal axis of a stick supported by the stick supporting members, the stick reciprocally transferring means having a removed stick holding means which advances together with the stick reciprocally transferring means to abut against the stick on the stick supporting members so as to receive and hold the stick; and a stick reciprocally transferring means driving means for advancing the stick reciprocally transferring means beyond the stick supporting members disposed below the hook portions and then retreating it beyond the stick supporting members; and a member for coming into contact with the loops suspended from the advancing stick at a height less than a height of the stick which has engaged with twisted portions, and extending along an arranging direction of the hooks so as to be opposed to a plurality of hooks at a predetermined distance, the hooks being provided on the endless circulating body.

According to this apparatus, it is possible to remove the loops from the hooks by raising the stick even if the links and/or loops of a sausage are difficult to be retained by the stick for their diameter, length, and/or hardness.

In accordance with the invention described above, it is possible to provide a method and an apparatus for suspending a sausage from a stick which allows a curved stick supported at a position below the hooks for suspending the sausage to be insertable without an error into sausage loops suspended from the hooks.

In addition, it is possible to provide a method and an apparatus for suspending a sausage from a stick which allows the stick to be insertable into sausage loops while the end processing of the sausage is being effected.

In addition, it is possible to provide a method and an apparatus for suspending a sausage from a stick which make it possible to automatically remove a stick disposed at a position below the hooks for suspending the sausage and transfer the sausage onto the stick.

In addition, it is possible to provide a method and an apparatus for suspending a sausage from a stick which make it possible to reliably supply and remove a curved stick.

In addition, it is possible to provide a method and an apparatus for suspending a sausage from a stick which make it possible to effect both the operation of removing a stick and the operation of supplying a stick and to effect either of the operations, as required.

Also, it is possible to provide a method and an apparatus for suspending a sausage from a stick which make it possible to discharge or supply a stick as moving the hooks for suspending the sausage at a high rate of operation.

BRIEF DESCRIPTION OF THE DRAWINGS

FIG. 17 is a partially enlarged plan view as taken from the direction of arrow Z shown in FIG. 13.

DESCRIPTION OF THE PREFERRED EMBODIMENTS

Referring now to the accompanying drawings, a detailed description will be given of the embodiments of the invention. It should be noted that the invention is not limited to these embodiments.

Figure 1:
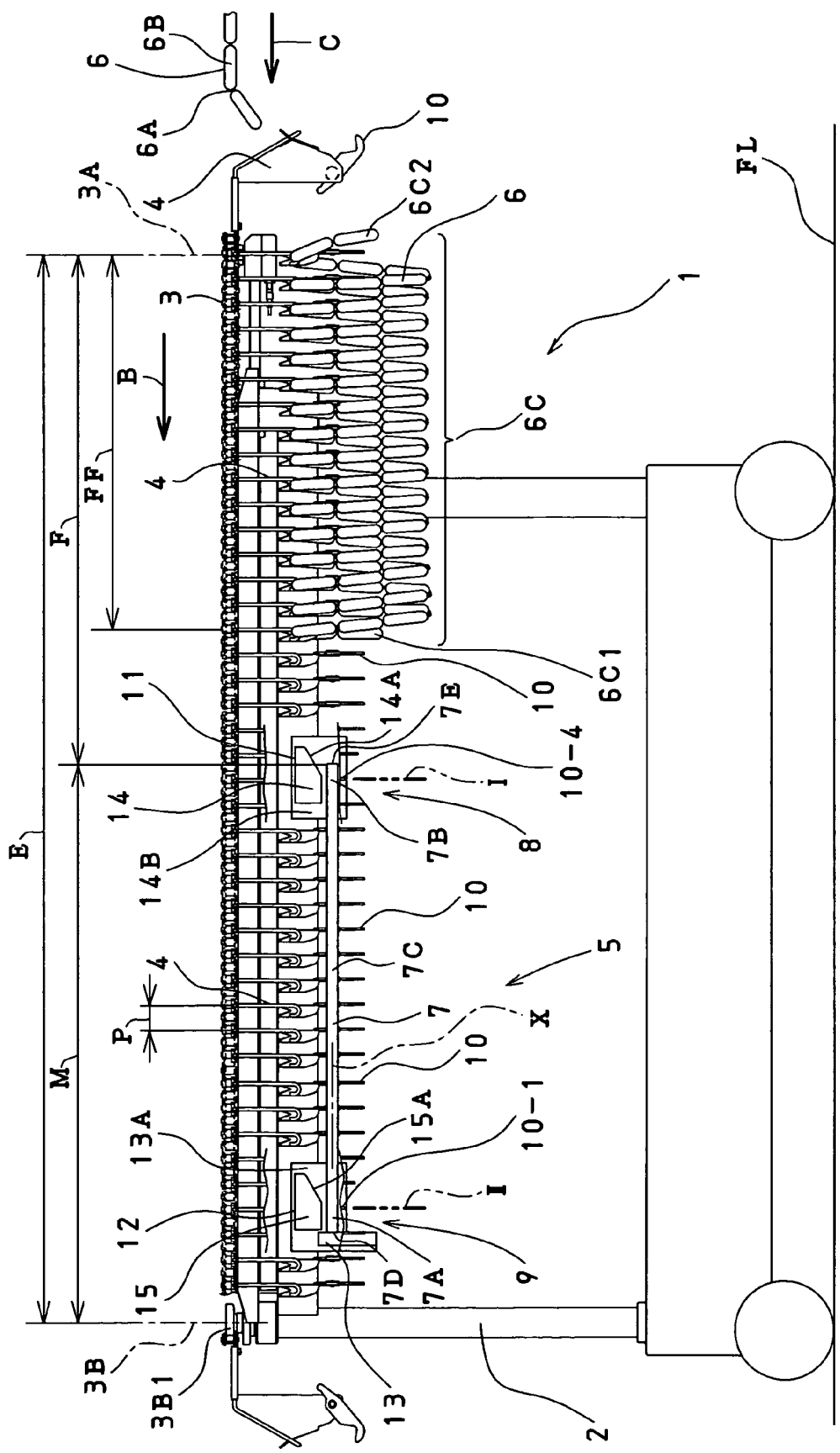
FIG. 1 is a front elevational view of an apparatus in accordance with an embodiment of the invention.
Figure 2:
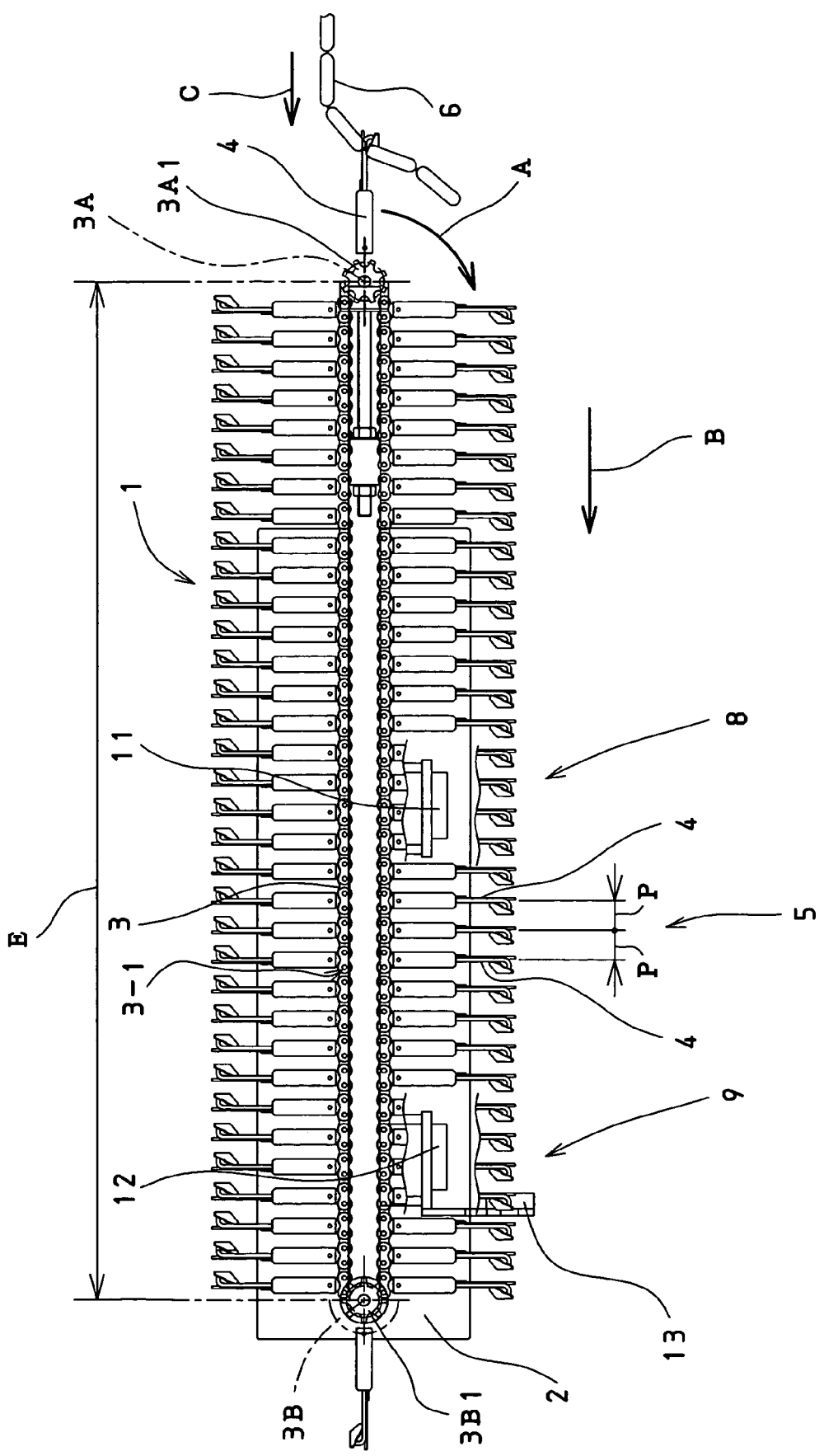
FIG. 2 is a plan view of the apparatus shown in FIG. 1.
Figure 3:
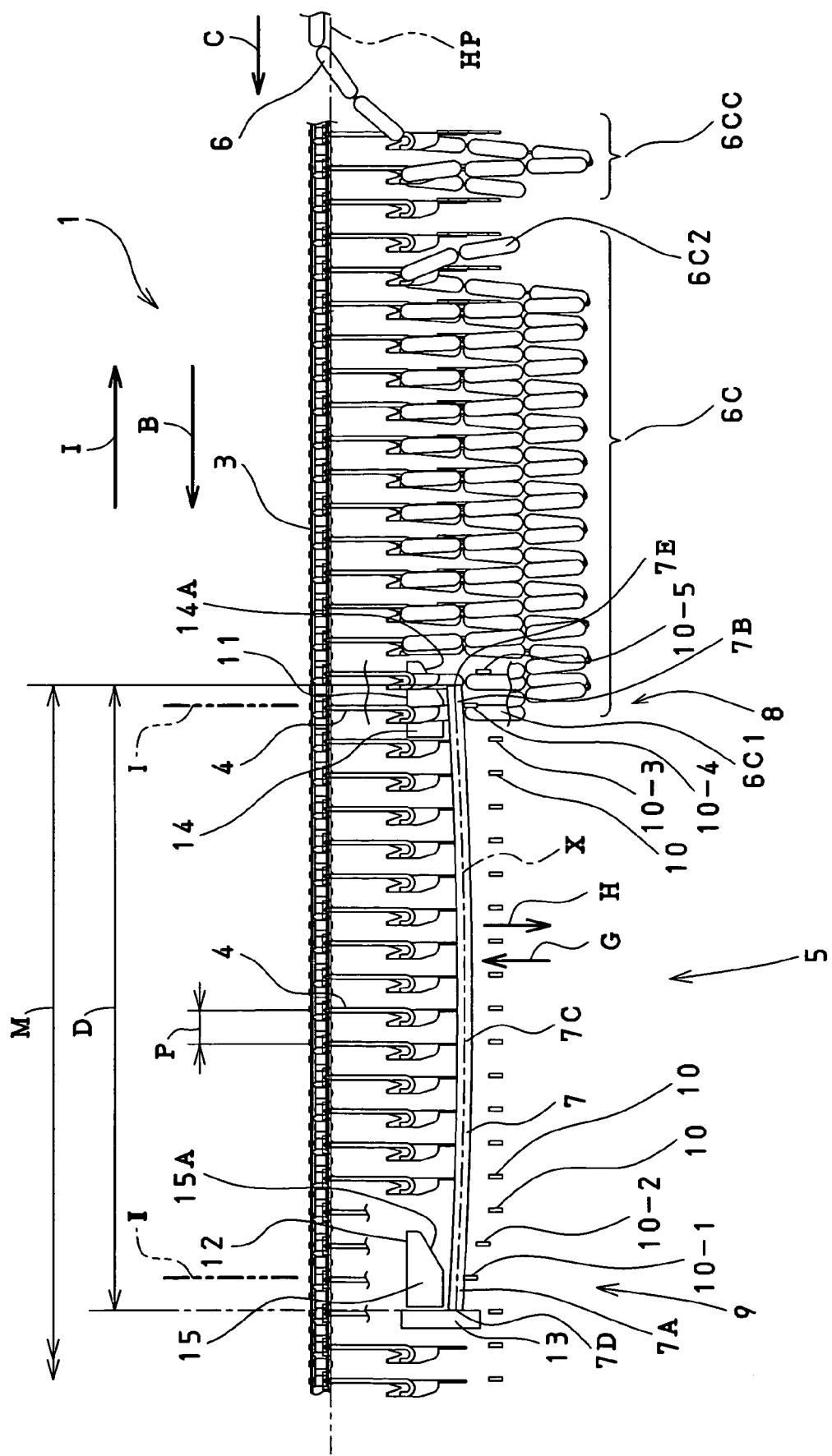
FIG. 3 is a partial enlarged view explaining the operation of the apparatus shown in FIG. 1.

In FIGS. 1 to 3, reference numeral 1 denotes an apparatus for suspending a sausage from a stick. The apparatus 1 is installed on a floor FL and is comprised of an apparatus frame 2; an endless circulating body 3 consisting of a chain or a belt disposed substantially horizontally on the apparatus frame 2; a multiplicity of hooks 4 provided on the endless circulating body 3 at predetermined pitches P and having hook portions for hooking the sausage; and a stick supporting means 5 for disposing the stick at a position below the hook portions of the hooks 4. The endless circulating body 3 disposed on a substantially horizontal plane HP is wound around and trained between a rotating member 3A1 having a first rotational center 3A serving as a first rotational axis and a rotating member 3B1 having a second rotational center 3B serving as a second rotational axis and provided at a distance from the first rotational center 3A, and circulatingly moves in the direction indicated by arrow A and arrow B.

Reference numeral 6 denotes sausage consisting of a multiplicity of links 6B formed in a chain and having twisted portions 6A. The sausage 6 is moved in the direction of arrow C by an unillustrated sausage supplying apparatus, e.g., a linking device disclosed in U.S. Pat. No. 3,115,668, is formed into loops 6C including a leading loop 6C1 and a trailing loop 6C2, and is suspended from the hooks 4. Reference numeral 7 denotes a stick from which the sausage 6 is suspended for heat treatment, and which consists of a rod member having an overall length D and having various portions including a front portion 7A, a rear portion 7B, an intermediate portion 7C, a front end 7D, and a rear end 7E. The stick 7 is detachably supported in a region M (which will be described later) such that the rear end 7E of the stick is disposed at a position facing the leading loop 6C1 by the stick supporting means 5.

An interval or distance E between the first rotational center 3A and the second rotational center 3B of the endless circulating body 3 is set to a length equal to or longer than the sum of the overall length D of the stick 7 and the length FF of the region of the endless circulating body 3 necessary for suspending the loops 6C formed by one sausage 6. A distance F from the first rotational center 3A to the rear end 7E of the stick is set in excess of the aforementioned length FF, such that the rear end 7E of the stick is disposed at an interval with the leading loop 6C1. The stick supporting means 5 has a stick rear-portion supporting means 8 provided at a position I for supporting the rear portion 7B of the stick as well as a stick front-portion supporting means 9 provided at a position II for supporting the front portion 7A of the stick, and supports the stick 7 such that the rear portion 7B of the stick faces the leading loop 6C1. If the interval E is set to a length between 1.5-fold to 3-fold the overall length D of the stick 7, the apparatus becomes high in productivity and compact.

Figure 5:
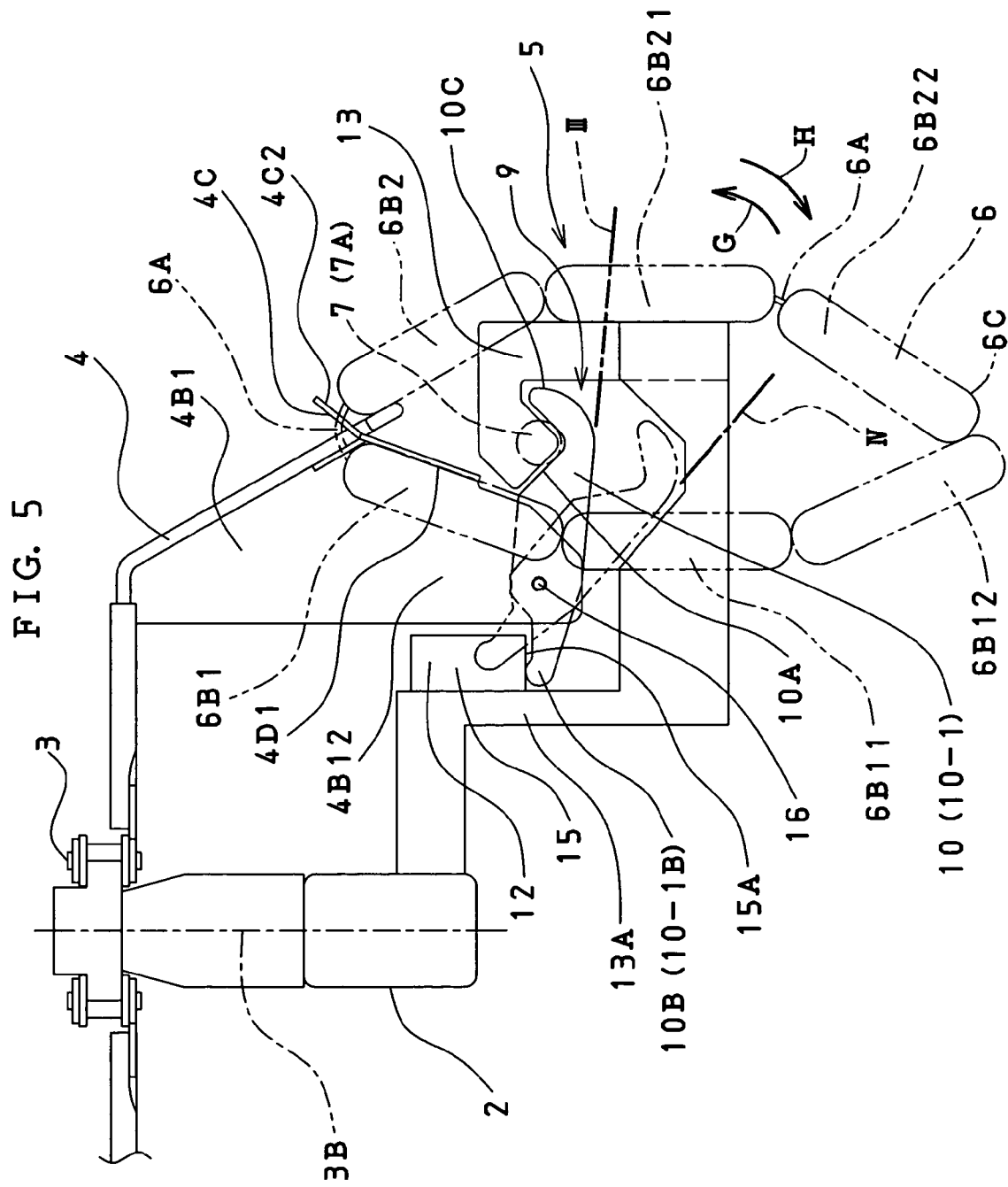
FIG. 5 is an enlarged left side view illustrating mainly a stick supporting means and a hook at a position II in the apparatus shown in FIG. 1.
Figure 6:
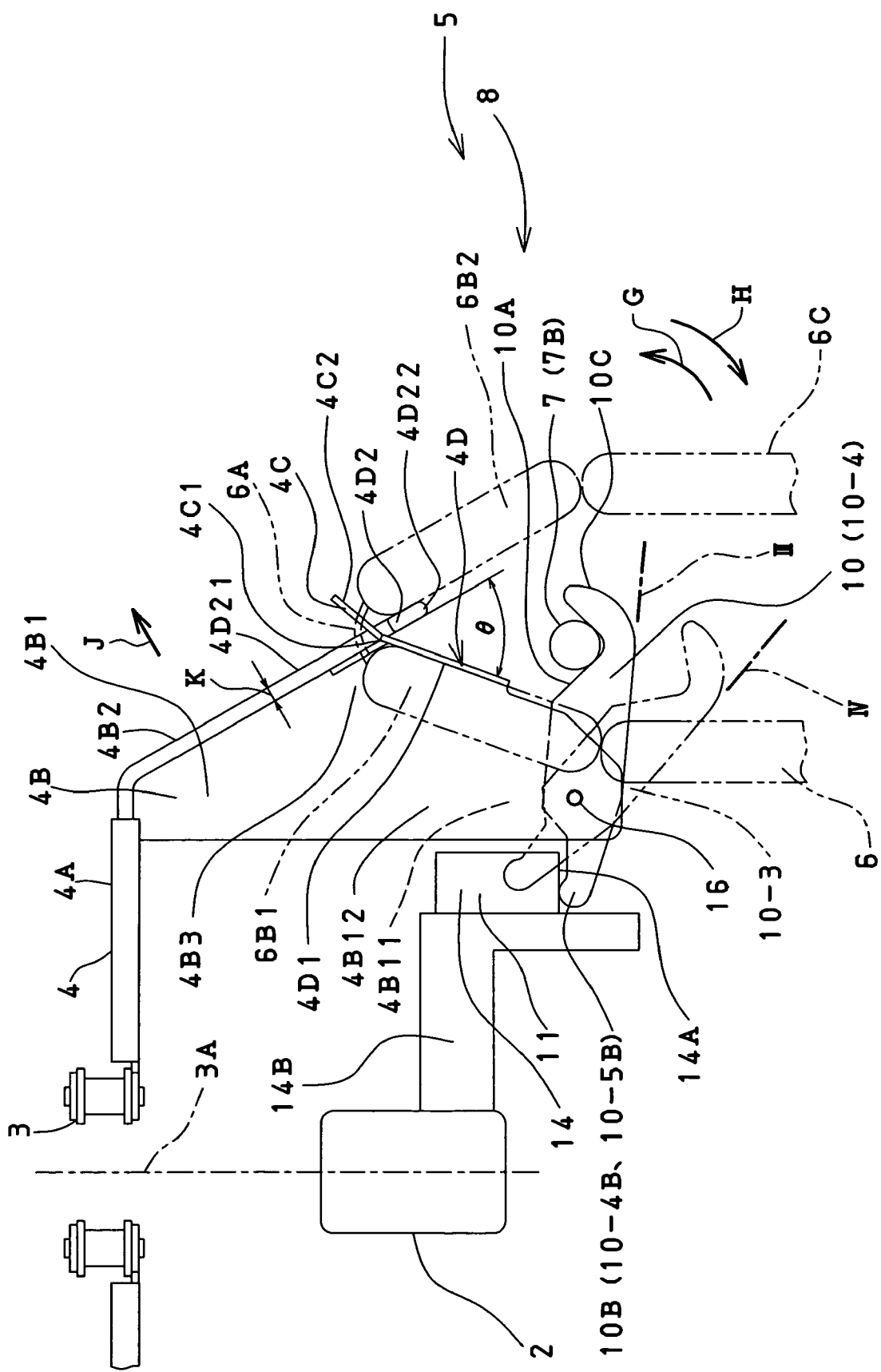
FIG. 6 is an enlarged left side view illustrating mainly the stick supporting means and the hook at a position I in the apparatus shown in FIG. 1.

Referring to FIG. 3, reference numerals 10-1, 10-2, 10-3, 10-4, and 10-5 denote stick supporting members which are specified for the sake of explanation among stick supporting members 10 attached to the multiplicity of hooks 4 provided on the endless circulating body 3 at the predetermined pitches P. The stick rear-portion supporting means 8 has the stick supporting member 10-4 which moves in the moving direction (direction of arrow B) of the hooks 4 and supports the rear portion 7B of the stick, as well as a rear cam member 14 which is a stick-rear-portion supporting-member actuating means 11 for moving the stick supporting member 10-4 away from the stick 7 laterally in the direction of arrow H. The stick front-portion supporting means 9 has the stick supporting member 10-1 which moves in the moving direction (direction of arrow B) of the hooks; a front cam member 15 which is a stick-front-portion supporting-member actuating means 12 for causing the stick supporting member 10-1 to approach the stick 7 from a lateral direction of the stick 7 in the direction of arrow G, and supports the front portion 7A of the stick; and an abutment member 13 for abutting against the front end 7D of the stick. In this way, the stick front-portion supporting means 9 prevents movement of the stick 7 along the longitudinal axis X of the stick 7 caused by the movement of the stick supporting member 10. The stick rear-portion supporting member actuating means 11 and the stick front-portion supporting member actuating means 12 are disposed between the first and second rotational centers 3A and 3B in the longitudinal axis X direction. The stick supporting members 10-1 and 10-4 are respectively raised to a stick supporting position III by the front cam member 15 and the rear cam member 14, and support the front portion 7A and the rear portion 7B of the stick (FIGS. 5 and 6). Numerals 10-2 and 10-5 denote the stick supporting members which are respectively in the process of being raised toward the front portion 7A and the rear portion 7B, respectively, of the stick. Numeral 10-3 denotes the stick supporting member which has passed the rear portion 7B of the stick and moved away to a lowered end position IV laterally from the stick 7 (FIG. 6).

Figure 4:
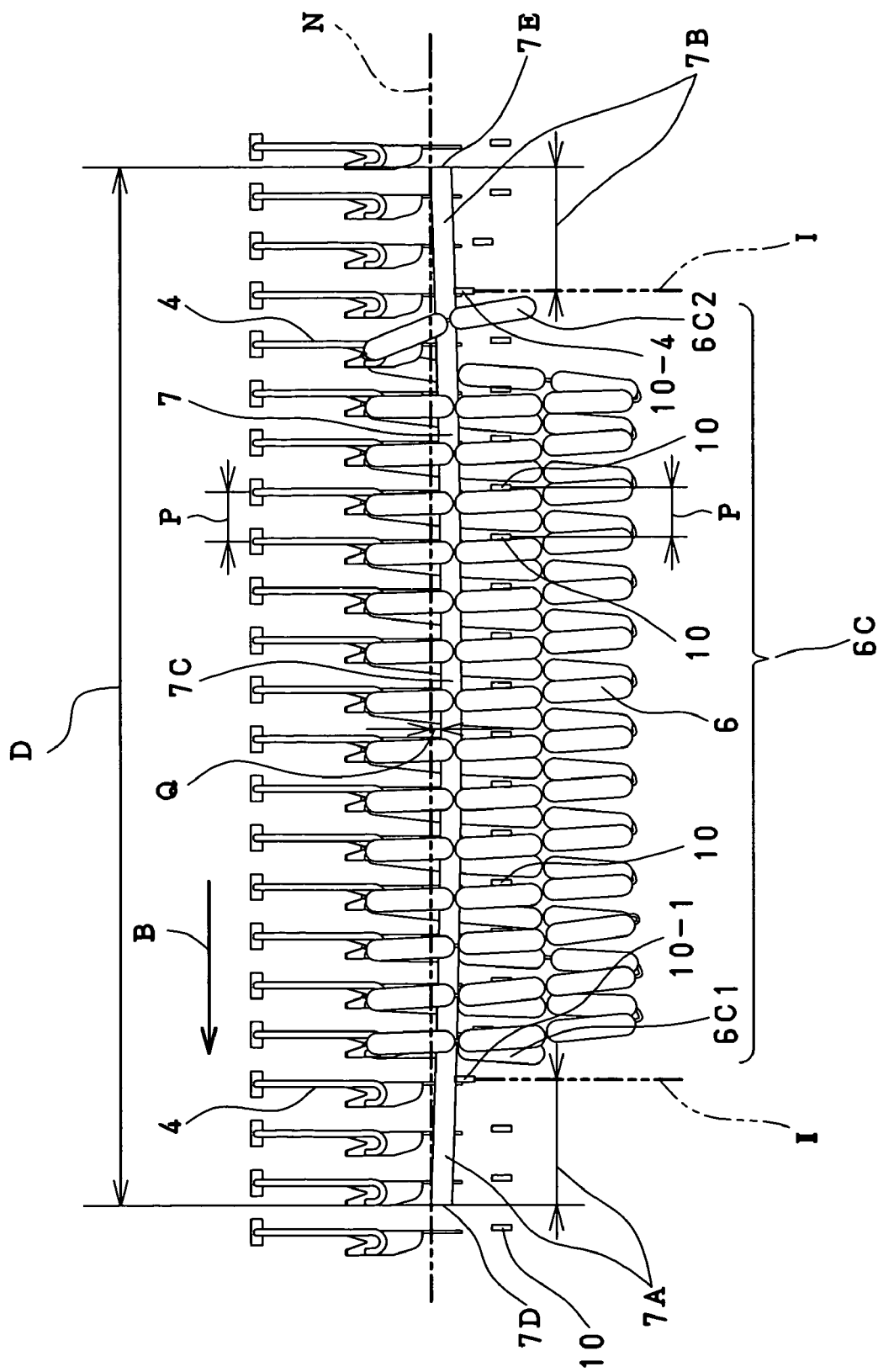
FIG. 4 is a front elevational view illustrating a state in which a stick is inserted into loops suspended from hooks in the apparatus shown in FIG. 1.
Figure 10:
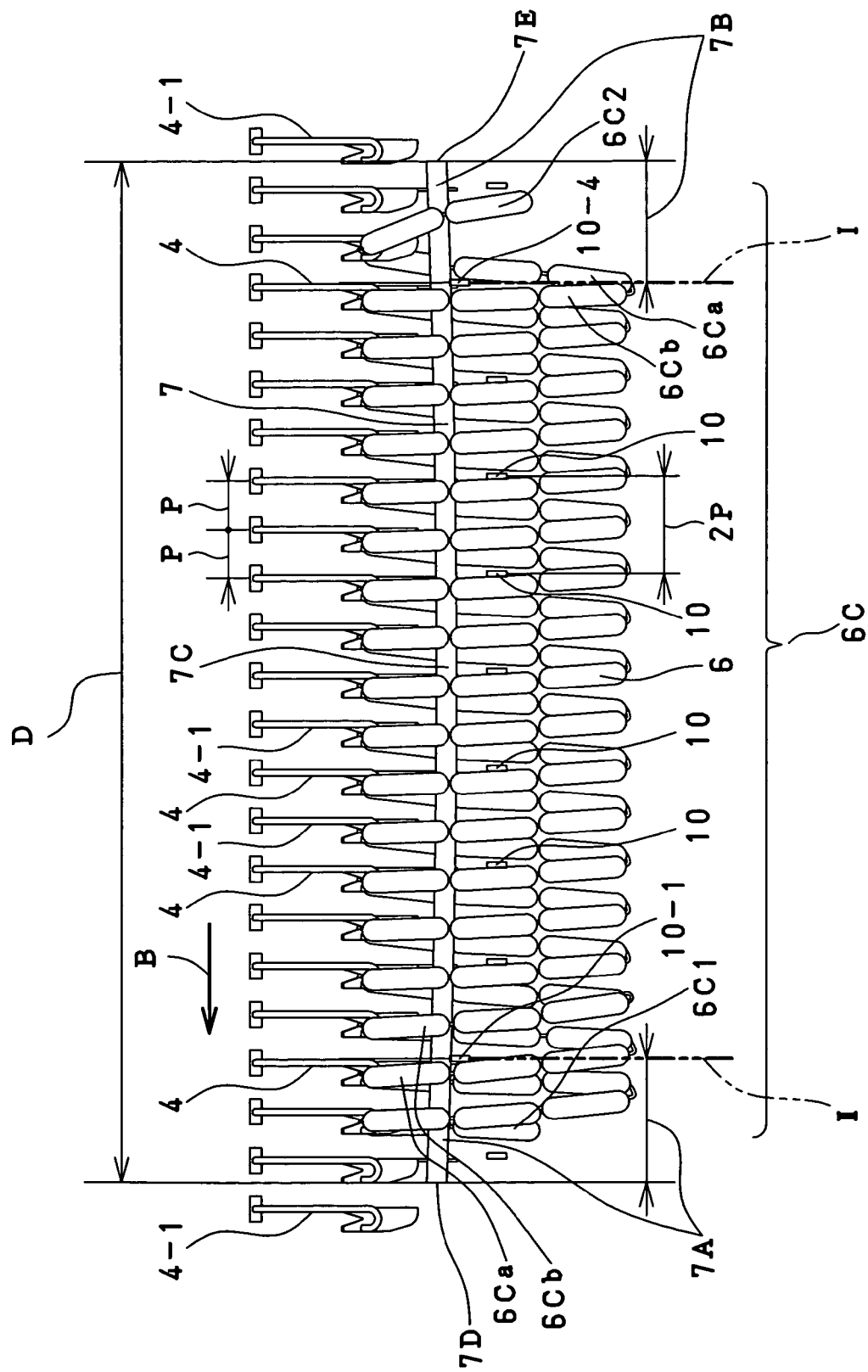
FIG. 10 is a front elevational view of the stick supporting means in accordance with still another example of the invention.

Referring to FIG. 4, the front portion 7A of the stick referred to herein is the section between the front end 7D of the stick and the position supported by the stick supporting member 10-1, while the rear portion 7B of the stick is the section between the rear end 7E of the stick and the position supported by the stick supporting member 10-4. In this embodiment, the positions supported by the stick supporting member 10-1 and the stick supporting member 10-4 are in a region extending from the front end 7D to the leading loop 6C1 and in a region extending from the rear end 7E to the trailing loop 6C2, respectively. However, the position where the stick is supported by the stick supporting member 10 may be located between a loop 6Ca and a loop 6Cb, as shown in FIG. 10 which will be referred to later. In the case where the stick 7 is supported at this position, it is possible to suspend a greater number of loops 6C from the stick 7.

Figure 7:
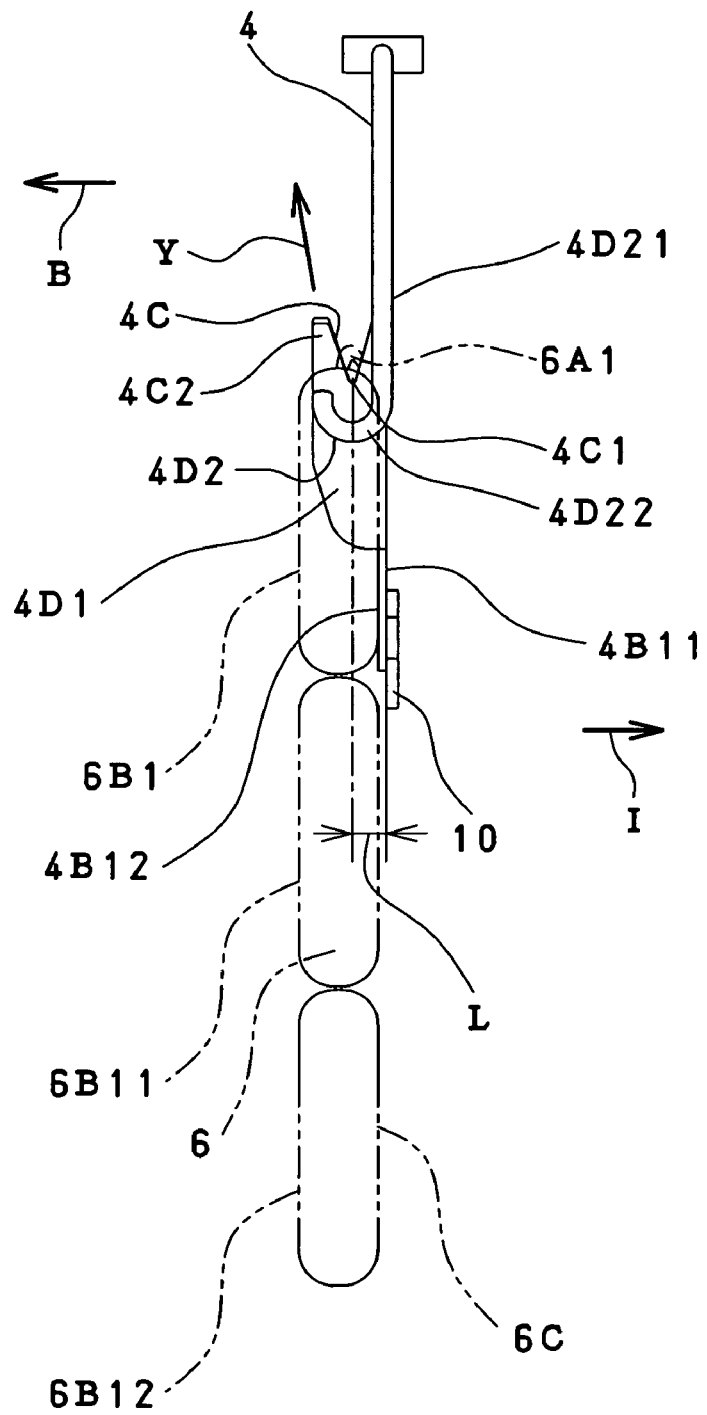
FIG. 7 is an enlarged front elevational view of the hook shown in FIG. 6.

Referring to FIGS. 5 to 7 as well, the stick supporting member 10 has a stick placing surface 10A having a hook shape for supporting the stick 7, a rear portion 10B which is raised or lowered by the rear cam member 14 and the front cam member 15, and a front end portion 10C. The stick placing surface 10A rotates in the directions of arrows G and H between the stick supporting position III and the lowered end position IV. The stick supporting member 10 is rotatably attached by means of a rotating shaft 16 at a lower position on a right side surface 4B11 located on a trailing end side (arrow I direction side) of the hook 4 with respect to a hook portion 4C. Since the right side surface 4B11 moves with a phase difference L with respect to the hook portion 4C provided on a left side surface 4B12 located on the leading end side (arrow B direction side) of the hook 4, the intersection between the stick supporting member 10 and links 6B1, 6B11, and 6B12 is inhibited so as to form the loop 6C. Since the stick supporting member 10 which is not supporting the stick is positioned at the lowered end position IV, the front end portion 10C is located further away from links 6B2, 6B21, and 6B22 than when it is at the stick supporting position III, so that the intersection between the front end portion 10C and these links is inhibited, thereby making it possible to insert the stick 7 into the loop 6C without an error.

The rear cam member 14 is mounted on the apparatus frame 2 by means of a bracket 14B so as to be disposed at the position I. A sliding-guiding surface 14A for vertically sliding and guiding a rear portion 10-4B of the stick supporting member 10-4 which reaches and passes the rear portion 7B of the stick is formed on the rear cam member 14. The front cam member 15 is mounted on the apparatus frame 2 by means of a bracket 13A so as to be disposed at the position II. A sliding-guiding surface 15A for vertically sliding and guiding a rear portion 10-1B of the stick supporting member 10-1 which reaches and passes the front portion 7A of the stick is formed on the front cam member 15. The abutment member 13 has a shape complementary to the hook-shaped stick placing surface 10A of the stick supporting member 10, and is secured to the apparatus frame 2 by means of the bracket 13A so as to be positioned above the stick supporting member 10 and adjacent to the front cam member 15 so that the stick placing surface 10A passes therebelow.

The hook 4 shown in FIGS. 6 and 7 has an attaching baseplate 4A secured horizontally to the endless circulating body 3, an arm 4B extending downwardly from the attaching baseplate 4A, the hook portion 4C provided on the arm 4B and adapted to catch the twisted portion 6A of the sausage 6, and a link guiding portion 4D extending diagonally downward from the hook portion 4C and adapted to guide the sausage 6 suspended from the hook portion 4C. The arm 4B has an arm baseplate 4B1 consisting of a thin plate, as well as an inclined portion 4B2 consisting of a round rod inclined downward from the attaching baseplate 4A. The hook portion 4C having a recessed shape is provided on a lower portion 4B3 of the inclined portion 4B2 and has a bottom portion 4C1 and a projecting portion 4C2 projecting upward from the bottom portion 4C1. The link guiding portion 4D consists of a first guide portion 4D1 formed by a thin plate and a second guide portion 4D2 formed by a round rod, which are disposed in such a manner as to intersect each other at an angle $\theta$. Since the hook 4 suspends the sausage 6 with a wide angle by placing the link 6B1 on the first guide portion 4D1 and the link 6B2 on the second guide portion 4D2, the stick 7 can be inserted into the loop 6C without an error.

The left side surface 4B12 of the arm 4B substantially sets the position of the link 6B1 in cooperation with the first guide portion 4D1. The second guide portion 4D2 consists of a straight introducing portion 4D21 which is a projection located in such a manner as to project upward from the bottom portion 4C1, as well as a guide portion 4D22 located downwardly of the bottom portion 4C1. The introducing portion 4D21 is formed on the trailing end side (arrow I direction side) of the hook 4 with respect to the bottom portion 4C1 (FIG. 7), and is located in such a manner as to project from the bottom portion 4C1 with a projection amount K in a direction (direction of arrow J) perpendicular to the inclined portion 4B2 (FIG. 6), so as to guide the link 6B2 caught at the hook portion 4C toward the guide portion 4D22. The guide portion 4D22 is formed by being bent in a substantially semicircular shape, and is provided in such a manner as to extend in a direction away from the first rotational center 3A with respect to the bottom portion 4C1 and in a downward direction, so as to substantially set the position of the link 6B2. Thus the hook 4 is arranged such that the inclined portion 4B2 and the second guide portion 4D2 are formed by the same member in a continuous shape, while the first guide portion 4D1 and the second guide portion 4D2 are formed by separate structures in a discontinuous shape. Therefore, the frictional resistance occurring between the link 6B2 and the second guide member 4D2 is reduced. As a result, the sliding of the link 6B2 on the second guide member 4D2 is facilitated.

Figure 8:
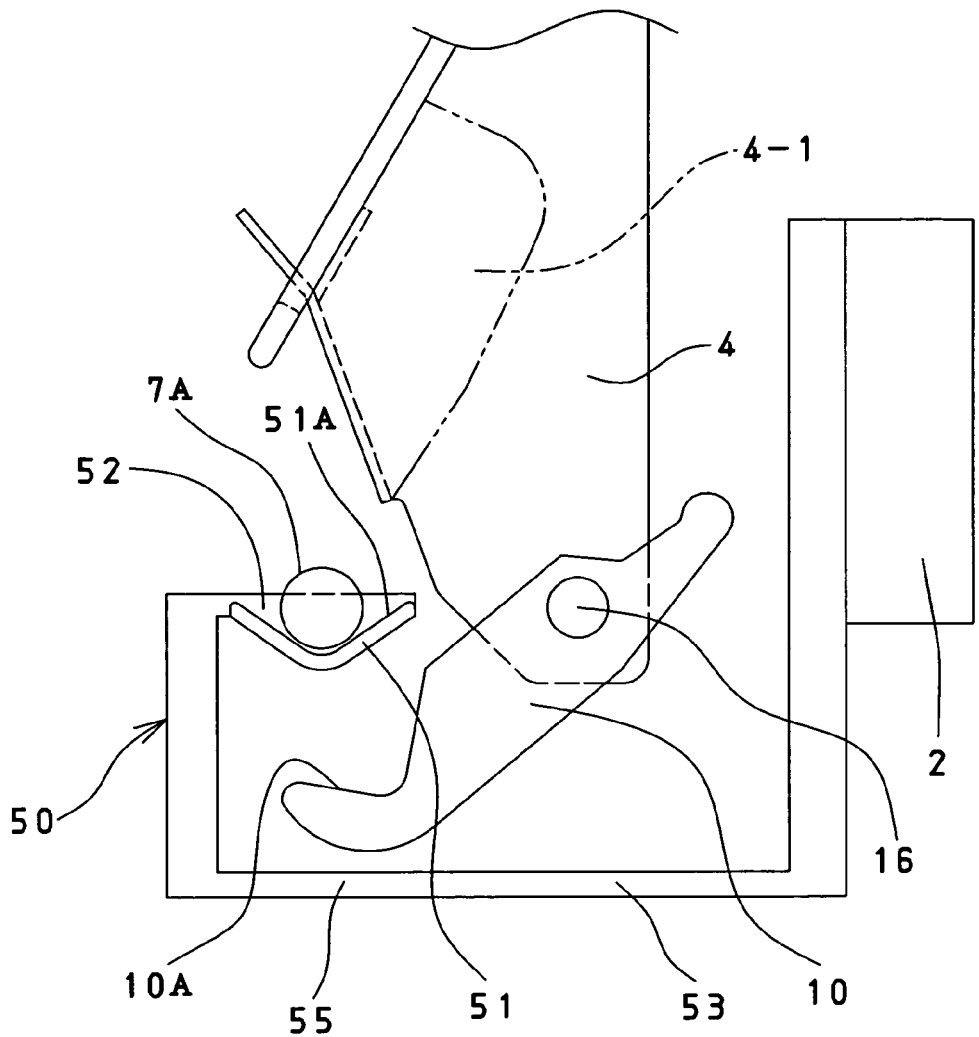
FIG. 8 is a right side view of another example of the stick supporting means of the invention.
Figure 9:
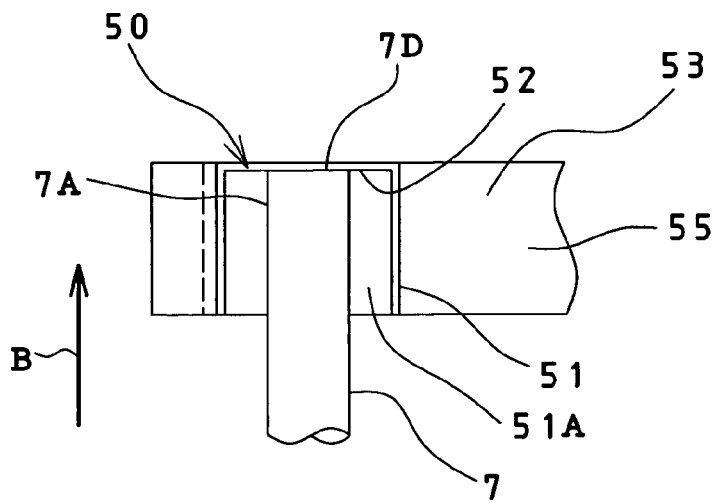
FIG. 9 is a partial enlarged plan view of the example shown in FIG. 8.

Next, a stick front-portion supporting means 50 in another example is shown in FIGS. 8 and 9. This stick front-portion supporting means 50 has a stick front-portion supporting member 55 that includes a stick placing portion 51 on which is formed a stick placing surface 51A having a recessed shape for placing the front portion 7A of the stick thereon to effect positioning, an abutment portion 52 for preventing the movement of the stick 7 in the moving direction of the hooks (direction of arrow B) by abutting against the front end 7D of the stick, and a bracket 53. The stick front-portion supporting means 50 is fixedly provided on the apparatus frame 2 so that the hook-shaped stick placing surface 10A of the stick supporting member 10 passes below the stick placing portion 51. The stick front-portion supporting member 55 is disposed at a position II by a predetermined distance from the stick rear-portion supporting member actuating means 11 in the longitudinal axis X direction so as to be opposed to the stick supporting member 10-4 that supports the rear portion 7B of the stick 7. Alternatively, the stick front-portion supporting member 55 may be made so as to move the stick 7, which has completed supporting, toward the front loop 6C1 hanging from the hook 4 in the longitudinal axis X direction. The rear portion 7B of the stick is supported by the stick supporting member 10, the front portion 7A of the stick is supported by this stick front-portion supporting means 50, and the intermediate portion 7C of the stick is not supported, so that the curved stick 7 can be set to a predetermined position in this example as well. Alternately, the stick supported by the stick front portion supporting means 50 may be moved toward the leading loop along the longitudinal axis X of the stick.

Figure 11:
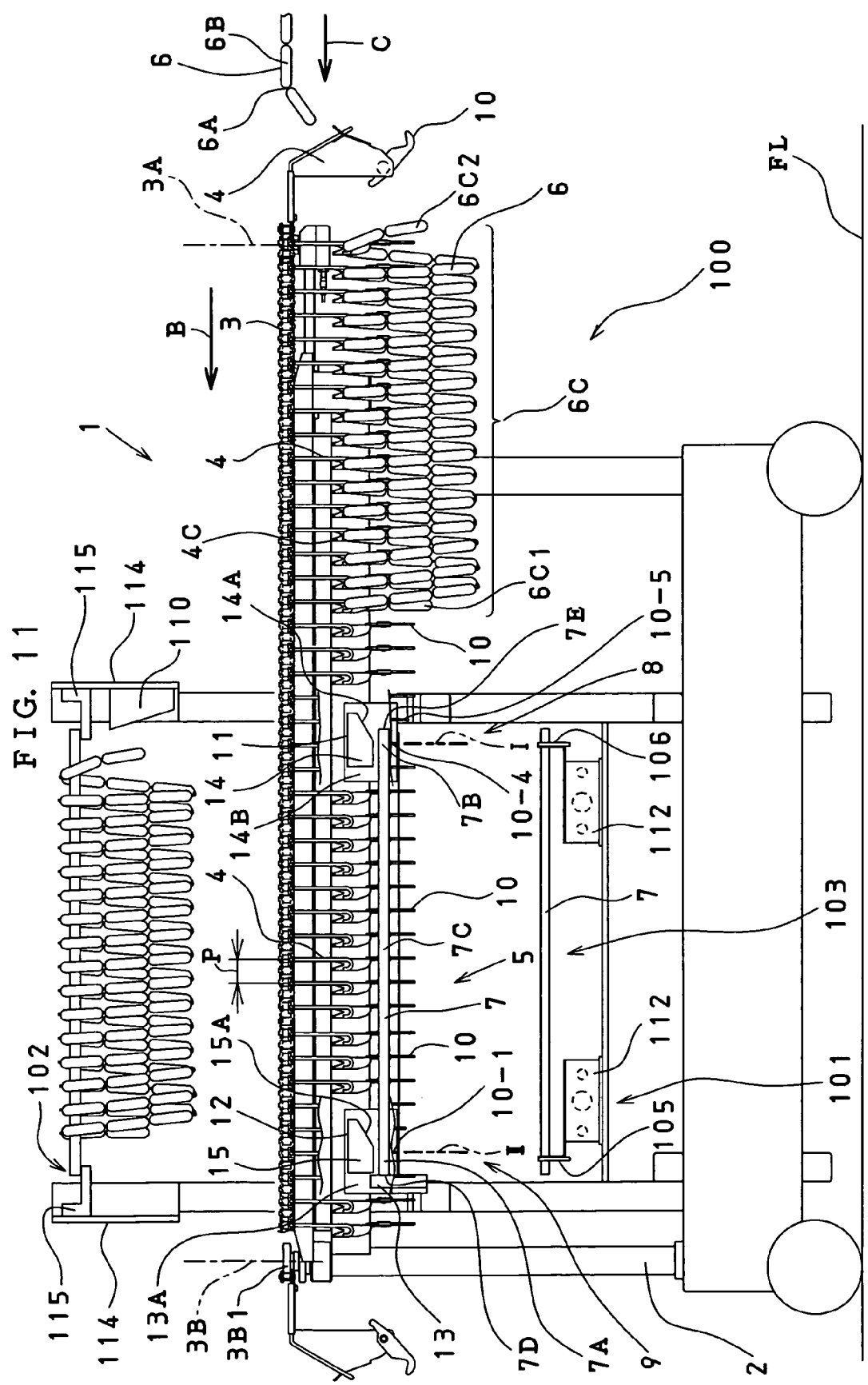
FIG. 11 is a front elevational view of an apparatus in accordance with another embodiment of the invention.

The apparatus 1 of this embodiment operates as follows. As shown in FIG. 1, the sausage 6 is already suspended from the hooks 4 after being formed into the loops 6C. First, the stick 7 is mounted on the stick supporting members 10-1 and 10-4, the movement of the endless circulating body 3 is then started, and an ensuing sausage 6 is concurrently supplied toward the apparatus 1 in the direction of arrow C by the sausage supplying apparatus. The multiplicity of hooks 4 move and rotate about the first rotational center 3A in the direction of arrow A, consecutively intersect the sausage 6 and suspend the sausage 6 in loop form from the hook portions 4C, and move in the direction of arrow B. As shown in FIG. 3, the loops 6C also move in the direction of arrow B and allow the stick 7 to be inserted therein. When the supply of the sausage 6 is finished and the formation of one sausage 6 into ensuing loops 6CC is completed, the movement of the loops 6C to the region M has also been finished, and the insertion of the stick 7 into the loops 6C has also been completed, and the movement of the endless circulating body 3 stops. When the movement of the loops 6C is completed, the stick supporting means 5 supports the stick 7 that pierces the front and rear loops 6C1 of the sausage 6 suspended from the hook 4. Since necessary processing operations including the end processing of the chain of loops 6C have been effected during their movement, the stick 7 is lifted up from the stick supporting members 10-1 and 10-4, and the loops 6C are removed from the hooks 4 and are transferred onto the stick 7, thereby completing the suspension of the sausage 6 from the stick 7, as shown in FIG. 11. Ensuing loops 6CC are already suspended from the hooks 4, and an ensuing stick 7 is mounted on the stick supporting members 10-1 and 10-4 for suspending these loops 6CC. Then, the supply of the ensuing sausage 6 is started, and the above-described operation is repeated.

Next, referring mainly to FIGS. 1 and 3, a description will be given of the operation of the stick supporting means 5. The stick supporting member 10-4, which is located forwardly, as viewed in the moving direction of the hooks, of the leading loop 6C1 and supports the rear portion 7B of the stick, moves in the direction of arrow B as its rear portion 10-4B slides on the sliding-guiding surface 14A of the rear cam member 14. Then, the stick supporting member 10-5 following the stick supporting member 10-4 passes the rear end 7E of the stick while its stick placing surface 10-5A is being raised in the direction of arrow G by the sliding of its rear portion 10-5B on the sliding-guiding surface 14A, and the stick supporting member 10-5 abuts against a lower surface of the stick 7 at the rear portion 7B of the stick and supports the rear portion 7B. While the stick supporting member 10-5 moves in the direction of arrow B while supporting the rear portion 7B of the stick, the stick supporting member 10-4 reaches a position where it is dislocated from the sliding-guiding surface 14A, and rotates in the direction of arrow H by its own weight, and the stick placing surface 10-4A moves away laterally from the stick 7. This operation is consecutively repeated, and when the stick supporting member 10-4 is raised toward the rear portion 7B of the stick, and the stick supporting member 10-4 supports the rear portion 7B of the stick, the stick supporting member 10-3 moving in front of the stick supporting member 10-4 moves away from the stick 7 laterally in the direction of arrow H. In this manner, the multiplicity of hooks 4 from which the loops 6C are suspended and the multiplicity of stick supporting members 10 attached to those hooks 4 consecutively support the rear portion 7B of the stick while consecutively causing the rear portion 7B of the stick to be inserted into the loops 6C. In this example, since the stick supporting member 10-4 in its rising process abuts from below against the rear portion 7B of the stick, which is curved from a base line N of the stick 7 by a displacement amount Q (FIG. 4), and supports the rear portion 7B of the stick, the stick supporting member 10-4 is able to support the rear portion 7B of the stick without colliding against the rear end 7E of the stick.

The stick supporting member 10-1 supporting the front portion 7A of the stick moves toward the front end 7D of the stick while supporting the front portion 7A, while the stick supporting member 10-2 following the stick supporting member 10-1 moves toward the front portion 7A of the stick and supports the front portion 7A while being raised by the sliding-guiding surface 15A of the front cam member 15. When the stick supporting member 10-2 moves while supporting the rear portion 7B of the stick, the stick supporting member 10-1 reaches a position where it is dislocated from the sliding-guiding surface 15A, and rotates in the direction of arrow H by its own weight, thereby canceling the support of the front portion 7A of the stick.

Thus, in this embodiment, since the stick supporting members 10 which passed the rear portion 7B of the stick are moved toward the front portion 7A of the stick while being maintained at the lowered end position IV, when supporting the stick 7 curved with the displacement amount Q as shown in FIG. 4, the stick supporting means 5 supports only the front portion 7A and the rear portion 7B of the stick and does not support the intermediate portion 7C of the stick. It should be noted that the support of the front portion 7A of the stick is not limited to the support by a single stick supporting member 10-1, but may be supported at a plurality of positions on the front portion 7A of the stick by two or more stick supporting members 10-1. The support of the rear portion 7B of the stick is likewise not limited to the support by a single stick supporting member 10-4 in the same way as the above-described support of the front portion 7A of the stick.

Although, in the above-described apparatus 1, the stick supporting members 10 are provided on all the hooks 4, the apparatus 1 may be provided with an arrangement in which hooks 4-1 not provided with the stick supporting members 10 are jointly used as shown in FIGS. 8 and 10, e.g., an arrangement in which the hook 4 provided with the stick supporting member 10 and the hook 4-1 not provided with the stick supporting member 10 are arranged alternately on the endless circulating body 3, such that the stick supporting members 10 are provided at intervals of 2P. In the apparatus 1 thus constructed, the leading loop 6C1 may be suspended from the hook 4-1 not provided with the stick supporting member 10. Even in such a manner of suspension, the rear end 7B of the stick can be inserted into the leading loop 6C1 without an error. Since the interval of attachment of the stick supporting members 10 has a twofold length, an interval AA between the stick supporting member 10 and a stick reciprocally transferring means 104 can be made large in an apparatus 100 which will be described later (FIG. 17).

Figure 12:
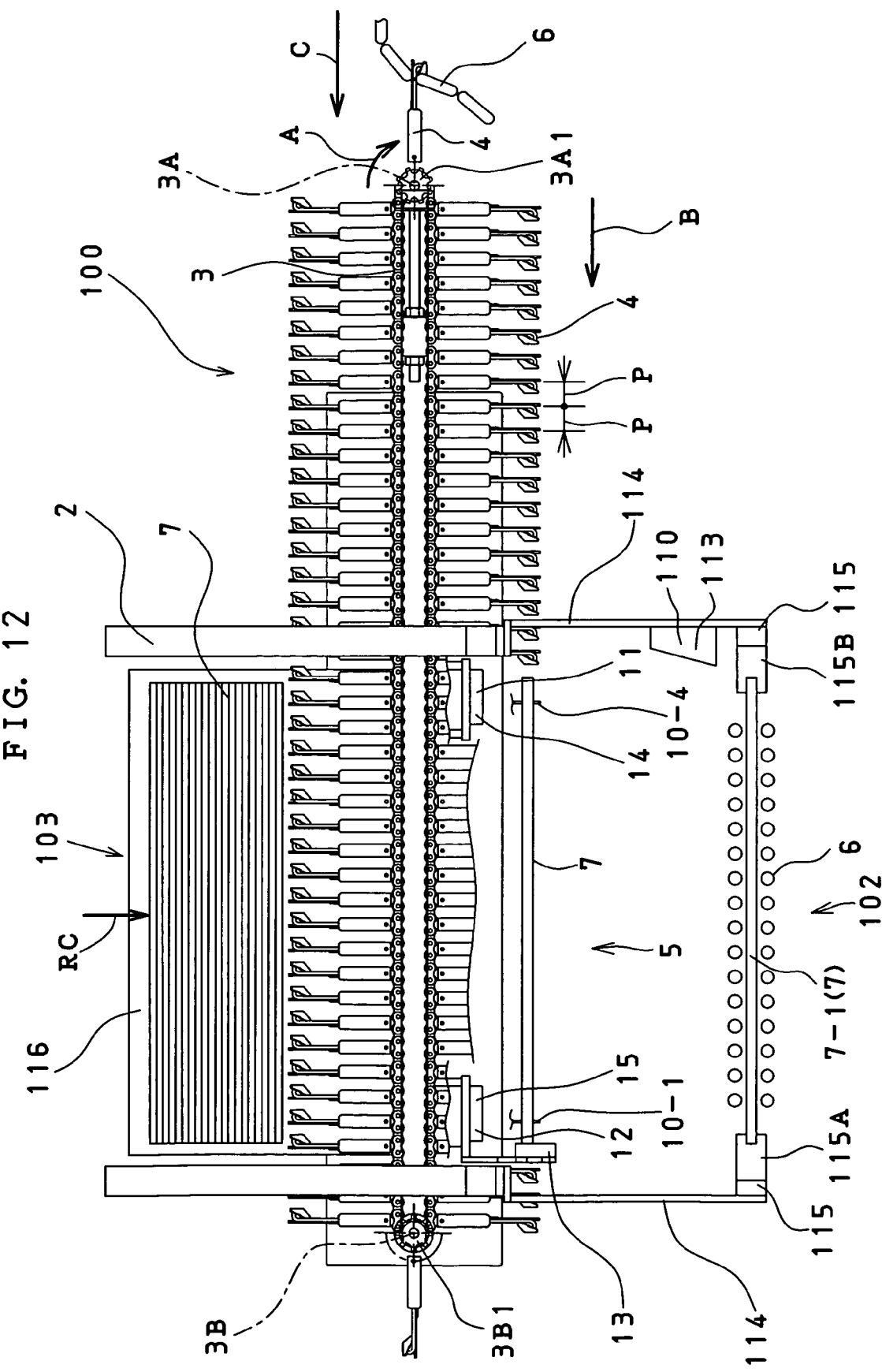
FIG. 12 is a plan view of the apparatus shown in FIG. 11.
Figure 13:
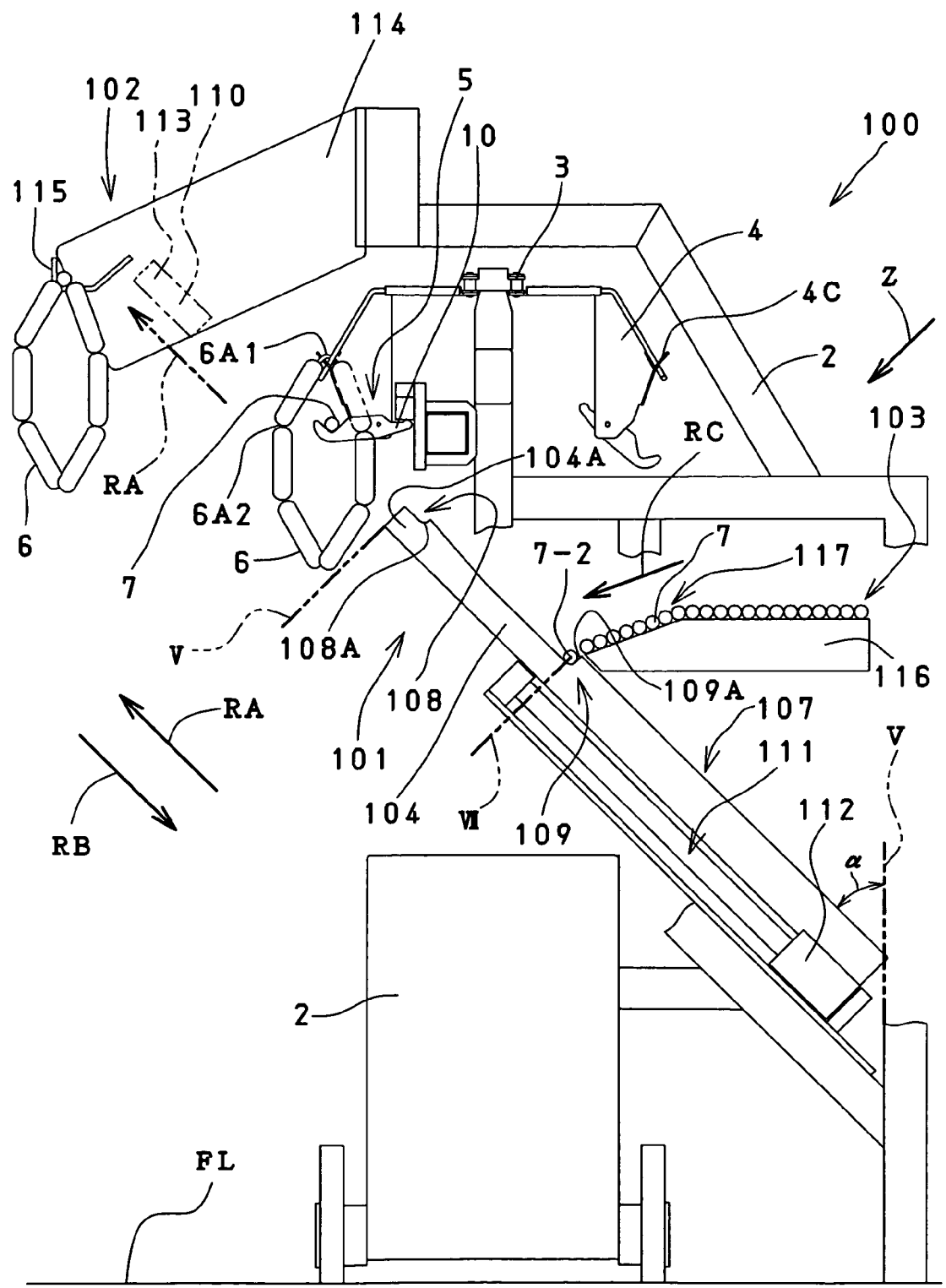
FIG. 13 is a right side view of the apparatus shown in FIG. 11.

Referring to FIGS. 11 to 13, reference numeral 100 denotes an apparatus for suspending a sausage from a stick in accordance with another embodiment of the invention. This apparatus 100 is comprised of the above-described apparatus 1 and means for automatically effecting the supply of a stick to the apparatus 1 and the removal of the stick from the apparatus 1. Namely, the apparatus 100 has the apparatus frame 2, the endless circulating body 3, the hooks 4, and the stick supporting means 5, all of which are constructed substantially in the same way as those of the apparatus 1. In addition, the apparatus 100 has a stick transferring means 101 for transferring the stick 7 toward and away from the stick supporting means 5, a stick receiving means 102 for receiving the stick 7 discharged from the stick transferring means 101 and with the sausage 6 suspended therefrom, and a stick supplying means 103 for supplying the sticks 7 one by one onto the stick transferring means 101.

Figure 14:
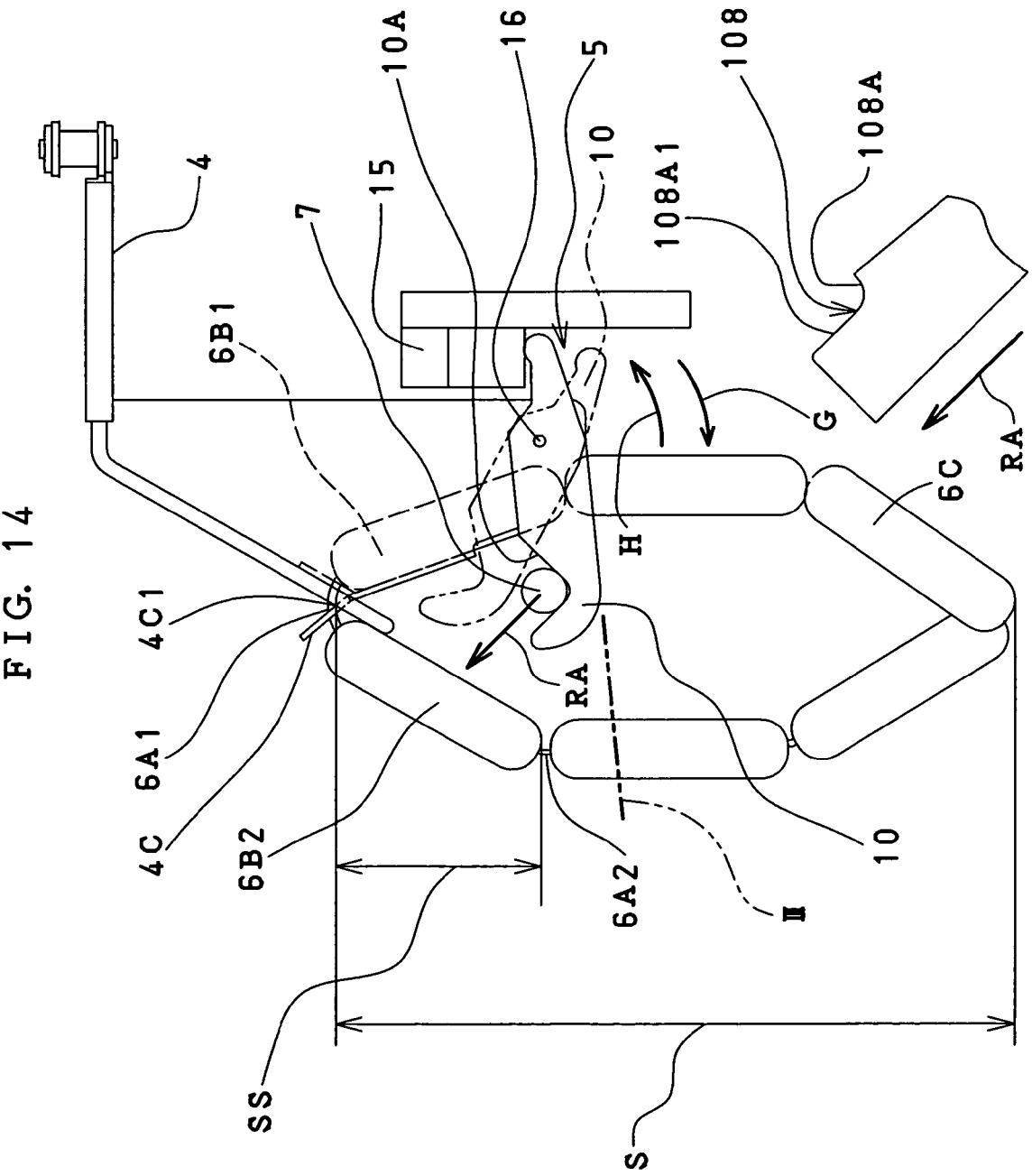
FIG. 14 is a partially enlarged right side view of the apparatus shown in FIG. 11.

Referring to FIG. 14, the stick placing surface 10A of each stick supporting member 10 of the stick supporting means 5 is provided at a position located at a distance substantially corresponding to the suspended length SS of the link 6B2 of the sausage 6 from the bottom portion 4C1 of the hook 4. Consequently, the arrangement provided is such that the stick 7 on the stick placing surface 10A and a twisted portion 6A2 are disposed below the bottom portion 4C1 at substantially the same distance therefrom. However, the heightwise position where the stick 7 is disposed with respect to the twisted portion 6A2 may be either higher or lower than the twisted portion 6A2. In essence, it suffices if the stick 7 is disposed at such a position that it is capable of reliably retaining the twisted portion 6A2 while moving in the direction of arrow RA in the process of delivery of the sausage 6 onto the stick 7, which will be described later.

Figure 15:
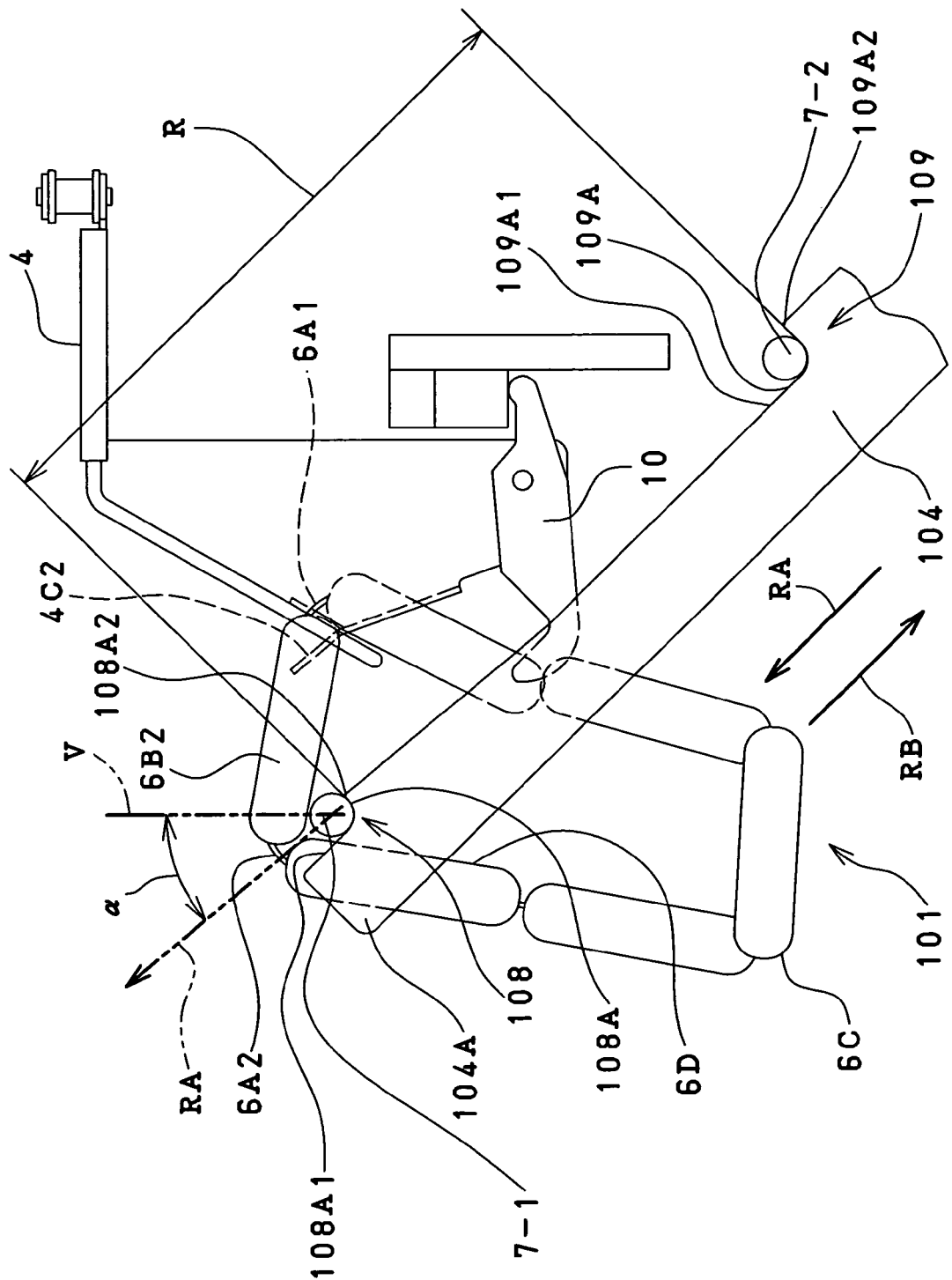
FIG. 15 is a partially enlarged right side view mainly explaining the operation of a stick transferring means and illustrating the relationship between the stick transferring means and the stick supporting means.
Figure 16:
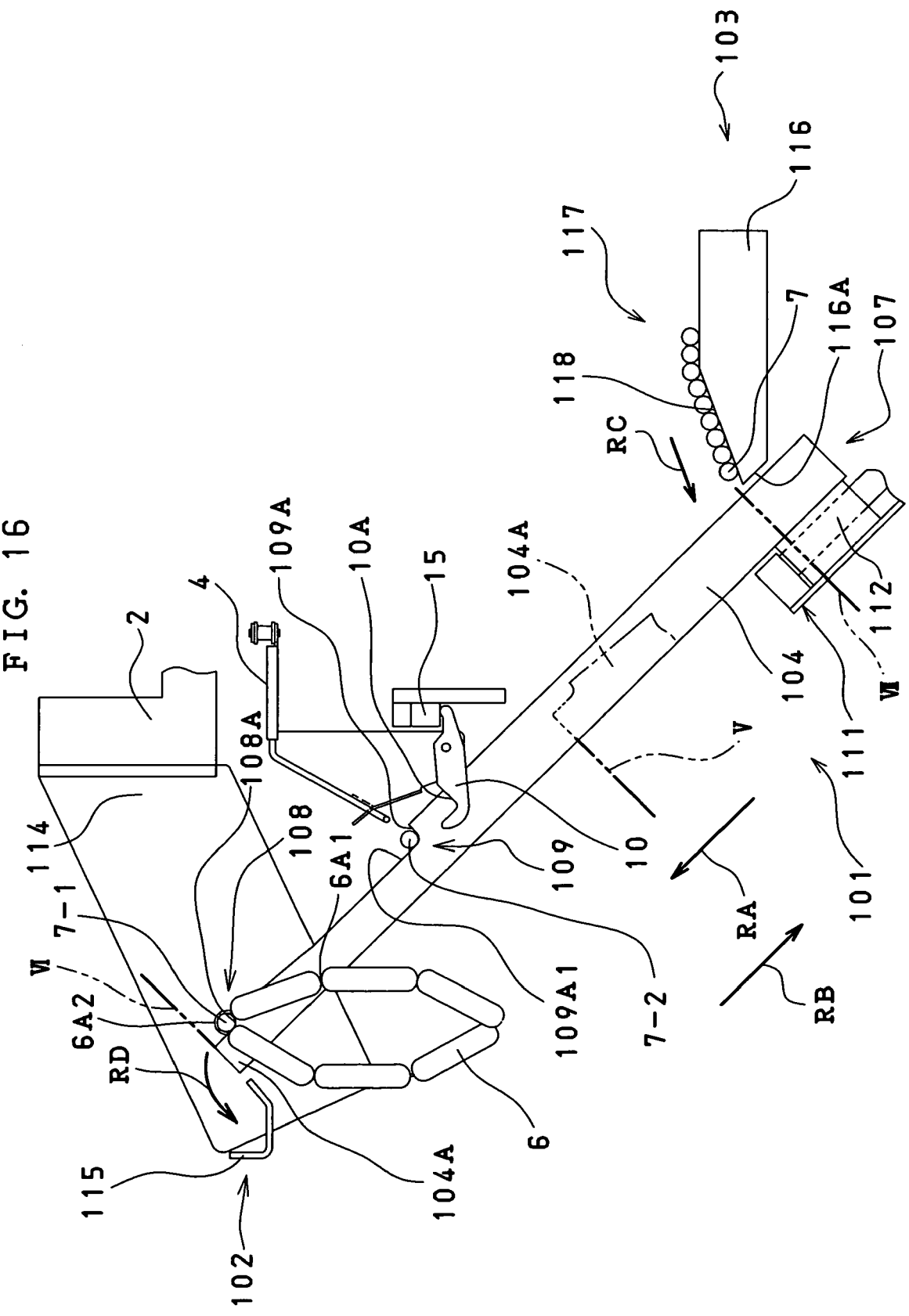
FIG. 16 is a partially enlarged right side view of the apparatus and mainly explains the operation of the apparatus in accordance with the other embodiment.

Referring to FIGS. 15 to 17, the stick transferring means 101 includes a stick reciprocally transferring means 104 consisting of a pair of elongated plate-like arms (hereafter, the stick reciprocally transferring means 104 will be referred to as the arm 104), on each of which are provided a removed-stick holding means 108 for holding a removed stick 7-1, i.e., the stick 7 which has been transferred and received from the stick supporting members 10-1 and 10-4, and a supply-stick holding means 109 for holding a supply stick 7-2, which is the stick 7 to be supplied onto the stick supporting members 10-1 and 10-4; a stick-reciprocally-transferring-means driving means 107 for reciprocating each arm 104 between a lowered end position V and a raised end position VI of the arm 104 by advancing or retracting (in the direction of arrow RA or in the direction of arrow RB) each arm 104 with respect to each stick supporting member 10-1 or 10-4; and a stick moving means 110 for moving the removed stick 7-1 held by the removed-stick holding means 108 in the moving direction of the hooks 4 (in the direction of arrow B) along the longitudinal axis X of the stick 7-1.

The stick reciprocally transferring means 104 specifically consist of a front arm 105 and a rear arm 106 which are provided in parallel to each other in such a manner as to extend perpendicularly to the longitudinal axis X of the stick 7 (FIG. 17). The front arm 105 and the rear arm 106 are positioned with respect to the stick 7 on the stick supporting members 10-1 and 10-4 so as to hold the front portion 7A and the rear portion 7B, respectively, of the stick 7. The front arm 105 and the rear arm 106 are respectively mounted on a pair of actuating bases 112 of the stick reciprocally transferring means driving means 107, which will be described later, in such a manner as to be inclined toward the stick supporting members 10-1 and 10-4 at an angle of inclination □ with respect to a vertical line V, i.e., at 45 degrees in this embodiment (FIG. 13).

The removed-stick holding means 108 is constituted by a recessed portion 108A formed in a front portion 104A of the arm 104. The recessed portion 108A has a stick placing surface 108A1 which comes into contact with the stick 7 on the stick supporting members 10-1 and 10-4 and receives the stick 7 (7-1) to place it thereon. The stick placing surface 108A1 includes a top portion 108A2 for preventing the backward movement of the stick 7-1 in the direction of arrow RB, and extends in the direction of arrow RA (FIG. 15). The recessed portions 108A are formed in the front arm 105 and the rear arm 106 so as to hold the front portion 7A and the rear portion 7B, respectively, of the stick 7-1.

The supply-stick holding means 109 is constituted by a recessed portion 109A formed on the arm 104 at a position a distance R rearwardly (in the direction of arrow RB) apart from the removed-stick holding means 108. The recessed portion 109A has a stick placing surface 109A1 which is set on standby at a stick supplying position VII for receiving the stick 7-2 from the stick supplying means 103 to place it thereon. The stick placing surface 109A1 includes a top portion 109A2 for preventing the backward movement of the stick 7-2 in the direction of arrow RB, and extends towards the top portion 108A2 of the recessed portion 108A (FIG. 15). The recessed portions 109A are formed in the front arm 105 and the rear arm 106 so as to hold the front portion 7A and the rear portion 7B, respectively, of the stick 7-2.

The stick-reciprocally-transferring-means driving means 107 includes a pair of known rodless cylinders 111 which are provided in parallel to each other in such a manner as to extend perpendicularly to the longitudinal axis X of the stick 7 supported on the stick supporting members 10-1 and 10-4 (FIG. 17). The rodless cylinder 111 has the actuating base 112 which linearly reciprocates in the directions of arrows RA and RB. The rodless cylinder 111 is mounted on the apparatus frame 2 at a position below the stick supporting members 10 in such a manner as to be inclined toward the stick supporting members 10-1 and 10-4 at the angle of inclination α (FIG. 13). As the pair of actuating bases 112 advance in the direction of arrow RA, the stick-reciprocally-transferring-means driving means 107 causes the front arm 105 and the rear arm 106 respectively secured to the actuating bases 112 to abut against the front portion 7A and the rear portion 7B, respectively, of the stick 7 on the stick supporting members 10-1 and 10-4 from diagonally below.

The stick moving means 110 has a cam member 113 on which is formed a sliding-guiding surface 113A for sliding and guiding the rear end 7E of the removed stick 7-1 which is moved diagonally upward in the direction of arrow RA. The cam member 113 is fixed to one of a pair of brackets 114 provided uprightly on the apparatus frame 2, such that the sliding-guiding surface 113A extends in the direction of arrow RA from a position below the stick receiving means 102 toward the stick receiving means 102, and such that the sliding-guiding surface 113A is inclined with respect to the hook advancing direction (direction of arrow B) (FIGS. 13 and 17). At the time of delivering the sausage 6 from the hooks 4 onto the stick 7-1, the stick moving means 110 moves the stick 7-1 held by the removed-stick holding means 108 in the moving direction of the hooks. Consequently, the twisted portion 6A1 lifted up by the stick 7-1 easily moves along the projecting portion 4C2 of the hook 4 in the direction of arrow Y (FIG. 7), and is disengaged from the projecting portion 4C2.

The stick receiving means 102 is disposed in the vicinity of the raised end position VI which is the forward end position of the arm 104, and has a pair of stick receiving stands 115 for receiving the removed stick 7-1 discharged from the removed-stick holding means 108 which reached the raised end position VI by moving beyond the stick supporting members 10 (FIG. 16). The stick receiving stands 115 are formed by angular members respectively having stick placing surfaces 115A and 115B for placing the front portion 7A and the rear portion 7B of the removed stick 7-1, and are fixed to the brackets 114 in such a manner as to oppose each other as a pair (FIG. 17).

The stick supplying means 103 shown in FIGS. 12, 13, and 16 has a sticks accommodating section 116 for accommodating the plurality of sticks 7 arranged in parallel with respect to the stick 7 supported by the stick supporting members 10-1 and 10-4, as well as an accommodated-stick moving means 117 for moving the sticks 7 one by one laterally of the stick 7 in the direction of arrow RC. The accommodated-stick moving means 117 moves one stick 7 located at a moving end portion 116A of the sticks accommodating section 116 to the supply-stick holding means 109 of each arm 104. The accommodated-stick moving means 117 in this embodiment is formed by an inclined surface 118. However, the accommodated-stick moving means 117 may be constructed such that the sticks 7 are moved one by one in the direction of arrow RC by a known belt or chain.

The apparatus 100 operates as follows. Referring to FIGS. 11 and 12, the stick 7 has already been supplied onto the stick supporting means 5, and the front portion 7A and the rear portion 7B of the stick 7 are supported by the stick supporting members 10-1 and 10-4. The endless circulating body 3 starts the horizontally circulating movement in the direction of arrow A and in the direction of arrow B, forms the sausage 6 into the loops 6C, suspends them from the hooks 4, moves the loops 6C into the region of the stick 7, and thereby allows the stick 7 to be inserted into the loops 6C, and the movement of the endless circulating body 3 is then stopped. This operation is the same as with the apparatus 1.

Referring to FIGS. 13 to 16, a single stick 7 is moved from the sticks accommodating section 116 in the direction of arrow RC to move it to the recessed portions 109A. When the supply stick 7-2 is delivered to the recessed portions 109A, the rodless cylinders 111 are actuated. The arms 104 at the lowered end position V advance toward the stick supporting members 10-1 and 10-4 in the direction of arrow RA.

The recessed portions 108A abut against the stick 7 supported on the stick supporting members 10-1 and 10-4, transferring the stick 7 from the stick supporting members 10-1 and 10-4 onto the recessed portions 108A. Each arm 104, while holding the removed stick 7-1, moves diagonally upward in the direction of arrow RA, and causes the removed stick 7-1 to abut against an inner side 6D of the sausage 6. The removed stick 7-1 moves diagonally upward while pushing up the link 6B2, and retains the twisted portion 6A2. Since the removed stick 7-1 after retaining the twisted portion 6A2 continues to be raised, the twisted portion 6A1 is dislocated from the projecting portion 4C2, thereby delivering the sausage 6 onto the stick 7-1. Since the multiplicity of other stick supporting members 10 excluding the stick supporting members 10-1 and 10-4 are at the lowered end position IV, the timing when the loops 6C move away from these stick supporting members 10 takes place early, with the result that the delivery of the loops 6C onto the stick 7 is made further reliable.

When each arm 104 rises to the position where the loop 6C is delivered onto the stick 7-1, the recessed portion 109A reaches the vicinity of the position at which the supply stick 7-2 is caused to abut against the stick supporting members 10. As each arm 104 continues to move diagonally upward, the supply stick 7-2 moves beyond the stick supporting members 10 while causing the stick supporting members 10 located at the stick supporting position III and the lowered end position IV to rotate upward in the direction of arrow G. Then, the stick supporting members 10 rotate downward (in the direction of arrow H) to return to the stick supporting position III and the lowered end position IV.

When the arms 104 reach the raised end position VI, the removed stick 7-1 with the sausage 6 suspended therefrom is discharged from the recessed portions 108A in the direction of arrow RD at the raised end position VI, and is delivered onto the stick receiving stands 115. The discharge of the removed stick 7-1 from the stick receiving stands 115 may be effected by an appropriate method or means, e.g., manually or by a robot.

When the removed stick 7-1 with the sausage 6 suspended therefrom is removed from the arms 104, the arms 104 start to retract in the direction of arrow RB, and the recessed portions 109A are lowered toward the stick supporting members 10-1 and 10-4. The supply stick 7-2 held in the recessed portions 109A, when thus lowered, abuts against the stick placing surfaces 10A, and as the arms 104 are subsequently lowered, the supply stick 7-2 is delivered onto the stick placing surfaces 10A. Thus an ensuing stick 7 for suspending the ensuing sausage 6 is supplied onto the stick supporting members 10-1 and 10-4. The recessed portions 108A and the recessed portions 109A are lowered beyond the stick supporting members 10, and when the recessed portions 109A reach the stick supplying position VII, the arms 104 stop lowering.

Figure 18:
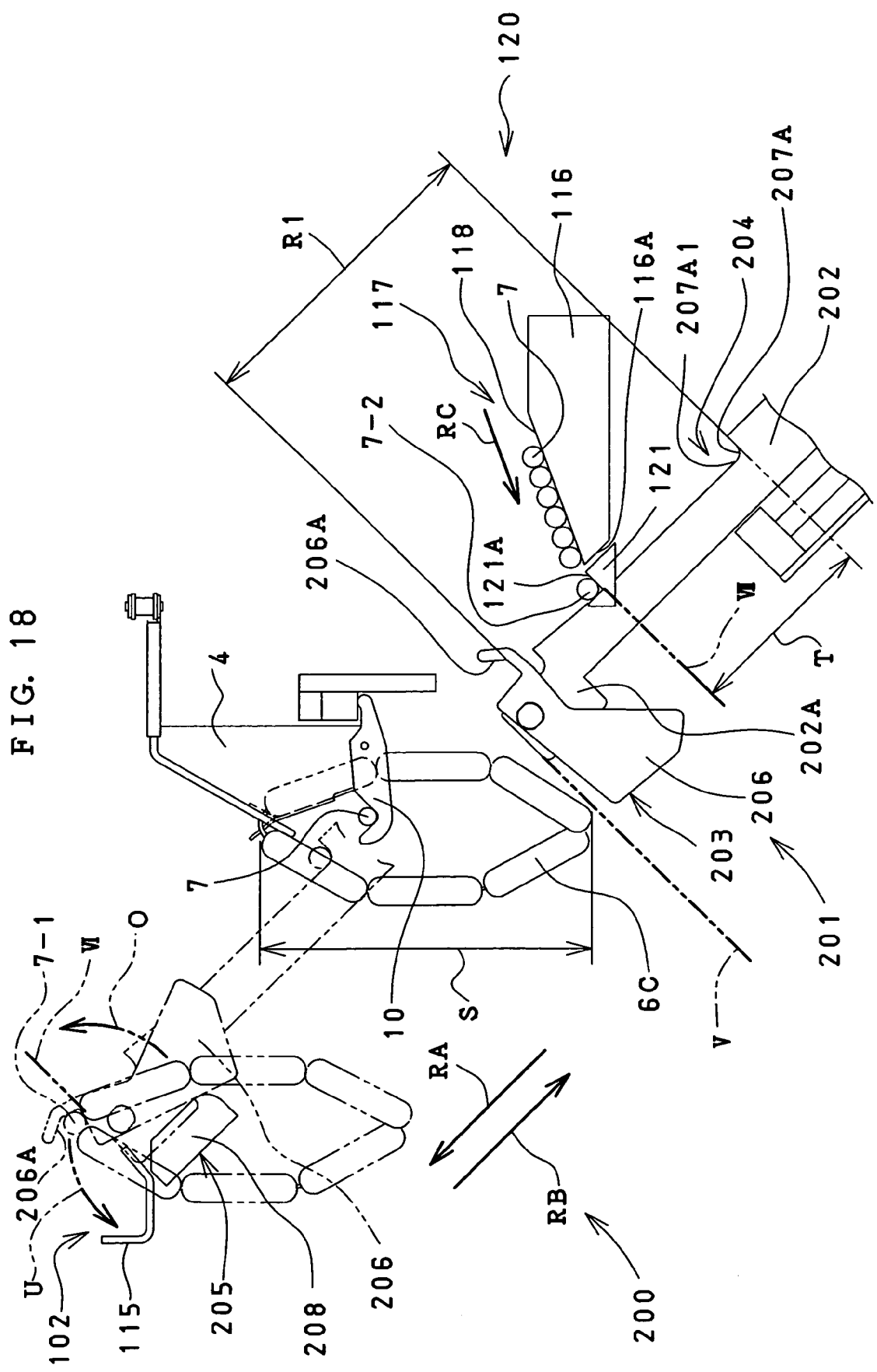
FIG. 18 is a partially enlarged right side view of an apparatus in accordance with still another embodiment of the invention.

FIG. 18 denotes an apparatus 200 in accordance with another embodiment having a stick transferring means 201 and a stick supplying means 120. The stick transferring means 201 of this apparatus 200 has a substantially identical construction to that of the stick transferring means 101 of the above-described apparatus 100 excluding a stick reciprocally transferring means (a pair of arms) 202 and a removed-stick holding means 203 provided in each arm 202. The stick transferring means 201 has the pair of arms 202, the pair of removed-stick holding means 203, a pair of supply-stick holding means 204, and a pair of stick discharging means 205.

The removed-stick holding means 203 and the supply-stick holding means 204 are provided on each arm 202 and are spaced apart at a distance R1 therebetween. The removed-stick holding means 203 has a stick holding hook 206 attached rotatably to a front portion 202A of the arm 202. The stick holding hook 206 has a hook shape, and has a stick placing surface 206A for holding the stick 7. The stick holding hooks 206 are disposed as a pair in such a manner as to oppose each other in the longitudinal direction of the stick 7, and are adapted to hold the front portion 7A and the rear portion 7B of the removed stick 7-1. The supply-stick holding means 204 is constituted by a recessed portion 207A having a stick placing surface 207A1, and its construction and action are substantially identical to those of the recessed portion 109A of the apparatus 100. The recessed portion 207A of the arm 202 at the lowered end position V is positioned a distance T rearwardly of the stick supplying position VII of the stick supplying means 120 which will be described later.

The stick discharging means 205 has a rotationally driving member 208 constituted by a cam member for rotating the stick holding hook 206 in the direction of arrow 0. The rotationally driving member 208 is subjected to abutment by the stick holding hook 206 which rises in the direction of arrow RA, so as to rotate the stick holding hook 206. The stick holding hook 206 abuts against the rotationally driving member 208 at the raised end position VI and thereby rotates in the direction of arrow 0, discharging the removed stick 7-1 on the stick placing surface 206A toward the stick receiving stand 115 in the direction of arrow U.

The stick supplying means 120 differs from the above-described stick supplying means 103 in that it has a supply-stick receiving member 121. The supply-stick receiving member 121 is disposed on a downstream side, as viewed in the stick moving direction (in the direction of arrow RC), of and adjacent to the moving end portion 116A of the sticks accommodating section 116. The stick supplying means 120 has a V-shaped supply-stick receiving surface 121A for receiving, positioning, and supporting the single stick 7, i.e., the supply stick 7-2, which has been moved from the stick accommodating section 116 laterally of the stick 7. The recessed portions 207A which move diagonally upward in the direction of arrow RA receive the supply stick 7-2 by abutting against the supply stick 7-2 on the supply-stick receiving members 121, and continue rising toward the stick supporting members 10-1 and 10-4 while holding the supply stick 7-2.

With the apparatus 200 having the stick supplying means 120, since the interval R1 between the stick placing surface 206A and the recessed portion 207A can be made large, in a case where the loops 6C whose suspended length S is long are suspended from the removed stick 7-1, the arms 202 make it possible to complete the transfer of the loops 6C onto the removed stick 7-1 without causing the supply stick 7-2 to abut against the loops 6C.

Figure 19:
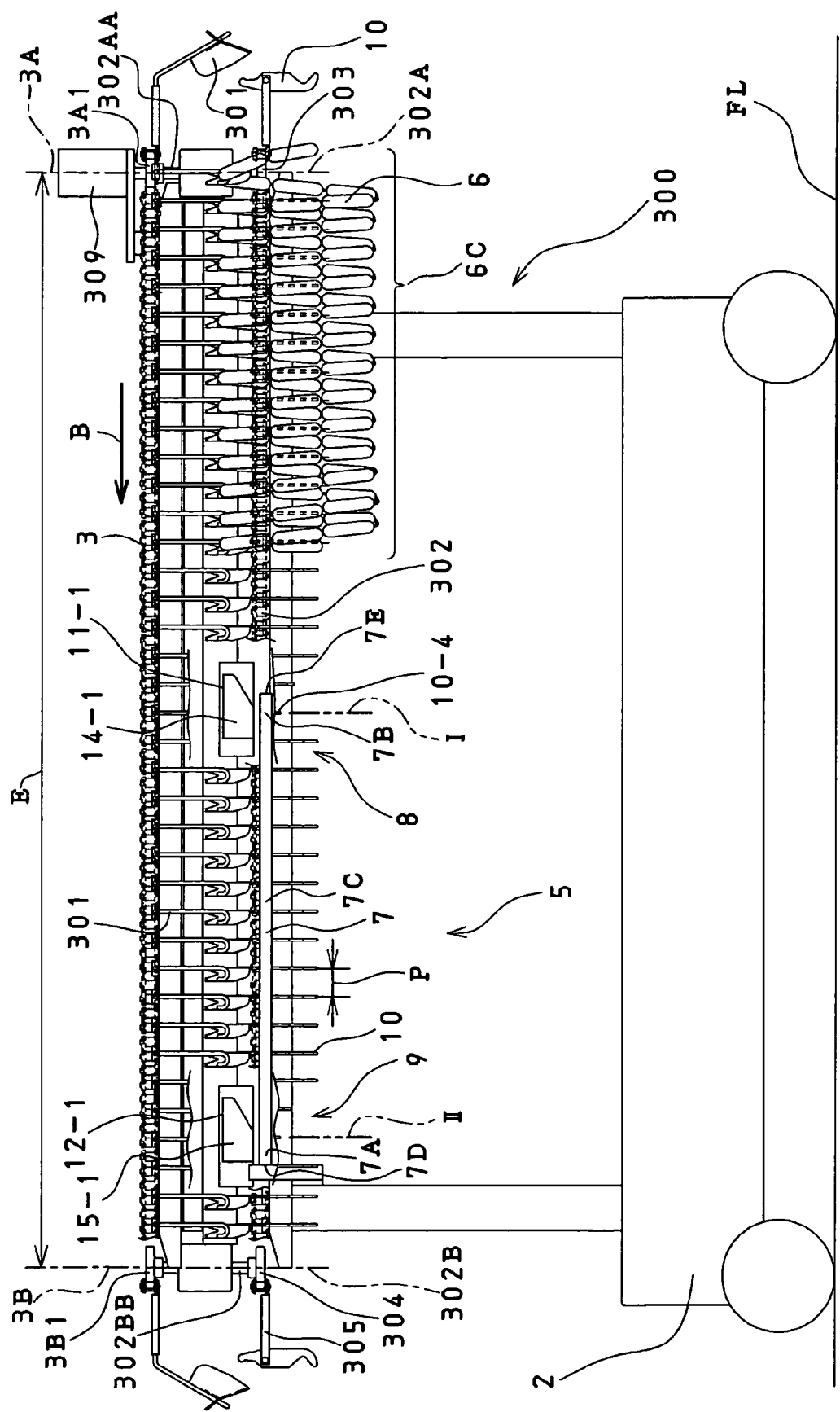
FIG. 19 is a front elevational view of an apparatus in accordance with still another embodiment of the invention.
Figure 20:
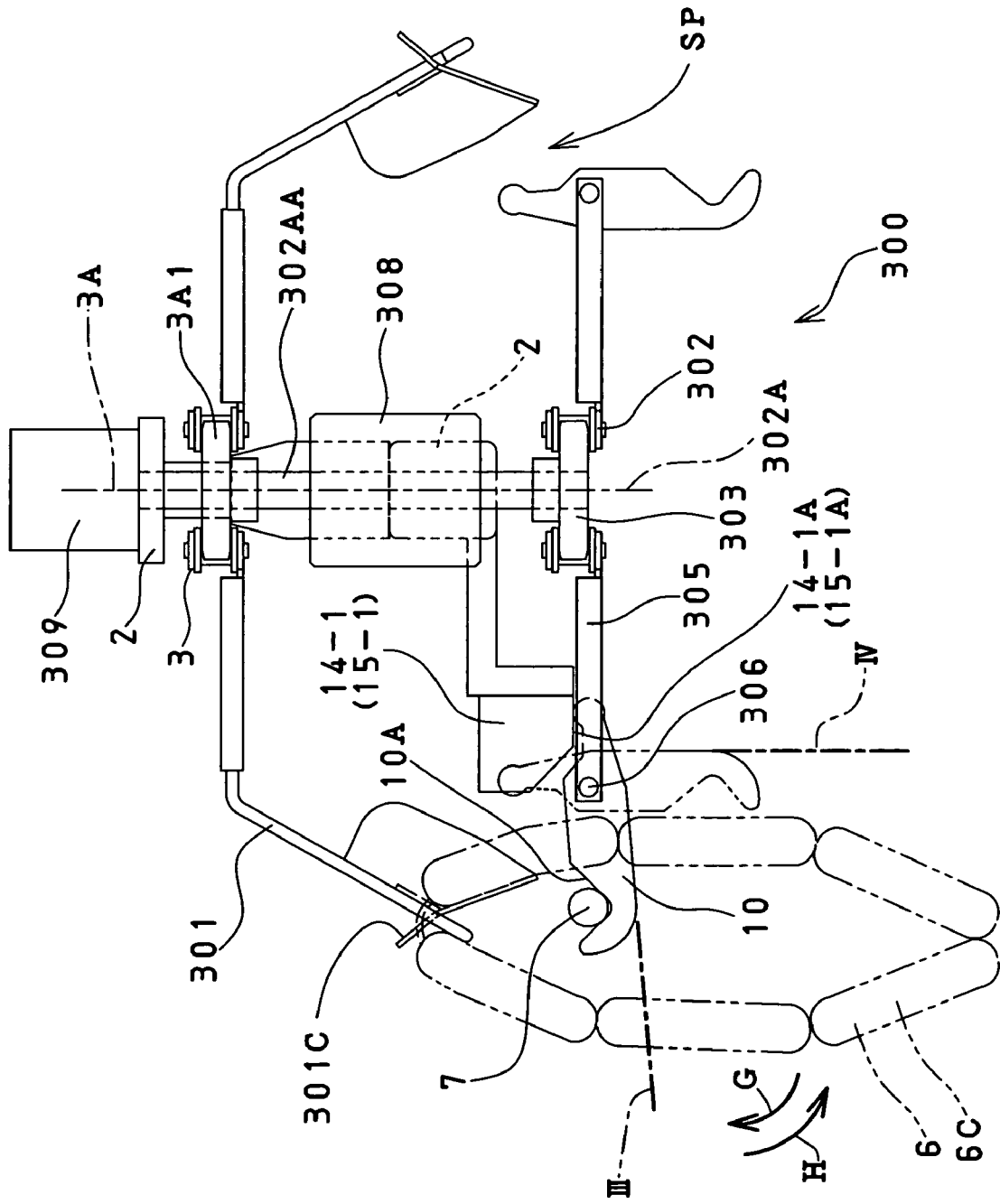
FIG. 20 is a partially enlarged left side view of the apparatus shown in FIG. 19.

In FIGS. 19 and 20, an apparatus 300 is different from the apparatus 1 in that the stick supporting members 10 are provided on the second endless circulating body that is disposed below the endless circulating body 3. The apparatus 300 includes the endless circulating body 3 put around the first rotational axis 3A and the second rotational axis 3B spaced from the first rotational axis 3A by the distance E, the stick supporting means 5, hooks 301 provided on the endless circulating body 3, and the second endless circulating body 30.

The stick supporting means 5 includes a stick rear-portion supporting means 8 having a rear portion cam member 14-1 serving as a stick rear-portion supporting member actuating means 11-1 and a stick front portion supporting means 9 having a front portion cam member 15-1 serving as a stick front portion supporting member actuating means 12-1. The rear and front portion cam members 14-1 and 15-1 have sliding guiding surfaces 14-1A and 15-1A, respectively, for guiding the rear portion 10B of a stick supporting member 10 such that the stick supporting member 10 swings between the stick supporting position III and the lowered end position IV on a perpendicular line. The stick supporting members 10 are disposed below the hook portions 301C of hooks 301. The second endless circulating body 302 is put around a third rotational axis 302A and a fourth rotational axis 302B spaced from the third rotational axis 302A.

It further includes sprockets 303 and 304 disposed on the third and fourth rotational axes 302A and 302B, respectively, arms 305 attached to the second endless circulating body 302 with a predetermined pitch P, shafts 306 fixed to the arms 305 to support the stick supporting members 10 for rotation, a drive shaft 302AA to which a sprocket 3A1 and sprocket 303 are fixed, a bearing body 308 for the drive shaft 302AA, a motor 309 attached to the apparatus frame 2 for driving the drive shaft 302AA, and an idler shaft 302BB to which a sprocket 3B1 and a sprocket 304 are fixed. The third and fourth rotational axes 302A and 302B are concentric with the first and second rotational axes 3A and 3B, respectively.

The stick support members 10 are attached to the second endless circulating body 302 via the arms 305 for rotation and, as the stick supporting members 10 of the apparatus 1, moved by the rear portion cam member 14-1 and the front portion cam member 15-1 and down in the directions of arrows G and H between the stick supporting positions III and the lowered end position IV. The endless circulating body 3 and the second endless circulating body 302 are driven by the drive shaft 302AA for synchronous circulation. There is provided a space SP between the hook 301 and the stick supporting member 10 so that it is easy to process the end of the loop 6C.

Figure 21:
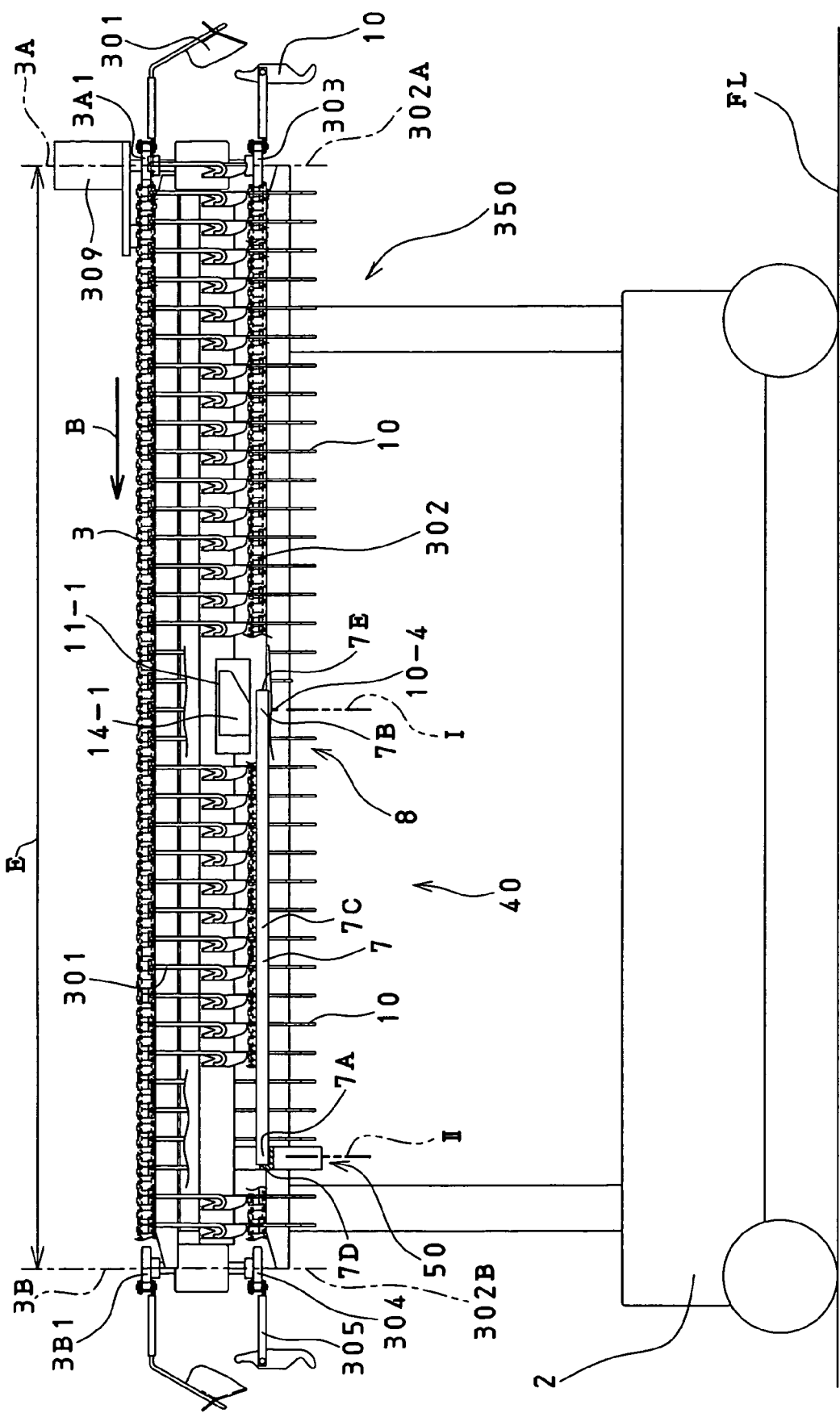
FIG. 21 is a front elevational view of an apparatus in accordance with still another embodiment of the invention.

In FIG. 21, an apparatus 350 is different from the apparatus 300 in that the stick supporting means 5 is replaced by a stick supporting means 40. the stick supporting means 40 includes the stick rear portion supporting means 8 and a stick front portion supporting means 50 to support the rear portion 7B of the stick with the stick supporting members 10 and the front portion 7A with the stick front portion supporting means 50 while not support the intermediate portion 7C. The stick supporting members 10 are spaced from the rear portion 7B of the stick so that it is easy to grasp the stick 7 with the hand where the worker lifts the stick 7 from the stick supporting members 10.

Figure 22:
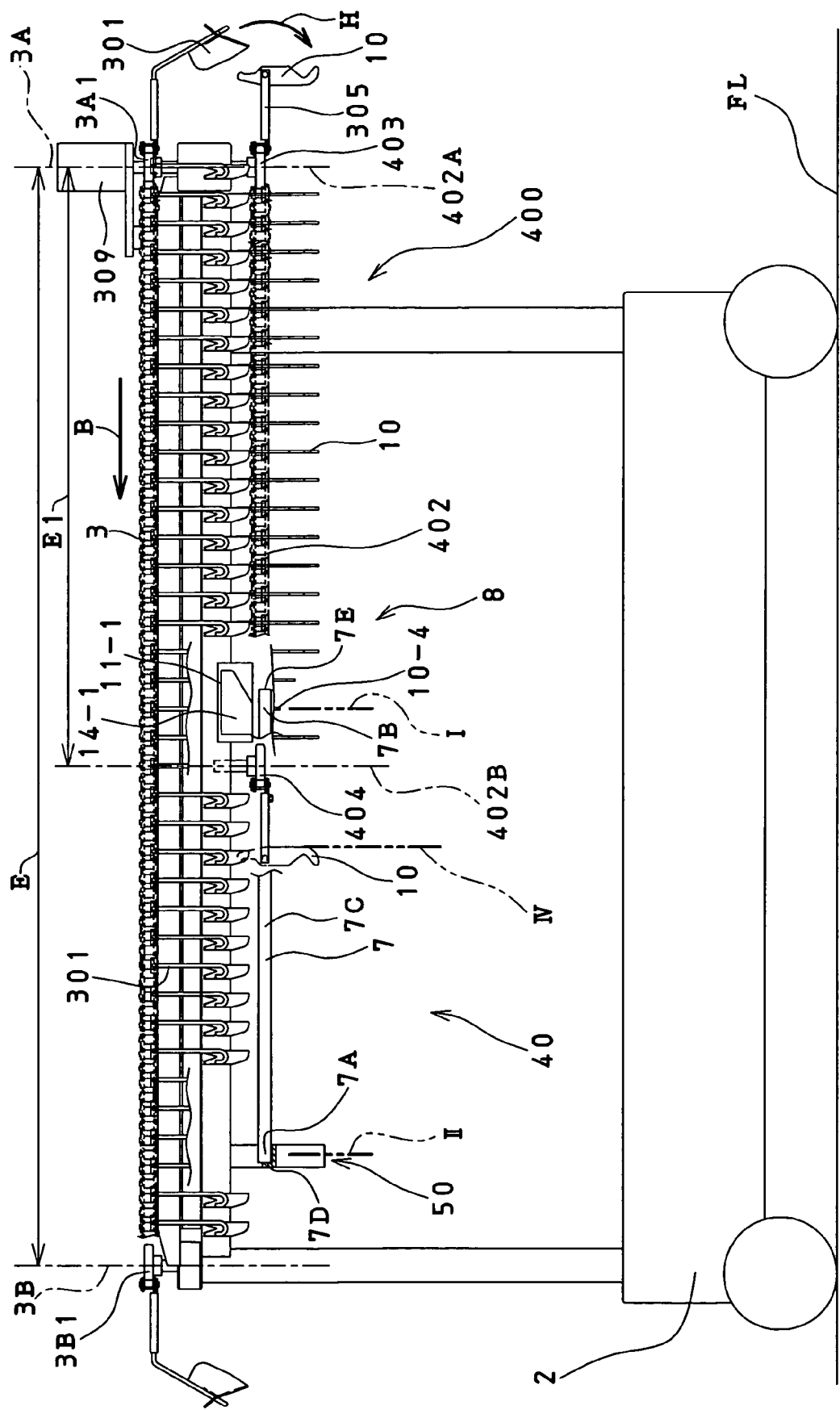
FIG. 22 is a front elevational view of an apparatus in accordance with still another embodiment of the invention.
Figure 23:
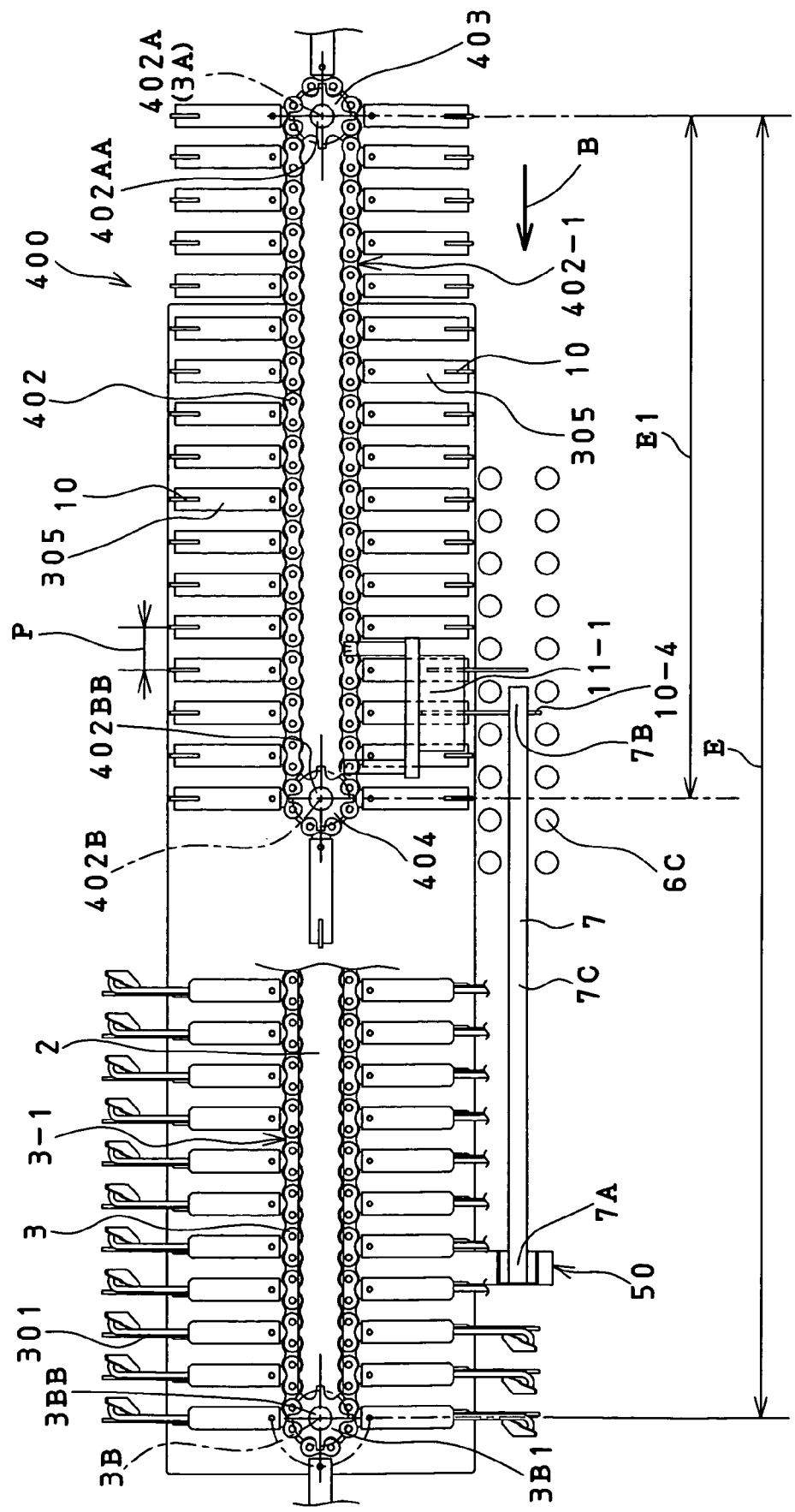
FIG. 23 is a partially broken plan view of the apparatus of FIG. 22.

In FIGS. 22 and 23, an apparatus 400 is different from the apparatus 350 in that a fourth rotational axis is disposed between the first and second rotational axes 3A and 3B. The apparatus 400 includes a second endless circulating body 402 put around the third rotation axis 402A concentric with the first rotation axis 3A and the fourth rotation axis 402B disposed at a position spaced from the third rotational axis 402A by a distance E1, and a driving shaft 402AA, and sprockets 403 and 404 disposed on the third and fourth rotational axes 402A and 402B, respectively, and an idler shaft 402BB fixed to the apparatus frame 2, to which sprockets 404 is provided. The stick supporting members 10 are lowered by the rear cam members 14 in the H direction with respect to the stick 7 such that the stick supporting members 10 are removed from the loops 6C of the sausage 6 and then rotated about the fourth rotation axis 402B. In this way, the apparatus 400 includes the second endless circulating body 402 having the moving path 402-1 that is different from the moving path 3-1 of the endless circulating body 3. Thus, the apparatus 400 enables to reduce the number of the stick supporting members 10 more than the apparatus 300.

Figure 24:
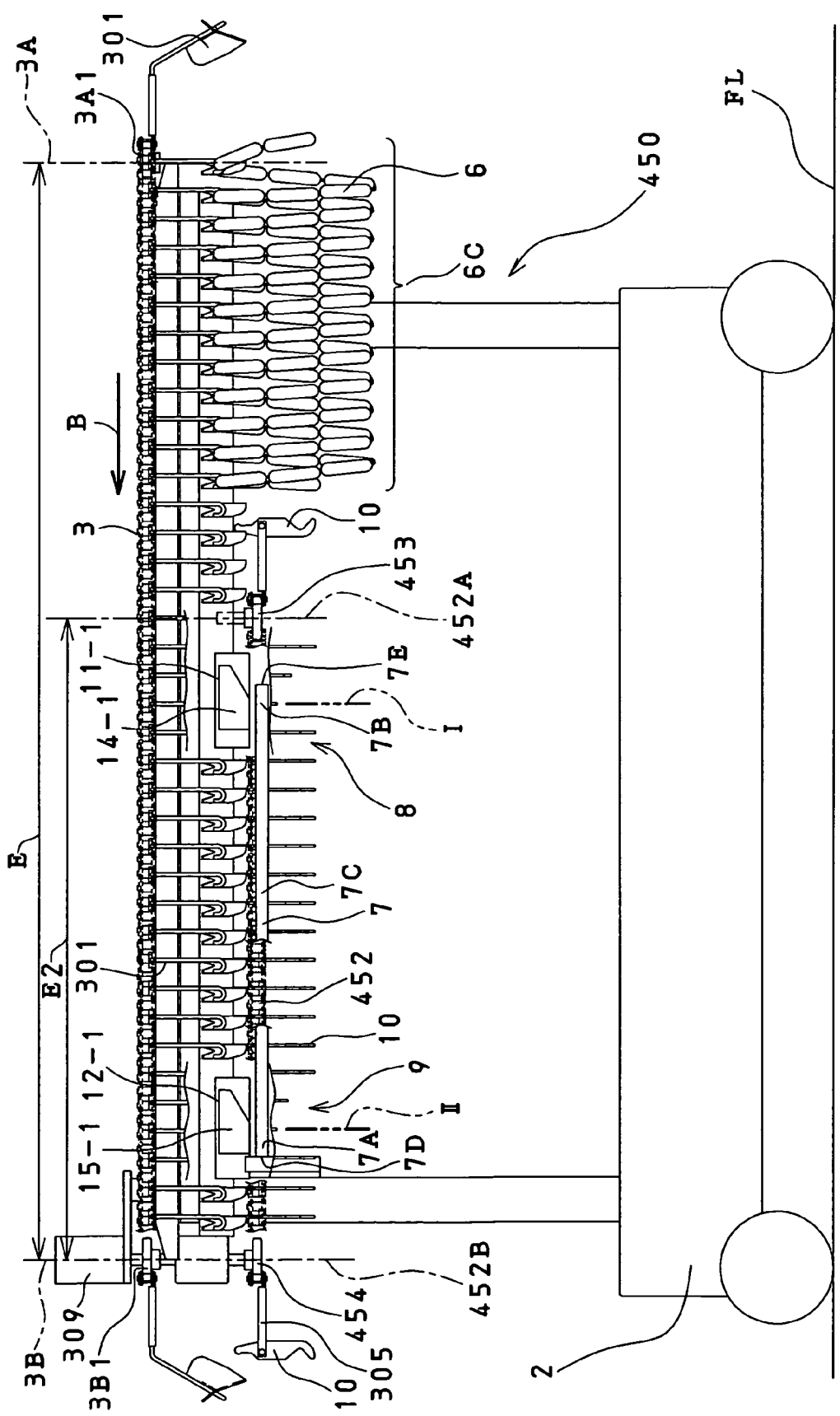
FIG. 24 is a front elevational view of an apparatus according to still another embodiment of the invention.
Figure 25:
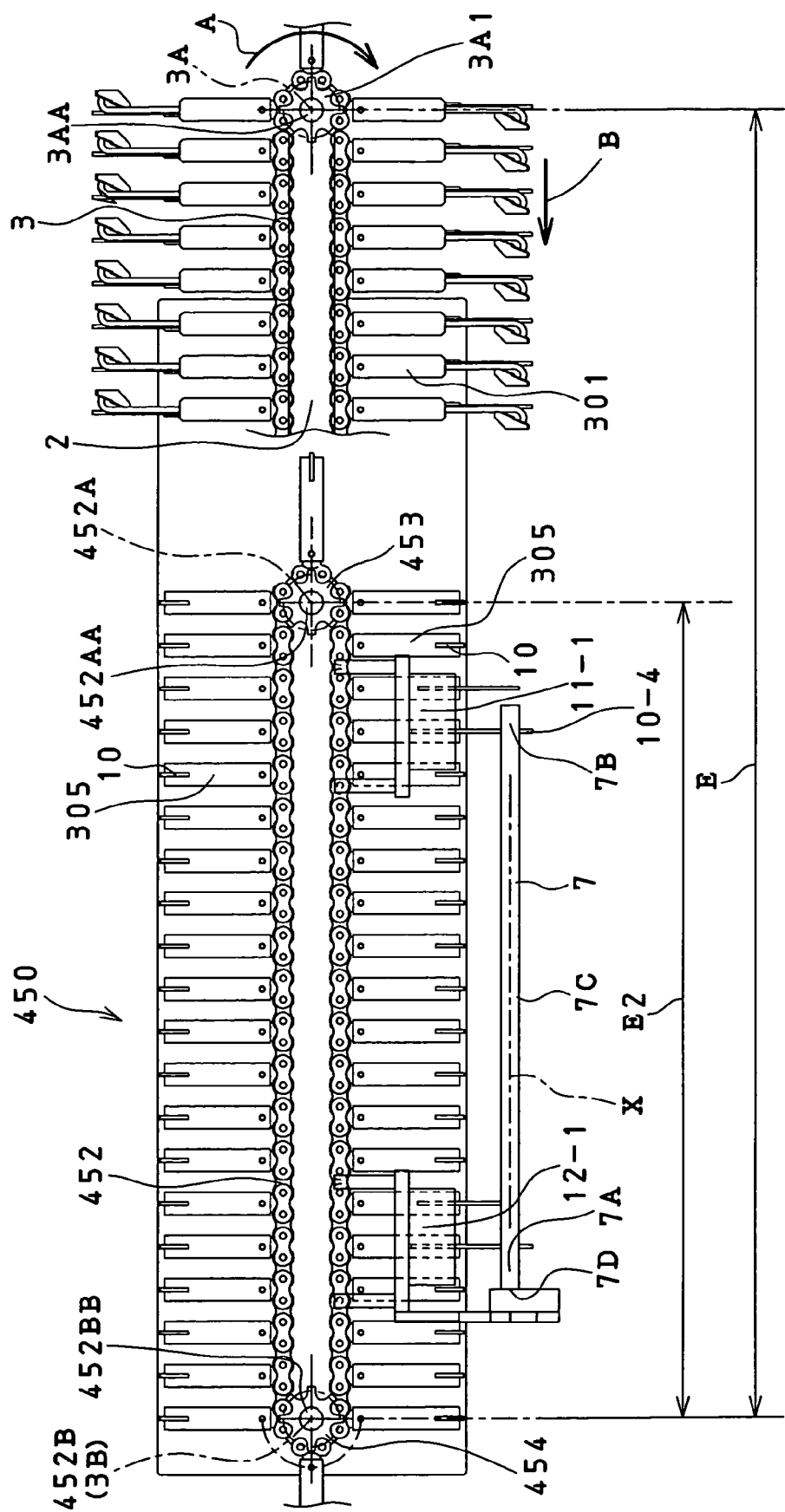
FIG. 25 is a partially broken plan view of the apparatus of FIG. 24.
Figure 26:
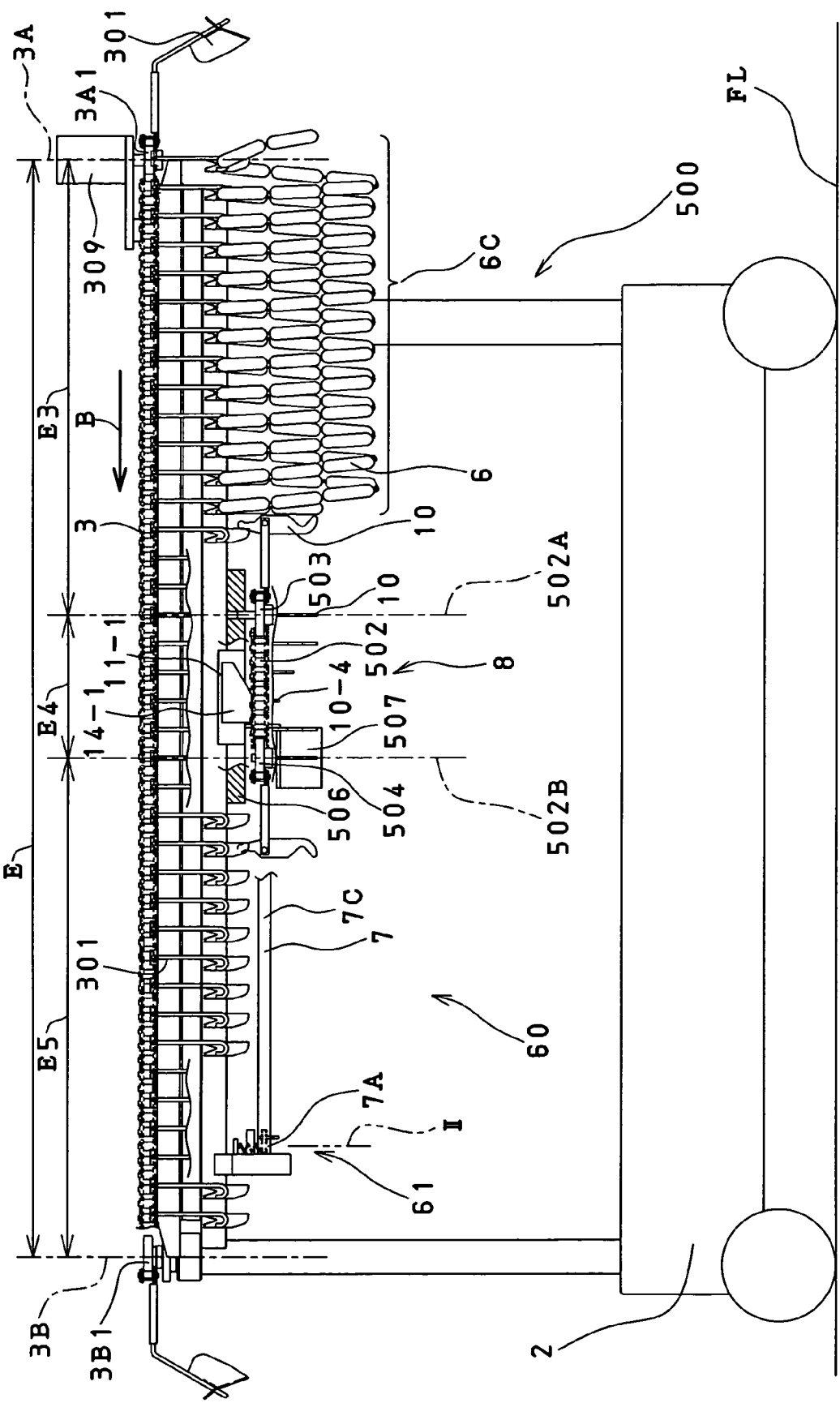
FIG. 26 is a front elevational view of an apparatus according to still another embodiment of the invention.
Figure 27:
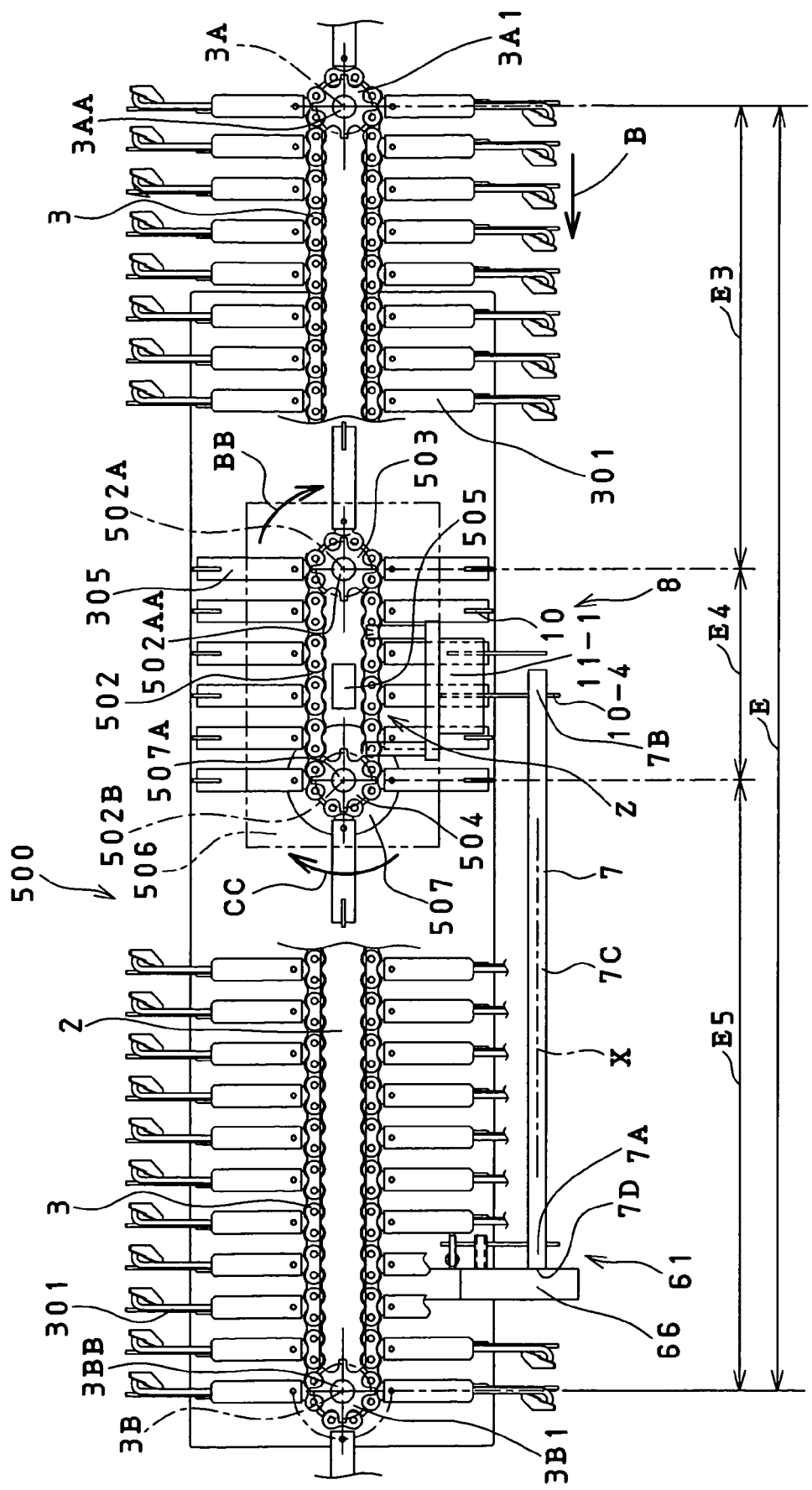
FIG. 27 is a partially broken plan view of the apparatus of FIG. 26.
Figure 28:
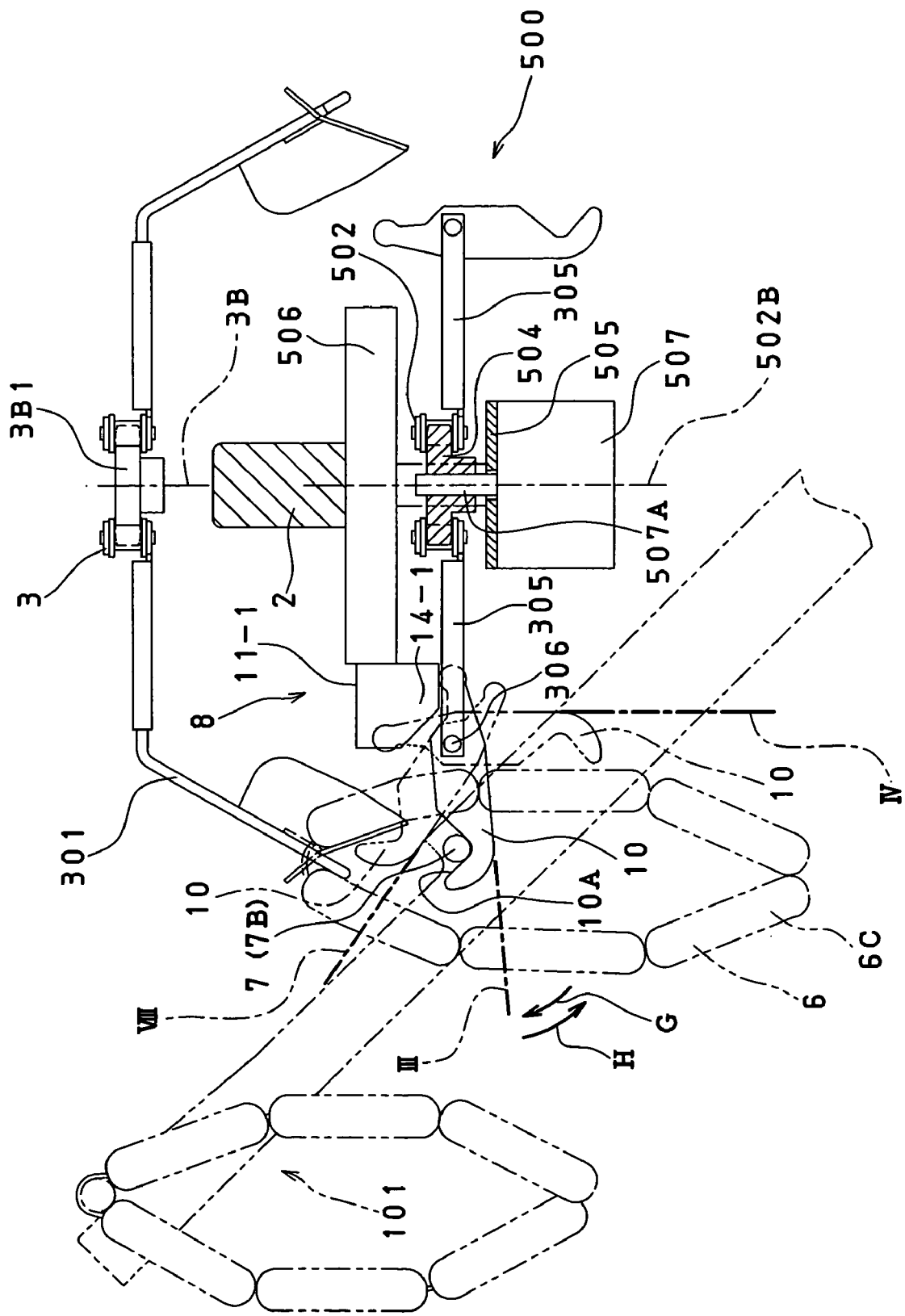
FIG. 28 is a partially enlarged right side view of the apparatus of FIG. 26.

In FIGS. 24 and 25, an apparatus 450 is different from the apparatus 300 in that the third rotational axis is disposed between the first and second rotational axes 3A and 3B. The apparatus 450 includes the second endless circulating body 452 put around the fourth rotational axis 452B which is concentric with the second rotational axis 3B and the third rotational axis 452A disposed at a position spaced from the fourth rotational axis 452B by a distance E2, an idler shaft 452AA, a driving shaft 452BB, and sprockets 453 and 454 disposed on the third and fourth rotational axes 452A and 452B, respectively. The apparatus 450 also enables to reduce the number of the stick supporting members 10. Also, it has no stick supporting members 10 circulating between the first and third rotational axes 3A and 452A so that it is easy to process the end of sausage 6.

In FIGS. 26-29, an apparatus 500 is different from the apparatus 300 in that the third and fourth rotational axes are disposed between the first and second rotational axes 3A and 3B. The apparatus 500 includes the second endless circulating body 502 put around the third rotational axis 502A disposed at a position spaced from the first rotational axis 3A by a distance E3 and the fourth rotational axis 502B spaced from the third rotational axis 502A by a distance E4, and sprockets 503 and 504 disposed on the third and fourth rotational axes 502A and 502B, respectively. The fourth rotational axis 502B is spaced from the second rotational axis 3B by a distance E5. Further, it includes a bracket 506 attached to the apparatus frame 2, to which the rear portion cam member 14-1, an idler shaft 502AA for a sprocket 503, and a motor base 505 are fixed, and a motor 507 for driving the second endless circulating body 502, which has a shaft 507A to which a sprocket 504 is fixed.

The apparatus 500 is different from the apparatus 300 in that the stick supporting means 5 is replaced by a stick supporting means 60. The stick supporting means 60 includes the stick rear portion supporting means 8 and a stick front portion supporting means 61. The rear portion cam member 14-1 of the stick rear portion supporting means 8 raises the lowered stick supporting members 10, which are moving in the direction of arrow B in the region Z along the longitudinal axis X of the stick 7, toward the rear portion 7B and then lowers them that are moving in the region Z. Thus, the stick supporting members 10 enter between the loops 6C while moving along the longitudinal axis X of the stick 7 and come out of the loops 6C. Consequently, it is prevented that the stick supporting members 10 hook the loops 6C when they are turned into the region Z by rotation about the third rotational axis 502A in the direction of arrow BB or from the region Z by rotation about the fourth rotational axis 502B in the direction of arrow CC.

Figure 29:
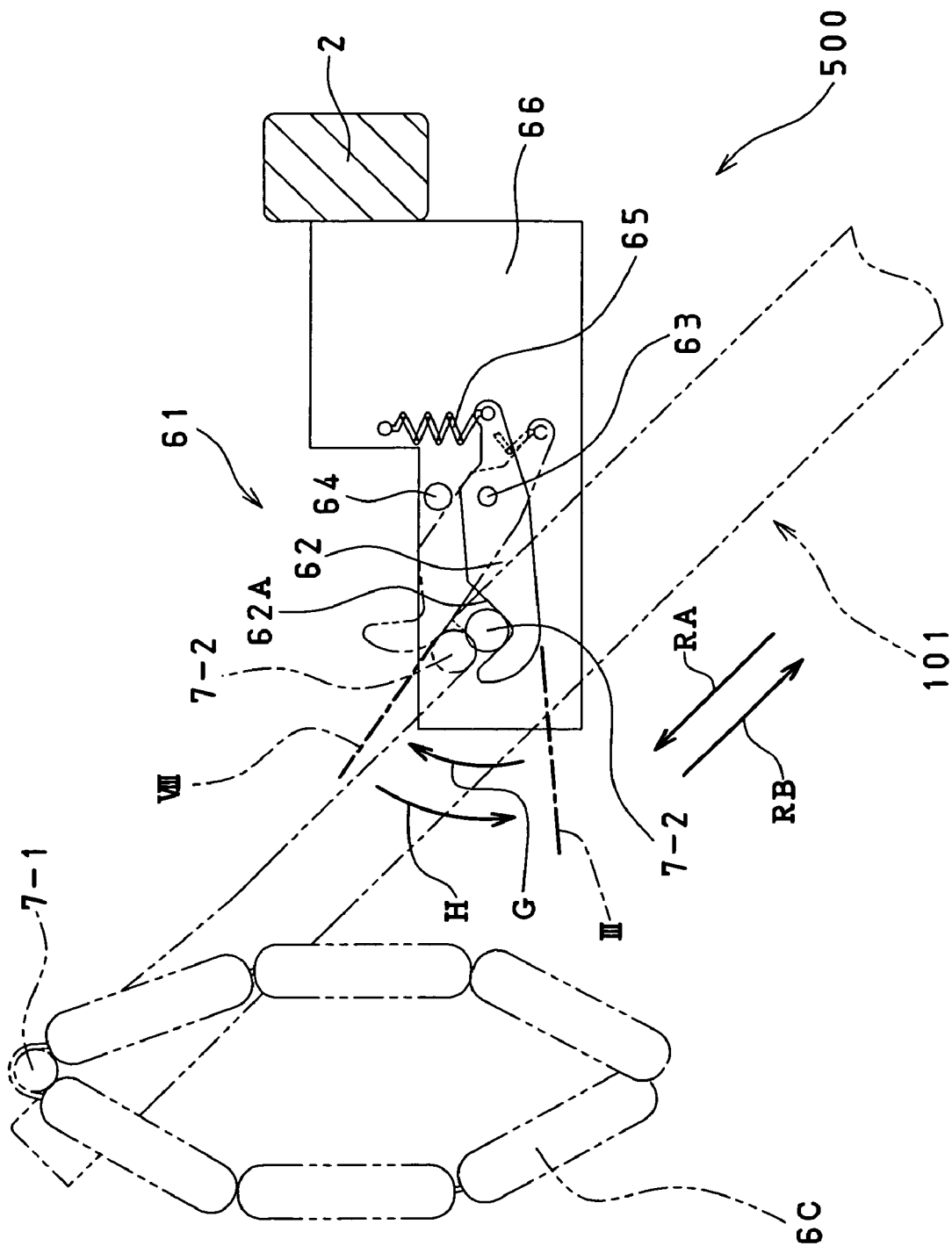
FIG. 29 is a right side view of a stick supporting means according to still another embodiment of the invention.

As shown in FIG. 29, the stick front portion supporting means 61 can be used with a stick transferring means 101. The stick front portion supporting means 61 includes a stick front portion supporting member 62 for supporting the front portion 7A of the stick 7, a shaft 63 for supporting the stick front portion supporting member 62 for swinging motion in the directions of arrows G and H, a spring 65 for abutting the stick front portion supporting member 62 against the stopper 64, and a bracket 66 fixed to the apparatus frame 2, to which the shaft 63, the stopper 64, and the spring 65 are attached and against which the front end 7D of the stick 7 abuts. The stick front portion supporting member 62 raised by the supply stick 7-2 is quickly returned by the spring 65 to the stick supporting position III.

Figure 30:
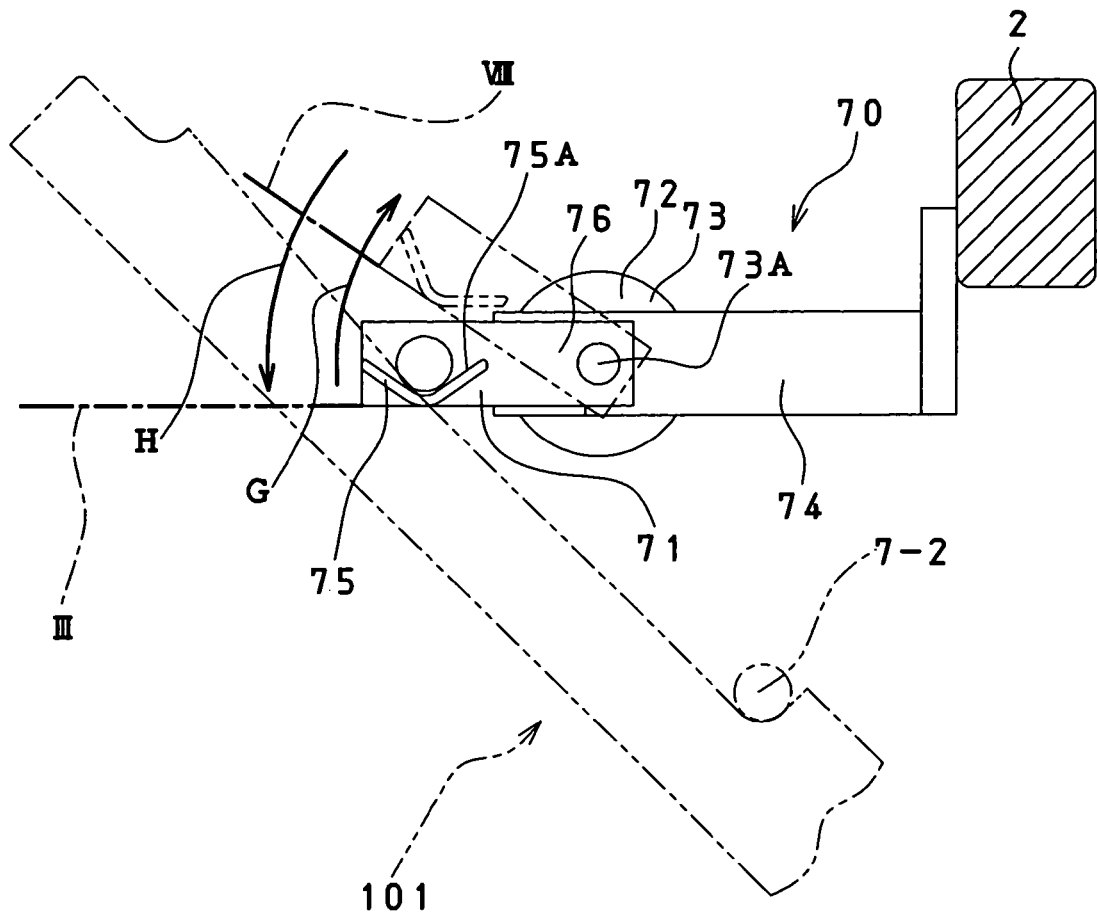
FIG. 30 is a right side view of a stick supporting means according to yet another embodiment of the invention.
Figure 31:
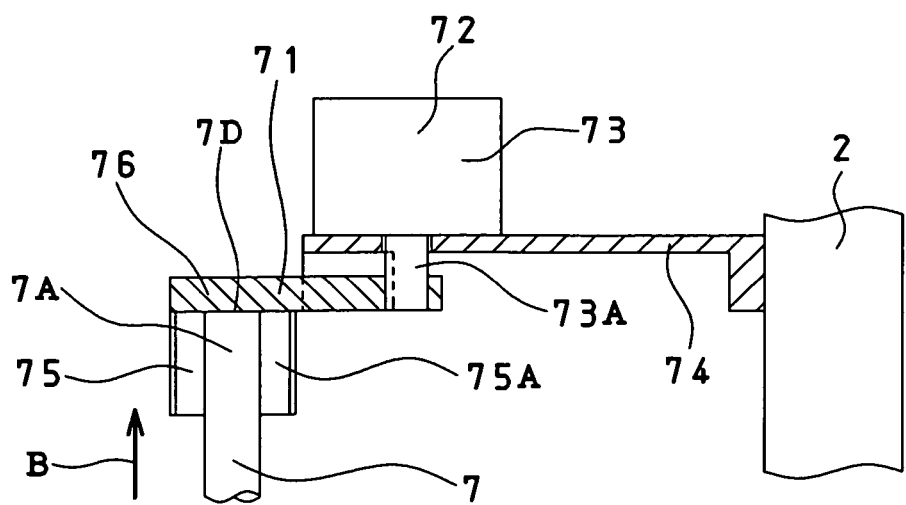
FIG. 31 is a plan sectional view of the stick supporting means of FIG. 30.

Another stick front portion supporting means 70, which can be used with the stick transferring means 101, will be described with reference to FIGS. 30 and 31. The stick front portion supporting means 70 includes a stick front portion supporting member 71, a stick front portion supporting member swinging means 72, e.g., rotary actuator 73, and a bracket 74 fixed to the apparatus frame 2, to which the means 72 is attached. The stick front portion supporting member 71 has a stick placing section 75 with a stick placing surface 75A, and a stick stopper 76 for abutment against the front end 7D of the stick 7 to stop movement of the stick 7 in the hook moving direction (arrow B direction). The stick stopper 76 is fixed to the rotational shaft 73 of the rotary actuator 73. The rotary actuator 73 rotates in the directions of arrows G and H to raise the stick front portion supporting member 71 to the upper position VIII before passage of the supply stick 7-2 and then lower it to the stick supporting position III after the passage of the removed stick 7-2. The means 72 returns the stick front portion supporting member 71 to the stick supporting position III so quickly that it is possible to shorten the stick supply cycle in the same way as the stick front portion supporting means 61.

In FIGS. 32-38, an apparatus 600 is made up by adding a stick supply means 601, a stick transferring means 602, a loop retaining force increasing means 603, and a stick receiving means 102 to the apparatus 500 and replacing the stick supporting means 40 instead of the stick supporting means 60.

Figure 32:
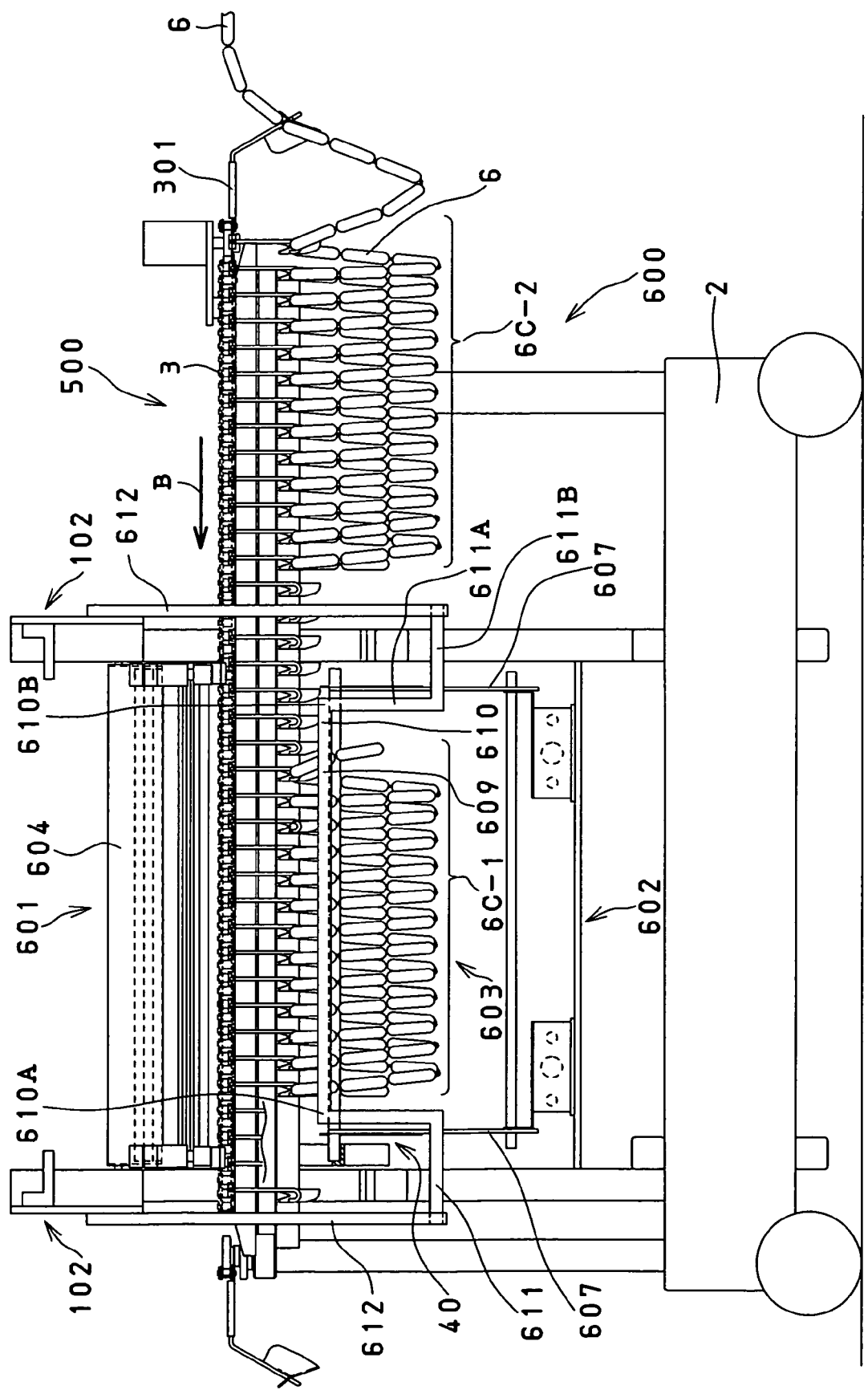
FIG. 32 is a front elevational view of an apparatus according to still another embodiment of the invention.
Figure 33:
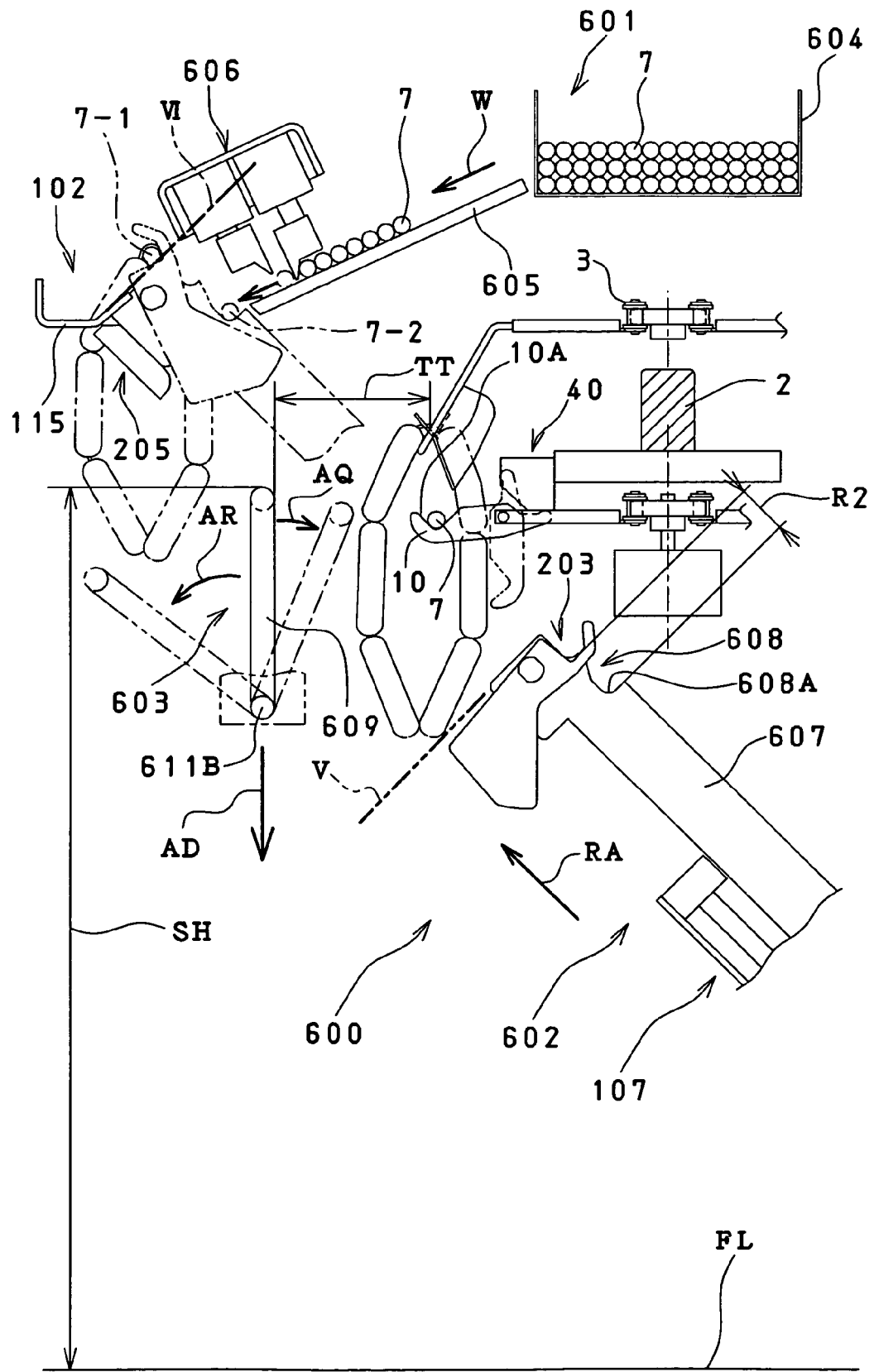
FIG. 33 is a partially right side view of the apparatus of FIG. 32.
Figure 34:
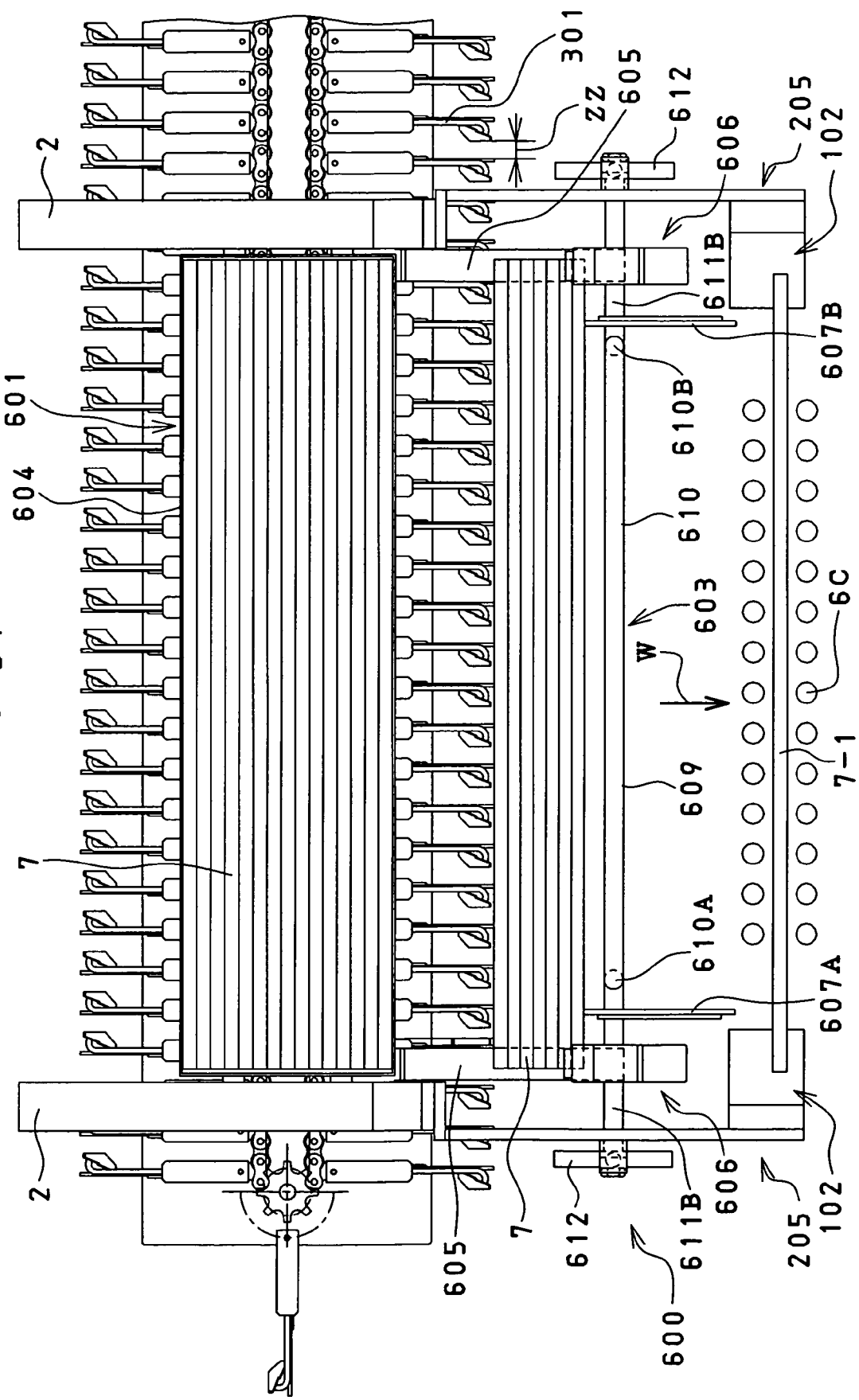
FIG. 34 is a partially enlarged plan view of the apparatus of FIG. 32.

In FIGS. 32-34, the stick supply means 601 includes a stick stock section 604 for stocking a plurality of sticks 7 above the endless circulating body 3, a stick guide section 605 extending downward from the stick stock section 604 in the direction of arrow W to support the sticks 7 taken out of the stick stock section 604, and a stick separation mechanism 606 provided above the stick guide section 605 to separate each of the sticks 7 disposed on the stick guide section 605. Since the stick supply means 601 is disposed above the endless circulating body 3, it is possible to make the apparatus smaller in a direction perpendicular to the longitudinal axis X of the stick.

Figure 35:
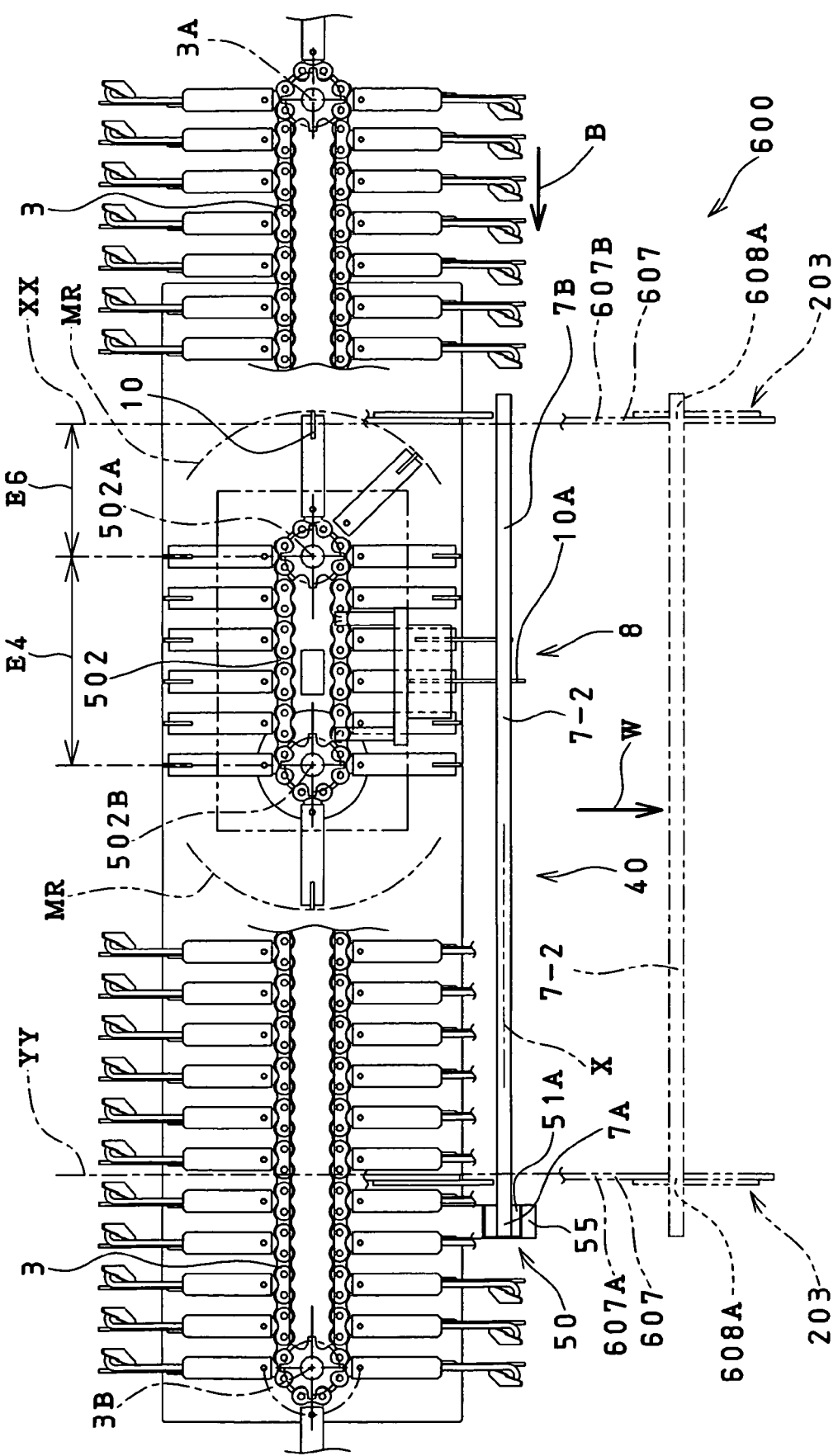
FIG. 35 is a partially broken plan view of the apparatus as viewed from the Z-Z direction of FIG. 32.

In FIG. 35, the stick transferring means 602 includes a stick reciprocally transferring means 607 having a supplied stick holding means 608 and a removed stick holding means 203, a stick reciprocally transferring means driving means 107 for reciprocating the stick reciprocally transferring means 607 between the lower end position V and the upper end position VI, and the stick discharging means 205. The stick reciprocally transferring means 607 is composed of a pair of a front transferring member 607A and a rear transferring member 607B provided in parallel to each other in a direction perpendicular to the longitudinal axis X of the stick 7 supported by the stick supporting means 40. The supplied stick holding means 608 has a pair of recesses 608A formed on the front and rear transferring members 607A and 607B. The recesses 608A are spaced rearward from the removed stick holding means 203 by a distance R2 so as to receive the stick from the stick supply means 601 while the stick transferring means 607 rests at the upper end position VI.

Figure 36:
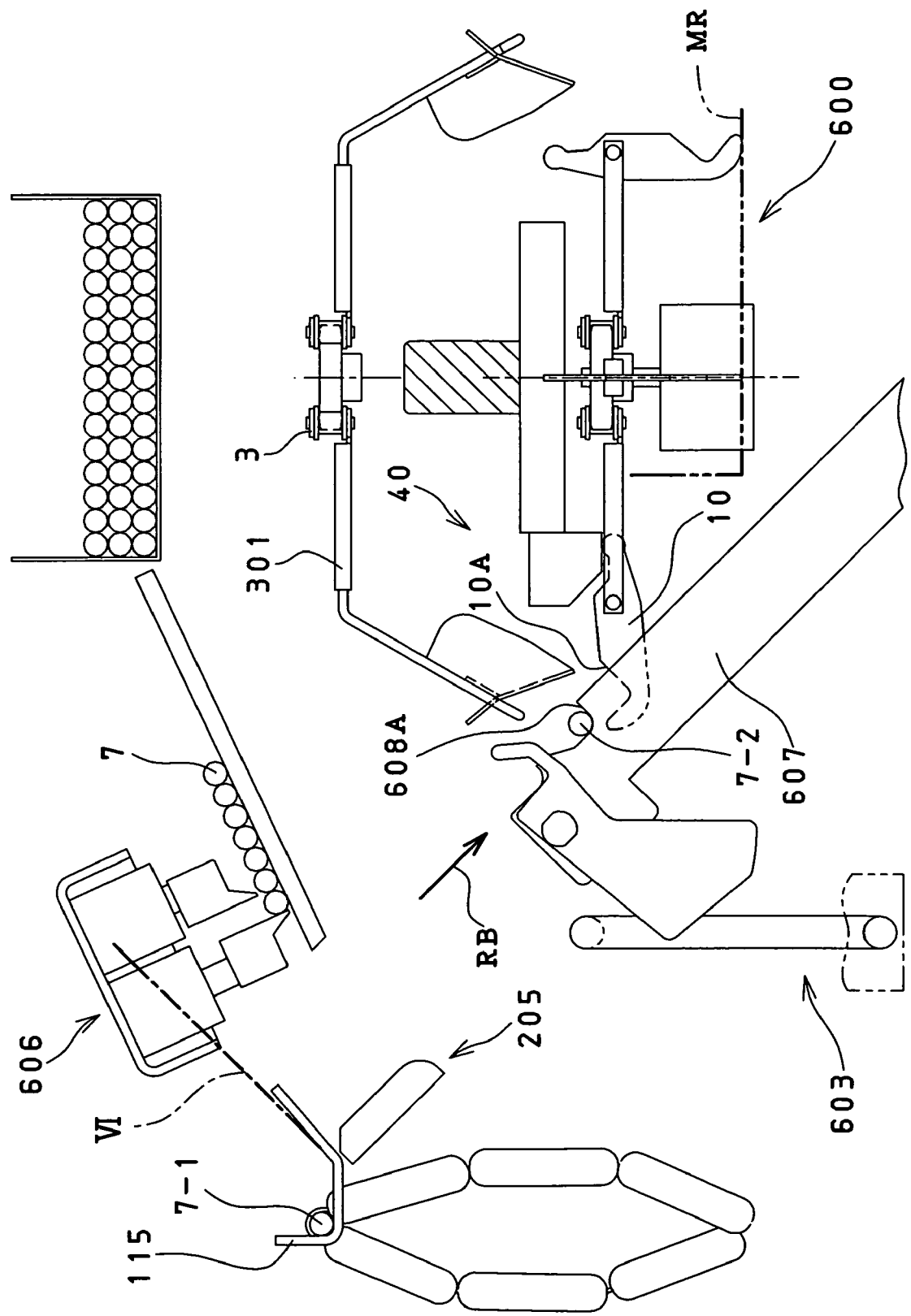
FIG. 36 is a partially enlarged right side view of the apparatus of FIG. 33.

When the discharged stick 7-1 is discharged to the stick receiving stand 115 of the stick receiving means 102 at the raised end position VI, the supplied stick 7-2 sliding down in the direction of arrow W is transferred from the stick guide section 605 to the recesses 608A. As shown in FIG. 36, the stick reciprocally transferring means 607 retreats from the raised end position VI in the direction of arrow RB, and the supplied stick 7-2 on the recesses 608A abuts against and received by the stick placing surfaces 10A and 51A.

In the apparatus 600, the stick 7 is supplied to the supplied stick holding means 608 of the stick reciprocally transferring means 607 which is raised, i.e., advanced beyond the stick supporting member 10 and the stick front portion supporting member 55, and transferred to the stick supporting member 10 and the stick front portion supporting member 55 from the supplied stick holding means 608 which is lowered, i.e., retreated beyond the stick supporting member 10 and the stick front portion supporting member 55. When the stick reciprocally transferring means 607 is raised (in the direction of arrow RA), since the stick reciprocally transferring means 607 does not transfer the stick 7, the loops 6C suspended from the stick 7 does not come into contact with the supplied stick 7-2. Consequently, the distance R2 is set smaller than the distance R of the apparatus 10 and the distance R1 of the apparatus 200 so that it is possible to make the raising and lowering strokes of the stick reciprocally transferring means 607 shorter than those of the apparatus 200 and 300.

As best shown in FIG. 35, the stick reciprocally transferring means 607 is disposed such that the rear transferring member 607B is raised and lowered in the moving path XX adjacent to the third rotational axis 502A between the first rotational axis 3A and the third rotational axis 502A along the longitudinal axis X of the stick 7 and the front transferring member 607A is raised and lowered in the moving path YY adjacent to the stick front portion supporting member 55 between the second rotational axis 3B and the fourth rotational axis 502B in the longitudinal axis X direction of the stick 7.

Since the front and rear transferring members 607A and 607B are raised and lowered outside of the moving region MR of the stick supporting member 10 of the stick rear portion supporting means 8 as shown in FIGS. 35 and 36, it is not necessary to stop the endless circulating body 3 and the second endless circulating body 502 when the stick reciprocally transferring means 607 is operated. As a result, it is possible to simultaneously form the loop 6C-2 of the sausage 6 and automatically transfer, to the stick 7-2, the loop 6C-1 that has been formed (FIG. 32).

In FIGS. 32-34 and 37, the loop retaining force increasing means 603 assures removal from the hook 301 of the loop 6C with a link 6B having a filling diameter d much larger than the space ZZ of adjacent hooks 301 (FIG. 34). The loop retaining force increasing means 603 has a pressure portion 610 and a loop pressing member 609 with a connection section 611.

The pressure portion 610 extends in the arranging direction of hooks 301 (direction of arrow B) and spaced from the hooks 301 by a distance TT, and engages the loop 6C-1 suspended from the stick 7 that moving upward between the hook 3-1 and the loop pressing member 609. The connection section 611 has a vertical portion 611A and a horizontal portion 611B and is formed integrally with the pressure portion 610 to connect the pressure portion 610 to the bracket 612 which is fixed to the apparatus frame 2 via the stick receiving means 102. Since the horizontal portion 611B is disposed below the pressure portion 610, the stick reciprocally transferring means 607 can pass through positions adjacent to opposite ends 610A and 610B of the pressure portion 610. The loop pressing member 609 is composed of the pressure portion 610 formed as a rod, but it is understood that the loop pressing member may take other shapes. For example, it may be a rectangular body made up of plate member having the pressure portion 610 and the vertical portion 611A as two sides.

Figure 37:
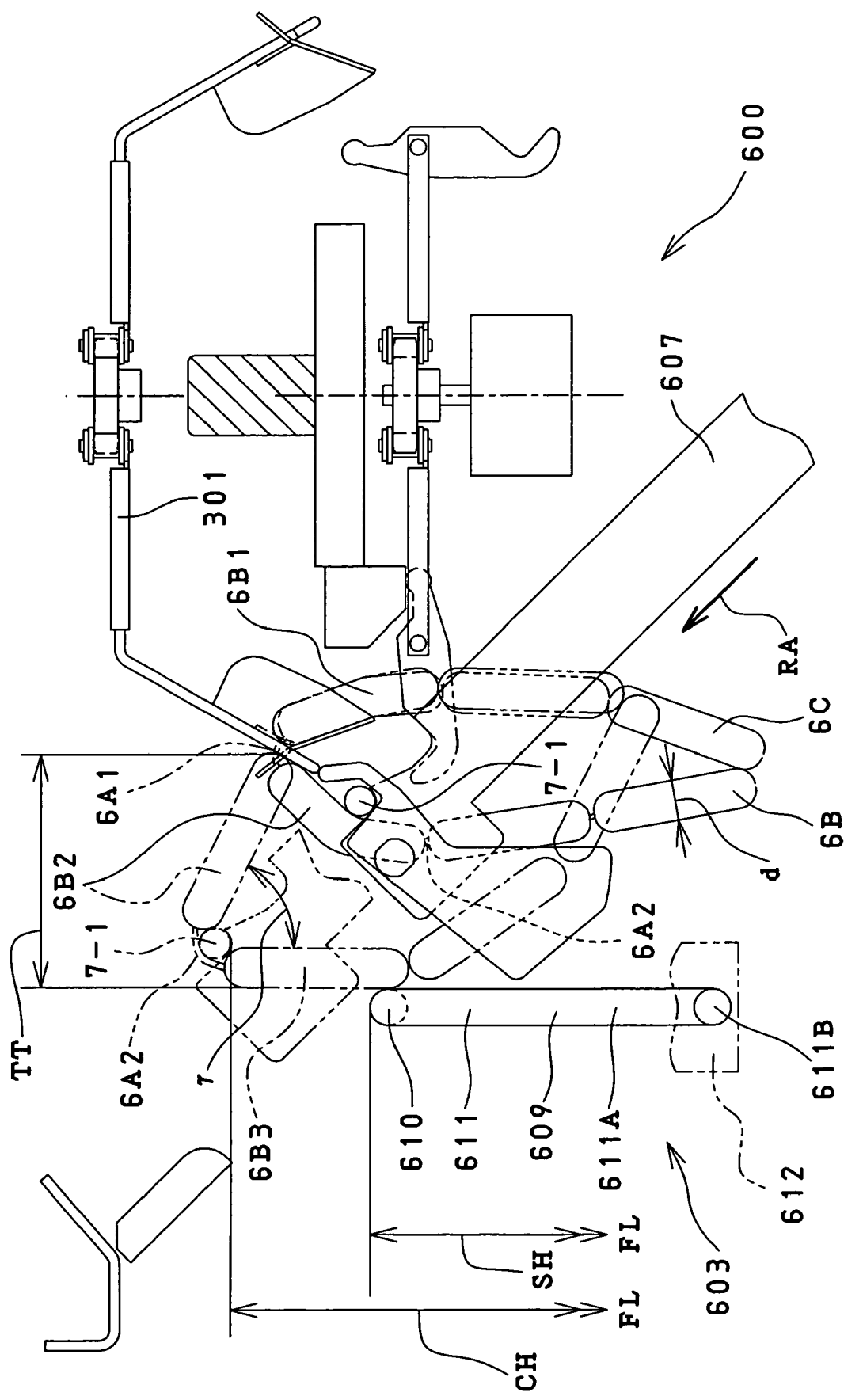
FIG. 37 is a partially enlarged right side view of the apparatus of FIG. 32.
Figure 38:
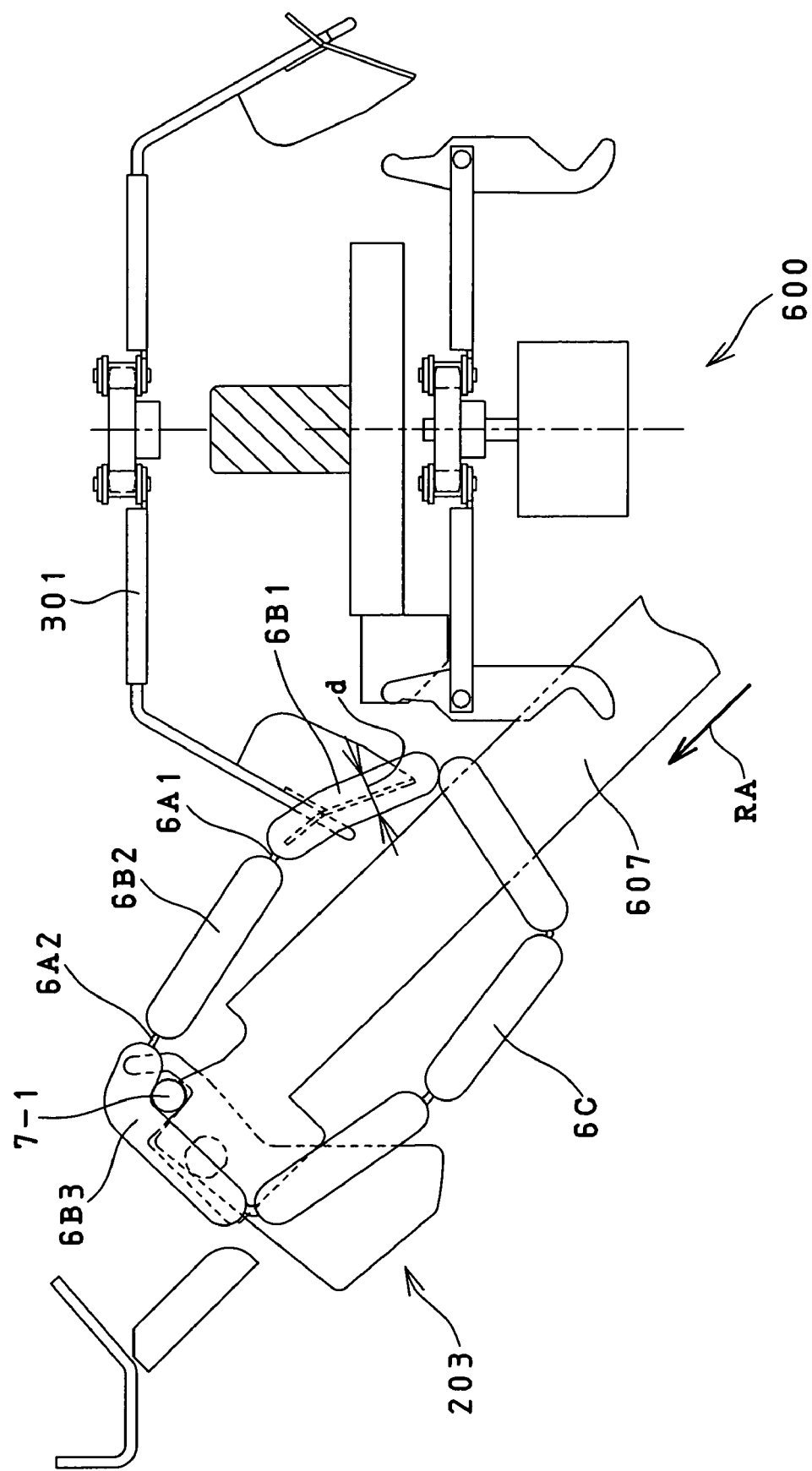
FIG. 38 is a partially enlarged right side view of the apparatus of FIG. 32.

As shown in FIG. 38, when the link 6B having a large filling diameter d hardly passes through between the hooks 301 in the raising process of the removed stick 7-1 by the stick reciprocally transferring means 607, the stick 7-1, which engages with the twisted portion 6A2 to pull the loop 6C, is disengaged with the twisted portion 6A2 and raised upward. To prevent this, as shown in FIG. 37, the pressure portion 610 is disposed at a height SH lower than the height CH of the discharged stick 7-1 at which it moves upward, pushing up the link 6B2 and engages with the twisted portion 6A2 so that it is possible to keep the angles γ of the rear and front links 6B2 and 6B3 with respect to the discharged stick 7-1 within a predetermined range. Thus, the upward movement of the discharged stick 7-1 removes the loop 6C from the hook 301 without failure.

As best shown in FIG. 33, the loop pressing member 609 is fixed in a stationary state to the apparatus frame 2 spaced from the hook portions by a constant distance TT. It may be made to escape from the loops 6C at an appropriate time such that the loops 6C transferred to the stick 7 readily pass over the loop pressing member 609. For example, the loop pressing member 609 may be rotated about the horizontal portion 611B in the direction of arrow AR or lowered in the direction of arrow AD. According to changes in the size of the link 6B or loop 6C, the position at which the loop pressing member 609 is attached to the apparatus frame 2 may be changed to change the height SH or the distance TT (FIG. 37). If necessary, in association with the upward movement (in the direction of arrow RA) of the removed stick 7-1, the loop pressing member 609 may be rotated in the direction of arrow AQ at an appropriate time so as to increase the loop retaining force.

Figure 39:
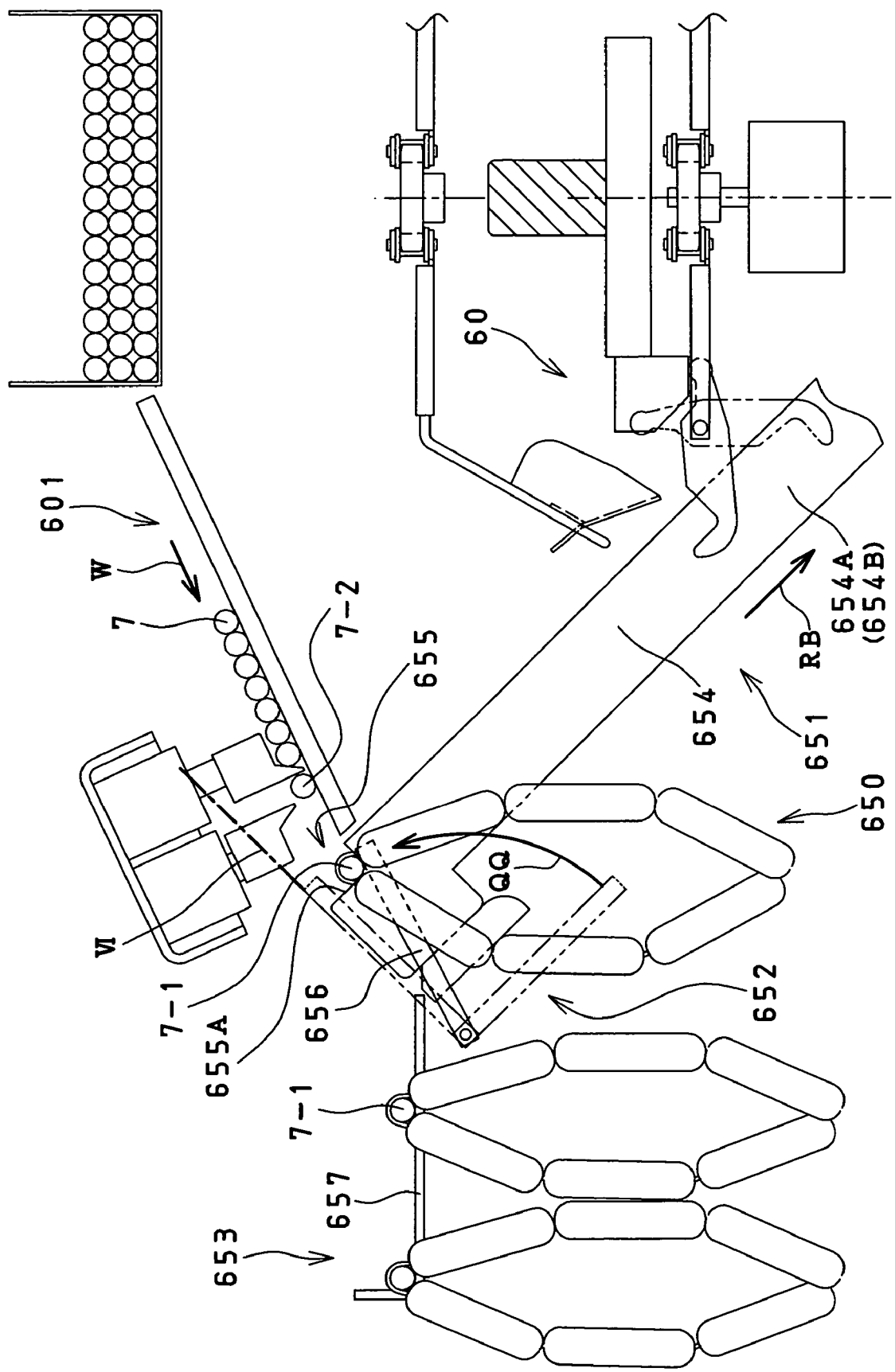
FIG. 39 is a partially enlarged right side view of an apparatus according to still another embodiment of the invention.

FIG. 39 shows an apparatus 650 including a stick transferring means with a stick holding means able to work as both the discharged and supplied stick holding means. The apparatus 650 includes a stick transferring means 651, a stick discharging means 652, and a stick receiving means 653.

The stick transferring means 651 has a stick reciprocally transferring means 654 with a stick holding means 655. The stick reciprocally transferring means 654 has a pair of front and rear transferring members 654A and 654B arranged in parallel in a direction perpendicular to the longitudinal axis X of the stick 7 on the stick supporting means 60. The stick holding means 655 is composed of a pair of recesses 655A formed on the stick reciprocally transferring means 654. After the discharged stick 7-1 is discharged from the recesses 655, the stick holding means 655 receives on the recesses 655A the supplied stick 7-2 slid down from the stick supply means 601 in the W direction. Similarly to the supplied stick holding means 608, the stick holding means 655 is lowered beyond the stick supporting member 10 and the stick front portion supporting member 55 to transfer the stick 7-2 to the stick supporting member 10 and the stick front portion supporting member 55.

The stick discharging means 652 has a pair of arms formed as plate shaped rod members 656 spaced along the longitudinal axis X for discharging the discharged stick 7-1 from the stick holding means 655 to the stick receiving means 653 while the stick reciprocally transferring means 654 rests at the raised end position VI. The arms 656 rotate in the direction of arrow QQ to pick up the front and rear portions 7A and 7B of the discharged stick 7-1 so that the discharged stick 7-1 slides on the arms 656 toward the stick receiving means 653.

The stick receiving means 653 has a stick receiving stand 657 for supporting a plurality of discharged sticks 7-1 for stock. The stick receiving stand 657 supports the front and rear portions 7A and 7B of a stick in the same manner as the stick receiving stand 115.

Figure 40:
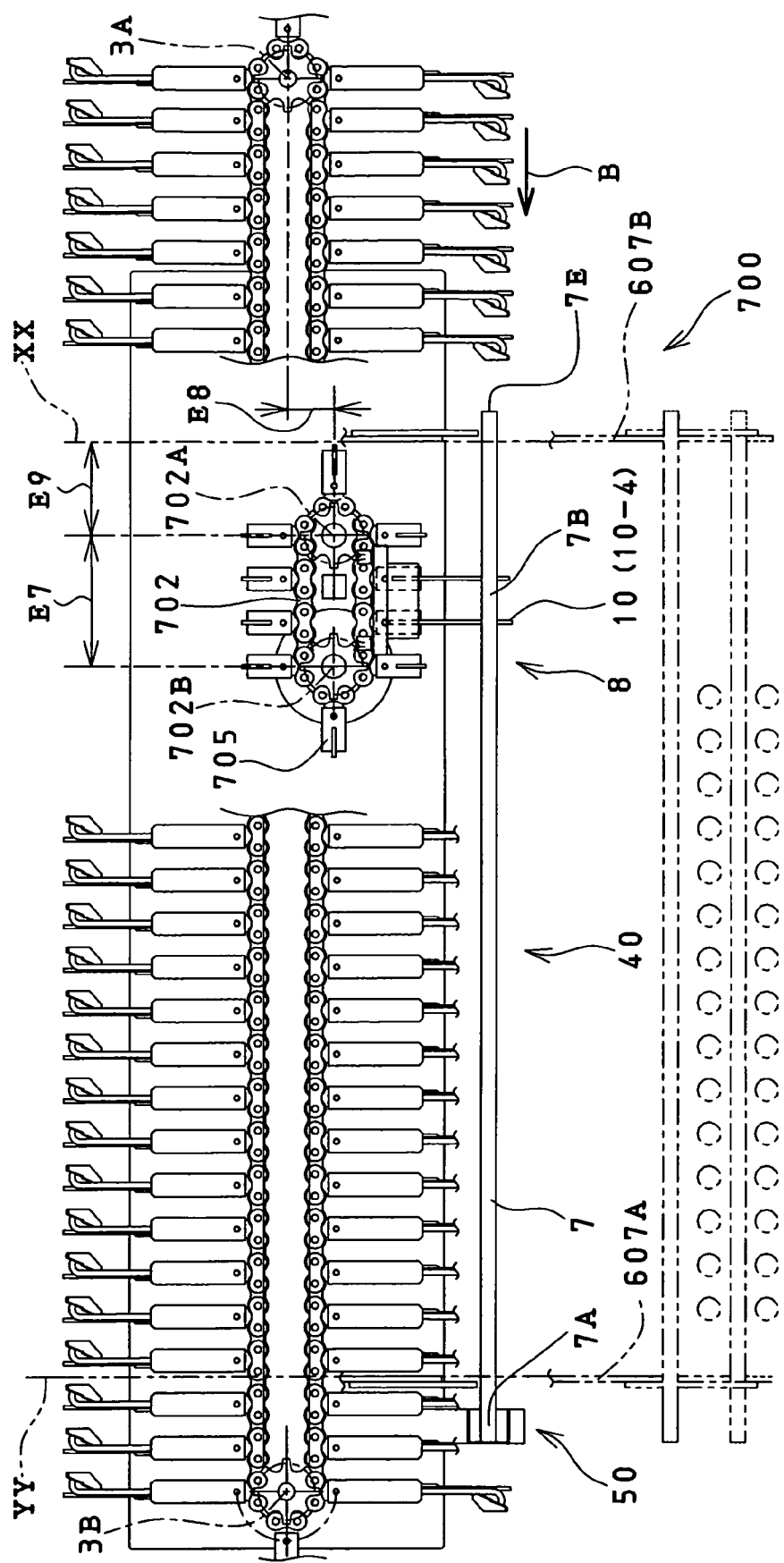
FIG. 40 is a partially broken plan view of an apparatus according to still another embodiment of the invention.

FIG. 40 shows an apparatus 700 which includes the second endless circulating body 702 put around the third rotational axis 702A and the fourth rotational axis 702B spaced from the third rotational axis 702A by a distance E7. The third and fourth rotational axes 702A and 702B are shifted toward the stick supporting means 40 by a distance E8 with respect to the first and second rotational axes 3A and 3B. The stick supporting members 10 of this apparatus are rotatably attached to arms 705 shorter than the arms 305 of the above apparatus. The distance E9 between the third rotational axis 702A and the rear transferring member 607B in the passing path XX is smaller than that of the apparatus 600 so that the stick supporting member 10 can support the stick 7 in the rear portion 7B at a position closer to the rear end 7E than before.

In the apparatus 600 and 700, the third rotational axes 502A and 702A and the fourth rotational axes 502B and 702B are disposed closer to the passing path XX between the passing path XX and the second rotational axis 3B but, in this invention, the third and fourth axes may be disposed closer to the passing path XX between the passing path XX and the first rotational axis 3A along the longitudinal axis X of the stick 7 such that the stick supporting member 10 supports the rear portion 7B of the stick 7.

In the apparatus 100, the front and rear arms 105 and 106 serving as the front and rear transferring members hold the front and rear portions 7A and 7B of a stick 7, respectively, and, in the apparatuses 600 and 700, the front transferring member 607A holds the vicinity of the front portion 7A of a stick 7 and the rear transferring member 607B holds the rear portion 7B of a stick. In this invention, however, the position at which the stick reciprocally transferring means supports a stick is not specified. As long as the stick is discharged from the stick supporting members stably, it is possible for the stick reciprocally transferring means to support the stick at any two locations of the stick. If necessary, it is possible to support the stick at three or more locations. According to the invention, the stick reciprocally transferring means include at least one pair of arms as serving as stick transferring members.

Figure 41:
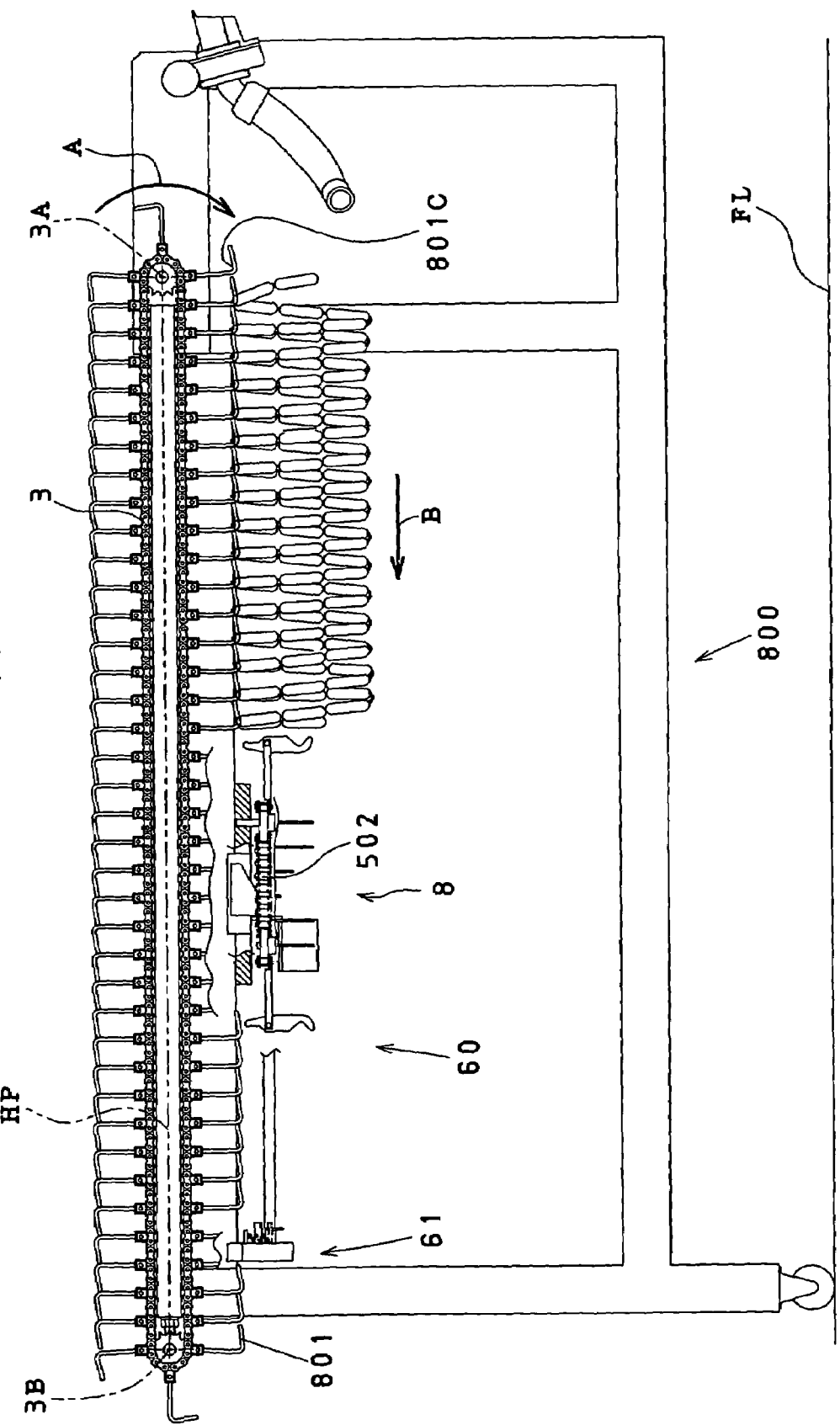
FIG. 41 is a front elevational view of an apparatus according to yet another embodiment of the invention.
Figure 42:
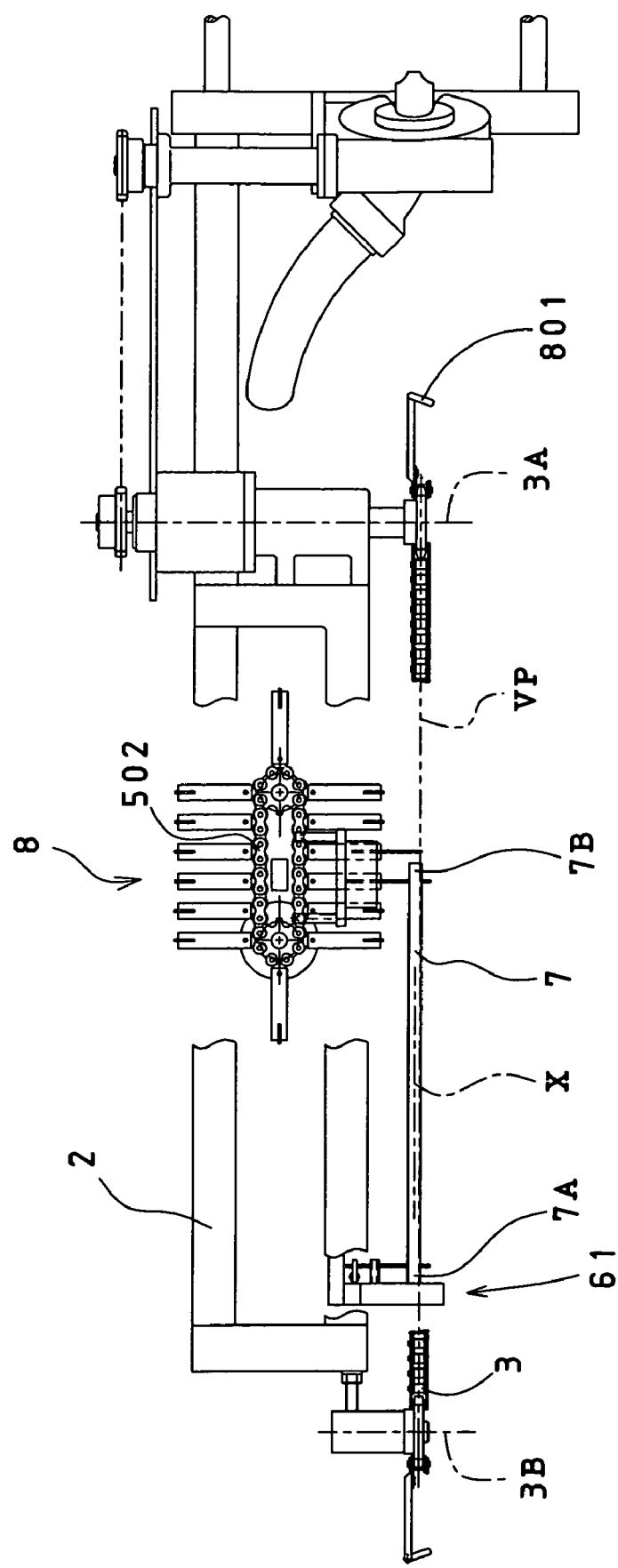
FIG. 42 is a top plan view of the apparatus of FIG. 41.

In the above apparatuses 1 through 700, the endless circulating body 3 is disposed on a substantially horizontal plane HP, but an apparatus that the endless circulating body 3 is disposed on a substantially vertical plane VP will be described with reference to FIGS. 41 and 42. The apparatus 800 is different from the apparatuses 1 through 700 in that the endless circulating body 3 disposed on a substantially vertical plane VP is disposed above the second endless circulating body 502. The apparatus 800 includes the first and second rotational axes 3A and 3B horizontally disposed on the substantially horizontal plane HP, the endless circulating body 3 put around the first and second rotational axes 3A and 3B for moving in directions of arrows A and B, hooks 801 with hook portions 801C for suspending a sausage, and a stick supporting means 60 having the second endless circulating body 502. The endless circulating body 3, the first and second rotational axes 3A and 3B, and the hooks 801 of the apparatus 800 may be the chain 112, the rotating horizontal shaft 115 and 116, and the hook 111 of U.S. Pat. No. 6,071,186, respectively.

The endless circulating body 3 and the second endless circulating body 302, 404, 452, 502, 602, and 702 of the apparatus 1 through 800 may be a chain, a belt, or a well-known transfer means, and the element around which the transfer means is put may be a sprocket, a pulley, or a well-known transfer rotational body.

The invention claimed is:

1. An apparatus for suspending a sausage from a stick, comprising:

an endless circulating body put around a first rotational axis and a second rotational axis spaced from said first rotational axis;

a plurality of hooks provided on said endless circulating body and having hook portions for hooking twisted portions of a sausage to suspend loops of the sausage, including a leading loop and a trailing loop;

a stick supporting means including a stick rear portion supporting means and a stick front portion supporting means for supporting a rear portion and a front portion of a stick such that said stick is disposed below said hook portions of said hooks which are moving from said rear portion to said front portion in state of suspending the loops;

said stick rear portion supporting means being disposed below said hooks for cooperation with said stick front portion supporting means to support said stick inserted through the leading and trailing loops of the sausage suspended from said hooks, said stick rear portion supporting means including:

a stick supporting member for supporting said rear portion of said stick while said stick supporting member moves in a longitudinal direction of said stick from said rear portion to said front portion of said stick; and a stick rear portion supporting member actuating means disposed between said first and second rotational axes in said longitudinal direction for causing said stick supporting member to move away downwardly from said stick so as to release support of said rear portion when said stick supporting member arrives at a predetermined position spaced in a hook moving direction in said longitudinal direction from a position where another stick supporting member subsequent to said stick supporting member starts to support said stick rear portion.

2. The apparatus according to claim 1, wherein said stick front portion supporting means comprises:

a stick front portion supporting member actuating means disposed between said first and second rotational axes in said longitudinal direction for causing said stick supporting member, which has moved by a predetermined distance from said predetermined position in said hook moving direction in said longitudinal direction, to approach upwardly said front portion of said stick supported by another stick supporting member ahead of said stick supporting member such that said stick supporting member, which has moved away downwardly from said stick at said predetermined position, supports said front portion of said stick; and said stick supporting member moved upwardly by said stick front portion supporting member actuating means and moving in said hook moving direction to support said front portion of said stick.

3. The apparatus according to claim 2, wherein said stick supporting member for supporting said front portion of said stick has a stick placing surface for swinging motion between a stick supporting position for supporting said stick and a lowered end position downwardly away from said supported stick, said stick supporting member being rotatably provided on a second endless circulating body disposed below said endless circulating body and put around a third rotational axis and a fourth rotational axis spaced from said third rotational axis such that said stick placing surface of said stick supporting member moves upwardly toward said support stick and downwardly away from said supported stick.

4. The apparatus according to claim 1, wherein said stick front portion supporting means comprises a stick front portion supporting member spaced from said stick rear portion supporting member actuating means by a predetermined distance in said longitudinal direction so as to be opposed to said stick supporting member for supporting said rear portion in a stationary state in said longitudinal direction when said stick front portion supporting member supports said front portion of said stick.

5. The apparatus according to claim 4, wherein said stick front portion supporting means has a stick front portion supporting member with a stick placing surface for reciprocation between said stick supporting position where said stick is supported below said hook portion and a position spaced upwardly from said stick supporting position.

6. The apparatus according to claim 1, wherein said stick supporting member for supporting said rear portion of said stick has a stick placing surface for swinging motion between a stick supporting position for supporting said stick and a lowered end position downwardly away from said supported stick, said stick supporting member being rotatably provided on a second endless circulating body disposed below said endless circulating body and put around a third rotational axis and a fourth rotational axis spaced from said third rotational axis such that said stick placing surface of said stick supporting member moves upwardly toward said supported stick and downwardly away from said supported stick.

7. The apparatus according to claim 6, wherein said third rotational axis and said fourth rotational axis are shifted toward said stick supporting means with respect to said first rotational axis and said second rotational axis.

8. The apparatus according to claim 6, which further comprises a stick transferring means which includes:

a stick reciprocally transferring means spaced from said stick supporting member and extending in a direction substantially perpendicular to said longitudinal axis of said stick supported by said stick supporting member; said stick reciprocally transferring means having a removed stick holding means which advances together with said stick reciprocally transferring means to abut against said stick on said stick supporting member so as to receive and hold said stick; and a stick reciprocally transferring means driving means for advancing said stick reciprocally transferring means beyond said stick supporting member disposed below said hook portions and then retreating said stick reciprocally transferring means beyond said stick supporting member; and said third and fourth rotational axes being disposed between said first and second rotational axes in said longitudinal direction.

9. The apparatus according to claim 8, wherein said stick transferring means has a rear transferring member which advances and retreats between said first rotational axis and said third rotational axis in said longitudinal direction.

10. The apparatus according to claim 8, wherein said stick transferring means has a rear transferring member which advances and retreats between said second rotational axis and said fourth rotational axis in said longitudinal direction.

11. The apparatus according to claim 1, wherein said stick front portion supporting means comprises a stick front portion supporting member spaced from said stick rear portion supporting member actuating means by a predetermined distance in said longitudinal direction so as to be opposed to said stick supporting member for supporting said rear portion in a stationary state in said longitudinal direction when said stick front portion supporting member supports said front portion of said stick, and said stick supporting member for supporting said rear portion of said stick has a stick placing surface for swinging motion between a stick supporting position for supporting said stick and a lowered end position downwardly away from said supported stick, said stick supporting member being rotatably provided on a second endless circulating body disposed below said endless circulating body and put around a third rotational axis and a fourth rotational axis spaced from said third rotational axis such that said stick placing surface of said stick supporting member moves upwardly toward said supported stick and downwardly away from said supported stick.

12. The apparatus according to claim 1, which further comprises a stick transferring means which includes:

a stick reciprocally transferring means spaced from said stick supporting member and extending in a direction substantially perpendicular to said longitudinal axis of said stick supported by said stick supporting member, said stick reciprocally transferring means having a removed stick holding means which advances together with said stick reciprocally transferring means to abut against said stick on said stick supporting member so as to receive and hold said stick; and a stick reciprocally transferring means driving means for advancing said stick reciprocally transferring means beyond said stick supporting member disposed below said hook portions and then retreating said stick reciprocally transferring means beyond said stick supporting member;

a member for coming into contact with said loops suspended from said advancing stick at a height less than a height of said stick which has engaged with twisted portions, and extending in an arranging direction of said hooks so as to be opposed to a plurality of hooks at a predetermined distance, said hooks being provided on said endless circulating body.

* * * * *